United States Patent
Wang et al.

(10) Patent No.: US 12,152,666 B2
(45) Date of Patent: Nov. 26, 2024

(54) INTERNAL MESHING PLANETARY GEAR APPARATUS AND ROBOT JOINT APPARATUS

(71) Applicants: Midea Group Co., Ltd., Foshan (CN); Guangdong Jiya Precision Machinery Technology Co., Ltd., Foshan (CN); GD Midea Air-Conditioning Equipment Co., Ltd., Shunde (CN)

(72) Inventors: Gang Wang, Foshan (CN); Wenjie Lin, Foshan (CN); Kiyoji Minegishi, Foshan (CN); Ziming Guo, Foshan (CN); Tsuyoshi Isaji, Foshan (CN)

(73) Assignees: MIDEA GROUP CO., LTD., Foshan (CN); GUANGDONG JIYA PRECISION MACHINERY TECHNOLOGY CO., LTD., Foshan (CN); GD MIDEA AIR-CONDITIONING EQUIPMENT CO., LTD., Foshan (CN)

(*) Notice: Subject to any disclaimer, the term of this patent is extended or adjusted under 35 U.S.C. 154(b) by 0 days.

(21) Appl. No.: 18/383,420

(22) Filed: Oct. 24, 2023

(65) Prior Publication Data

US 2024/0052923 A1 Feb. 15, 2024

Related U.S. Application Data

(63) Continuation of application No. PCT/CN2021/134363, filed on Nov. 30, 2021.

(30) Foreign Application Priority Data

Apr. 27, 2021 (JP) .................. 2021-075096

(51) Int. Cl.
*F16H 57/08* (2006.01)
*F16H 1/32* (2006.01)

(52) U.S. Cl.
CPC ..... *F16H 57/082* (2013.01); *F16H 2001/325* (2013.01); *F16H 2001/327* (2013.01); *F16H 2057/085* (2013.01)

(58) Field of Classification Search
CPC ................. F16H 57/082; F16H 57/032; F16H 2057/085; F16H 1/32; F16H 2001/327; F16H 2001/325; B25J 9/102
See application file for complete search history.

(56) References Cited

U.S. PATENT DOCUMENTS

| | | | |
|---|---|---|---|
| 2002/0111243 A1* | 8/2002 | Minegishi | F16H 1/32 475/183 |
| 2004/0192486 A1* | 9/2004 | Tsurumi | F16H 1/32 475/168 |

(Continued)

FOREIGN PATENT DOCUMENTS

| | | |
|---|---|---|
| CN | 102207169 A | 10/2011 |
| CN | 102235326 A | 11/2011 |

(Continued)

OTHER PUBLICATIONS

Midea Group Co., Ltd., IPRP, PCT/CN2021/134363, Oct. 24, 2023, 6 pgs.

(Continued)

*Primary Examiner* — Lori Wu
(74) *Attorney, Agent, or Firm* — Morgan, Lewis & Bockius LLP

(57) ABSTRACT

An internal meshing planetary gear apparatus and a robotic joint device. The internal meshing planetary gear apparatus includes an internally toothed gear, a planetary gear, a plurality of inner pins, an eccentric shaft which acts as an input shaft, and a bushing. The plurality of inner pins is respectively inserted into a plurality of inner pin holes formed in the planetary gear, and is configured to revolve in the inner pin holes while rotating relative to the internally (Continued)

toothed gear about a rotation axis. The eccentric shaft is configured to cause the planetary gear to oscillate eccentrically. The bushing includes a fixing structure configured to fix an object member, and the bushing is combined with the eccentric shaft and configured to rotate together with the eccentric shaft.

14 Claims, 23 Drawing Sheets

(56) References Cited

U.S. PATENT DOCUMENTS

| | | |
|---|---|---|
| 2007/0243967 A1 | 10/2007 | Haga et al. |
| 2014/0309068 A1 | 10/2014 | Xu et al. |

FOREIGN PATENT DOCUMENTS

| | | |
|---|---|---|
| CN | 102691771 A | 9/2012 |
| CN | 110005759 A | 7/2019 |
| CN | 110360274 A | 10/2019 |
| CN | 110630694 A | 12/2019 |
| DE | 102012023809 A1 | 6/2013 |
| JP | H 0544792 A | 2/1993 |
| JP | 2896069 B2 | 5/1999 |
| JP | 2003074646 A | 3/2003 |
| JP | 2017044319 A | 3/2017 |
| JP | 2019090477 A | 6/2019 |
| JP | 2019219041 A | 12/2019 |

OTHER PUBLICATIONS

Midea Group Co., Ltd., Japanese Office Action, JP Patent Application No. 2021-075096, Dec. 20, 2023, 7 pgs.

Midea Group Co., Ltd., Japanese Search Report, JP Patent Application No. 2021-075096, Dec. 11, 2023, 12 pgs.

Midea Group Co., Ltd., ISRWO, PCT/CN2021/134363, Feb. 9, 2022, 8 pgs.

Midea Group Co., Ltd., Extended European Search Report, EP Patent Application No. 21939019.2, Jul. 11, 2024, 10 pgs.

* cited by examiner

INTERNAL MESHING PLANETARY GEAR APPARATUS AND ROBOT JOINT APPARATUS

CROSS-REFERENCE TO RELATED APPLICATIONS

This application is a continuation of International (PCT) Patent Application No. PCT/CN2021/134363 filed on Nov. 30, 2021, which claims priority to Japanese Patent Application No. 2021-075096 filed on Apr. 27, 2021, the contents of which are hereby incorporated by reference in their entirety.

TECHNICAL FIELD

Embodiments of the disclosure generally relate to an internal-meshing planetary gear device and a joint device for a robot, and in particular to an internal-meshing planetary gear device in which a planetary gear having external teeth is arranged on an inner side of an internally toothed gear having internal teeth, and a joint device for a robot.

BACKGROUND

An eccentrically swinging type gear device in which a planetary gear swings eccentrically while internally meshing with an internally toothed gear may include an eccentric body that is integrally formed with an input shaft. The planetary gear may be mounted in the eccentric body via an eccentric body bearing. External teeth with an arc tooth shape or the like are formed on a periphery of the planetary gear.

The internally toothed gear is formed by mounting multiple external pins (roller pins) constituting internal teeth one-by-one into an inner peripheral surface of a gear body (internally toothed gear body) used as a housing in a free rotation manner. In the planetary gear, multiple inner pin holes (inner roller holes) are formed at proper intervals in a circumferential direction, and inner pins and inner rollers are inserted into the inner pin holes. The inner pin is connected to a bracket at an end side in an axial direction thereof, and the bracket is supported on the housing via a cross roller bearing in a free rotation manner. The gear device may be used as a gear device which takes out, from the bracket, rotation of the planetary gear corresponding to a self-rotation component when the internally toothed gear is fixed.

SUMMARY

Increasing an outer diameter of the input shaft to fix an object member to an end surface of the input shaft, may hinder miniaturization of the internal-meshing planetary gear device.

In some embodiments, an internal-meshing planetary gear device and a joint device for a robot may be easily miniaturized.

In some embodiments, an internal-meshing planetary gear device includes an internally toothed gear, a planetary gear, multiple inner pins, an input shaft, and a bushing. The internally toothed gear is provided with internal teeth. The planetary gear is provided with external teeth partially meshing with the internal teeth. Multiple inner pins revolve in multiple inner pin holes formed in the planetary gear and relatively rotate relative to the internally toothed gear with a rotation axis as a center, in a state where multiple inner pins are inserted into multiple inner pin holes respectively. The input shaft swings the planetary gear eccentrically. The bushing is provided with a fixing structure to fix an object member, and is coupled to the input shaft and rotates together with the input shaft.

In some embodiments, a joint device for a robot includes the internal-meshing planetary gear device, a first member fixed to an outer ring of a bearing member in the internal-meshing planetary gear device, and a second member fixed to an inner ring of the bearing member.

In some embodiments, an internal-meshing planetary gear device and a joint device for a robot may be easily miniaturized.

DETAILED DESCRIPTION

Figure 1:
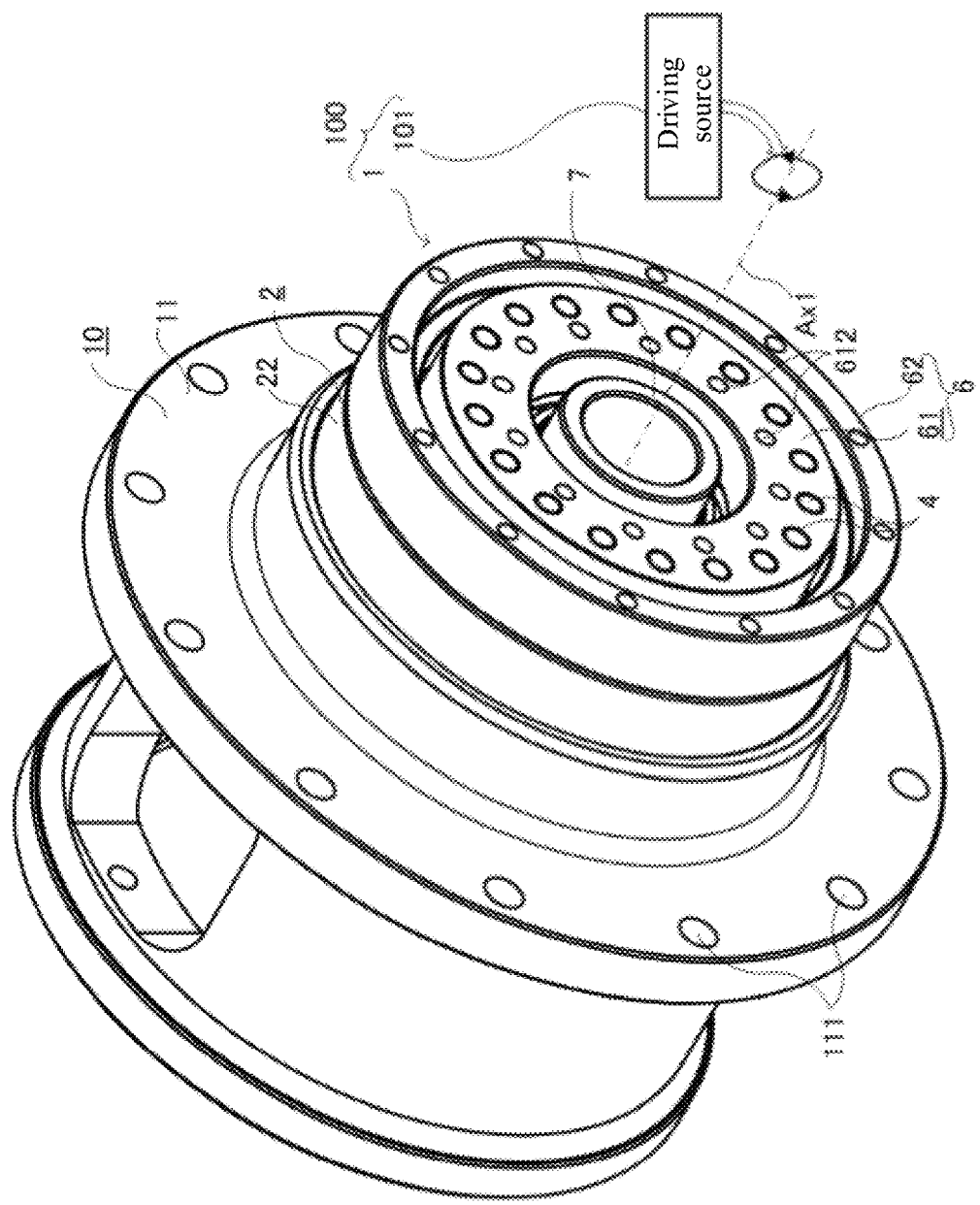
FIG. 1 is a perspective view showing a diagrammatic structure of an actuator including an internal-meshing planetary gear device with a basic structure.
Figure 2:
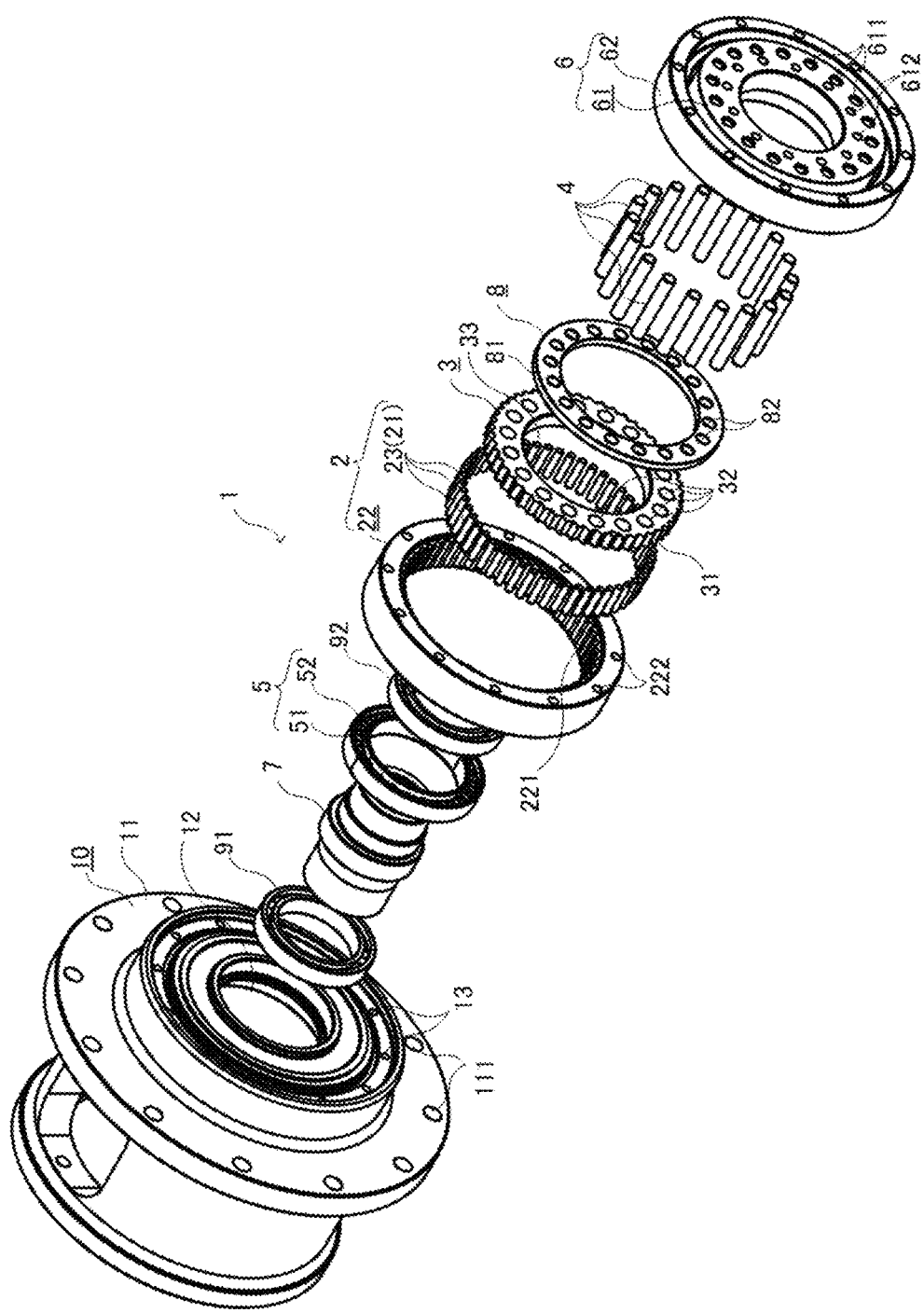
FIG. 2 is an exploded perspective view of the above internal-meshing planetary gear device observed from an output side of a rotation axis.
Figure 3:
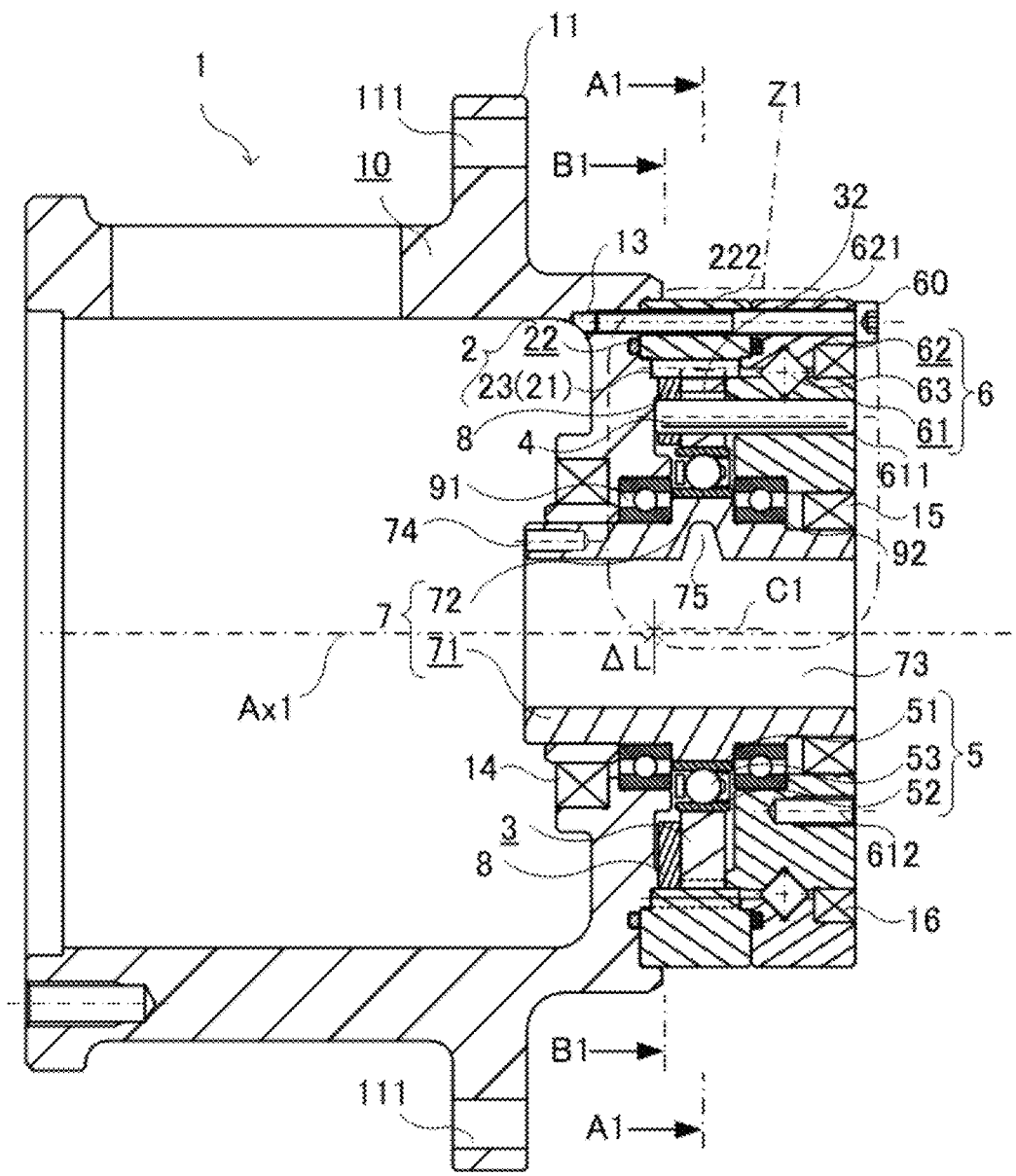
FIG. 3 is a diagrammatic cross-sectional view of the above internal-meshing planetary gear device.

Hereinafter, summary of an internal-meshing planetary gear device 1 with a basic structure is explained with reference to FIG. 1 to FIG. 3. Drawings referred by embodiments of the disclosure are schematic views, and respective ratios of sizes and thicknesses of structural elements in the drawings do not necessarily reflect actual size ratios. For example, tooth shapes, sizes, tooth number, or the like of internal teeth 21 and external teeth 31 in FIG. 1 to FIG. 3 are merely shown schematically for illustration, and are not aimed to be limited to the shapes as shown.

The internal-meshing planetary gear device 1 with the basic structure (hereinafter, referred to as "gear device 1" for abbreviation) is a gear device including an internally toothed gear 2, a planetary gear 3, and multiple inner pins 4. In the gear device 1, the planetary gear 3 is arranged on an inner side of the internally toothed gear 2 with an annular shape, and an eccentric body bearing 5 is further arranged on an inner side of the planetary gear 3. The eccentric body bearing 5 is provided with an eccentric body inner ring 51 and an eccentric body outer ring 52, and the eccentric body inner ring 51 rotates (eccentrically moves) around a rotation axis Ax1 (referring to FIG. 3) offset from center C1 (referring to FIG. 3) of the eccentric body inner ring 51, thereby swinging the planetary gear 3. The eccentric body inner ring 51 rotates (eccentrically moves) around the rotation axis Ax1, for example, by rotation of an eccentric shaft 7 inserted into the eccentric body inner ring 51. Furthermore, the internal-meshing planetary gear device 1 further includes a bearing member 6 provided with an outer ring 62 and an inner ring 61. The inner ring 61 is arranged on an inner side of the outer ring 62 and is supported to be relatively rotatable relative to the outer ring 62.

The internally toothed gear 2 is provided with internal teeth 21 and is fixed to the outer ring 62. Especially, in the basic structure, the internally toothed gear 2 is provided with a gear body 22 with an annular shape and multiple pins 23. Multiple pins 23 are held in an inner peripheral surface 221 of the gear body 22 in a self-rotatable state, to constitute the internal teeth 21. The planetary gear 3 is provided with external teeth 31 partially meshing with the internal teeth 21. That is, on the inner side of the internally toothed gear 2, the planetary gear 3 is internally tangent to the internally toothed gear 2 to form a state where a part of the external teeth 31 is meshed with a part of the internal teeth 21. In this state, the planetary gear 3 swings when the eccentric shaft 7 rotates, a meshing position of the internal tooth 21 and the external tooth 31 moves in a circumferential direction of the internally toothed gear 2, and relative rotation corresponding to a difference between tooth numbers of the planetary gear 3 and the internally toothed gear 2 is generated between the two gears (the internally toothed gear 2 and the planetary gear 3). Here, when the internally toothed gear 2 is fixed, the planetary gear 3 rotates (self-rotation) along with the relative rotation of the two gears. As a result, it is possible to obtain, from the planetary gear 3, a rotational output which is decelerated at a relatively high reduction ratio corresponding to the difference between tooth numbers of the two gears.

Such gear device 1 is used in such a way that rotation of the planetary gear 3 corresponding to a self-rotation component is taken out, as for example rotation of an output shaft integrated with the inner ring 61 of the bearing member 6. Therefore, the gear device 1 takes the eccentric shaft 7 as an input side and takes the output shaft as an output side, to achieve a function of a gear device with a relatively high reduction ratio. Therefore, in the gear device 1 with the basic structure, in order to transmit rotation of the planetary gear 3 corresponding to a self-rotation component to the inner ring 61 of the bearing member 6, multiple inner pins 4 are used to connect the planetary gear 3 to the inner ring 61. Multiple inner pins 4 revolve in multiple inner pin holes 32 formed in the planetary gear 3 and relatively rotate relative to the internally toothed gear 2, in a state where multiple inner pins are inserted into multiple inner pin holes 32 respectively. That is, diameter of the inner pin hole 32 is greater than that of the inner pin 4, and the inner pin 4 may move by revolving in the inner pin hole 32, in a state where it is inserted into the inner pin hole 32. Furthermore, a swinging component of the planetary gear 3, i.e., a revolution component of the planetary gear 3, is absorbed by play-embedding of the inner pin 4 to the inner pin hole 32 of the planetary gear 3. In other words, multiple inner pins 4 move by revolving in multiple inner pin holes 32 respectively, thereby absorbing the swinging component of the planetary gear 3. Therefore, rotation (self-rotation component) of the planetary gear 3 other than the swinging component (revolution component) of the planetary gear 3, is transmitted to the inner ring 61 of the bearing member 6 through multiple inner pins 4.

However, in such gear device 1, the inner pin 4 is revolved in the inner pin hole 32 of the planetary gear 3, while rotation of the planetary gear 3 is transmitted to multiple inner pins 4. Therefore, an inner roller which is assembled on the inner pin 4 may be rotatable with the inner pin 4 as a shaft. That is, the inner pin 4 may be kept in a state where it is pressed into the inner ring 61 (or a bracket integrated with the inner ring 61), and when the inner pin 4 revolves in the inner pin hole 32, the inner pin 4 slides relative to an inner peripheral surface 321 of the inner pin hole 32. Therefore, the inner roller is used to reduce loss caused by a frictional resistance between the inner peripheral surface 321 of the inner pin hole 32 and the inner pin 4. However, when a structure including the inner roller is used, the inner pin hole 32 may be required to have a diameter enabling the inner pin 4 with the inner roller to revolve, and the inner pin hole 32 is difficult to be miniaturized. When the inner pin hole 32 is difficult to be miniaturized, miniaturization of the planetary gear 3 (especially to have a small diameter) is hindered, and even miniaturization of the whole gear device 1 is hindered. The gear device 1 with the basic structure may provide an internal-meshing planetary gear device 1 which may be (e.g., easily) miniaturized through the following structures.

That is, as shown in FIG. 1 to FIG. 3, the gear device 1 with the basic structure includes a bearing member 6, an internally toothed gear 2, a planetary gear 3 and multiple inner pins 4. The bearing member 6 is provided with an outer ring 62 and an inner ring 61 arranged on an inner side of the outer ring 62. The inner ring 61 is supported to be relatively rotatable relative to the outer ring 62. The internally toothed gear 2 is provided with internal teeth 21 and is fixed to the outer ring 62. The planetary gear 3 is provided with external teeth 31 partially meshing with the internal teeth 21. Multiple inner pins 4 revolve in multiple inner pin holes 32 formed in the planetary gear 3 and relatively rotate relative to the internally toothed gear 2, in a state where multiple inner pins are inserted into multiple inner pin holes 32 respectively. Here, each of multiple inner pins 4 is held in the inner ring 61 in a self-rotatable state. Furthermore, at least a part of each of multiple inner pins 4 is arranged at the same position as the bearing member 6 in an axial direction of the bearing member 6.

According to this configuration, each of multiple inner pins 4 is held by the inner ring 61 in a self-rotatable state, therefore the inner pin 4 itself may self-rotate when the inner pin 4 revolves in the inner pin hole 32. Therefore, loss caused by a frictional resistance between the inner peripheral surface 321 of the inner pin hole 32 and the inner pin 4 may be reduced even without using the inner roller assembled on the inner pin 4 to be rotatable with the inner pin 4 as a shaft. Therefore, in the gear device 1 with the basic structure, it is unnecessary to provide an inner roller, so that the gear device may have an advantage of being easily miniaturized. Furthermore, at least a part of each of multiple inner pins 4 is arranged at the same position as the bearing member 6 in an axial direction of the bearing member 6, so that size of the gear device 1 in the axial direction of the bearing member 6 may be suppressed to a small extent. That is, compared to a structure where the bearing member 6 is in parallel with (opposite to) the inner pin 4 along the axial direction of the bearing member 6, in the gear device 1 with the basic structure, size of the gear device 1 in the axial direction may be reduced, thereby contributing to further miniaturization (thinning) of the gear device 1.

Furthermore, for a given size of the planetary gear 3, the number (amount) of inner pins 4 may be increased to smooth transmission of the rotation, or the inner pin 4 becomes thicker to improve strength.

Furthermore, in such gear device 1, the inner pin 4 may be required to revolve in the inner pin hole 32 of the planetary gear 3. Therefore, multiple inner pins 4 may be held by the inner ring 61 (or a bracket integrated with the inner ring 61) only. Centering precision of multiple inner pins 4 may be challenging, and bad conditions such as generation of vibration, reduction of transmission efficiency, or the like may occur due to poor centering. That is, multiple inner pins 4 revolve in the inner pin holes 32 respectively and relatively rotate relative to the internally toothed gear 2, thereby transmitting the self-rotation component of the planetary gear 3 to the inner ring 61 of the bearing member 6. At this time, when centering precision of multiple inner pins 4 is not enough so that rotation axes of multiple inner pins 4 deviate or incline relative to a rotation axis of the inner ring 61, multiple inner pins 4 generate a poor centering state, which may result in bad conditions such as generation of vibration, reduction of transmission efficiency, or the like. The gear device 1 with the basic structure may provide an internal-meshing planetary gear device 1 which is difficult to generate bad conditions due to poor centering of multiple inner pins 4, through the following structures.

That is, as shown in FIG. 1 to FIG. 3, the gear device 1 with the basic structure includes an internally toothed gear 2, a planetary gear 3, multiple inner pins 4, and a support body 8. The internally toothed gear 2 is provided with a gear body 22 with an annular shape and multiple pins 23. Multiple pins 23 are held in an inner peripheral surface 221 of the gear body 22 in a self-rotatable state, to constitute the internal teeth 21. The planetary gear 3 is provided with external teeth 31 partially meshing with the internal teeth 21. Multiple inner pins 4 revolve in multiple inner pin holes 32 formed in the planetary gear 3 and relatively rotate relative to the gear body 22, in a state where multiple inner pins are inserted into multiple inner pin holes 32 respectively. The support body 8 has an annular shape and supports multiple inner pins 4. Here, position of the support body 8 is limited by contacting an outer peripheral surface 81 thereof with multiple pins 23.

According to this configuration, multiple inner pins 4 are supported by the support body 8 with an annular shape, therefore multiple inner pins 4 are constrained by the support body 8, which may suppress relative deviation and inclination of multiple inner pins 4. Furthermore, the outer peripheral surface 81 of the support body 8 is in contact with multiple pins 23, thereby limiting position of the support body 8. In summary, centering of the support body 8 is achieved by multiple pins 23, as a result, centering of multiple inner pins 4 supported by the support body 8 is also achieved by multiple pins 23. Therefore, according to the gear device 1 with the basic structure, centering precision of multiple inner pins 4 may be improved, and the gear device may have an advantage of being less likely to generate bad conditions due to poor centering of multiple inner pins 4.

Furthermore, as shown in FIG. 1, the gear device 1 with the basic structure constitutes an actuator 100 together with a driving source 101. In other words, the actuator 100 with the basic structure includes the gear device 1 and the driving source 101. The driving source 101 generates a driving force to swing the planetary gear 3. Specifically, the driving source 101 rotates the eccentric shaft 7 with the rotation axis Ax1 as a center, thereby swinging the planetary gear 3.

"Annular shape" stated in some embodiments of the disclosure refers to a shape such as a ring (circle) which forms an enclosed space (area) on an inner side when it is observed at least in a top view, and is not limited to a circular shape (circular ring shape) which is a perfect circle when it is observed in a top view, for example, may also be an elliptical shape, a polygonal shape, or the like. Furthermore, even though a shape has a bottom such as a cup shape, it is contained within "annular shape" as long as its peripheral wall has an annular shape.

"Play-embedding" stated in the embodiments of the disclosure refers to a state of embedding with a clearance (gap), and the inner pin hole 32 is a hole for play-embedding the inner pin 4. That is, the inner pin 4 is inserted into the inner pin hole 32 in a state of ensuring a margin of space (gap) between the inner pin and the inner peripheral surface 321 of the inner pin hole 32. In other words, diameter of a part of the inner pin 4 at least inserted into the inner pin hole 32 is smaller (thinner) than that of the inner pin hole 32.

Therefore, in case that the inner pin 4 is inserted into the inner pin hole 32, the inner pin 4 may move in the inner pin hole 32, that is, the inner pin 4 may relatively move relative to center of the inner pin hole 32. Therefore, the inner pin 4 may revolve in the inner pin hole 32. However, it is unnecessary to ensure a gap between the inner peripheral surface 321 of the inner pin hole 32 and the inner pin 4 to be used as a cavity, for example, fluid such as a liquid or the like may also be filled into the gap.

"Revolve" stated in the embodiments of the disclosure means that an object rotates around a rotation axis other than a central axis passing through center (center of gravity) of the object, and when the object revolves, center of the object moves along a revolution orbit with the rotation axis as a center. Therefore, for example, in case that an object rotates with an eccentric axis parallel to a central axis passing through center (center of gravity) of the object as a center, the object revolves with the eccentric axis as a rotation axis. As an example, the inner pin 4 revolves in the inner pin hole 32 by rotating around a rotation axis passing through center of the inner pin hole 32.

Furthermore, in the embodiments of the disclosure, sometimes one side (left side of FIG. 3) of the rotation axis Ax1 is referred to as an "input side", and the other side (right side of FIG. 3) of the rotation axis Ax1 is referred to as an "output side". In the example of FIG. 3, rotation is given to a rotation body (the eccentric body inner ring 51) from "input side" of the rotation axis Ax1, and rotation of multiple inner pins 4 (the inner ring 61) is taken out from "output side" of the rotation axis Ax1. However, "input side" and "output side" are merely labels assigned for the purpose of illustration, and are not aimed to limit a positional relationship between input and output observed from the gear device 1.

"Rotation axis" stated in the embodiments of the disclosure refers to a virtual axis (straight line) which is center of a rotational motion of a rotation body. That is, the rotation axis Ax1 is a virtual axis without an entity. The eccentric body inner ring 51 rotates with the rotation axis Ax1 as a center.

Each of "internal teeth" and "external teeth" stated in the embodiments of the disclosure refers to a set (group) of multiple "teeth" rather than a "tooth" as a single body. That is, the internal teeth 21 of the internally toothed gear 2 are composed of a set of multiple teeth arranged on the inner peripheral surface 221 of the internally toothed gear 2 (the gear body 22). Similarly, the external teeth 31 of the planetary gear 3 are composed of a set of multiple teeth arranged on an outer peripheral surface of the planetary gear 3.

A detailed structure of the internal-meshing planetary gear device 1 with the basic structure is described below with reference to FIG. 1 to FIG. 8B.

Figure 4:
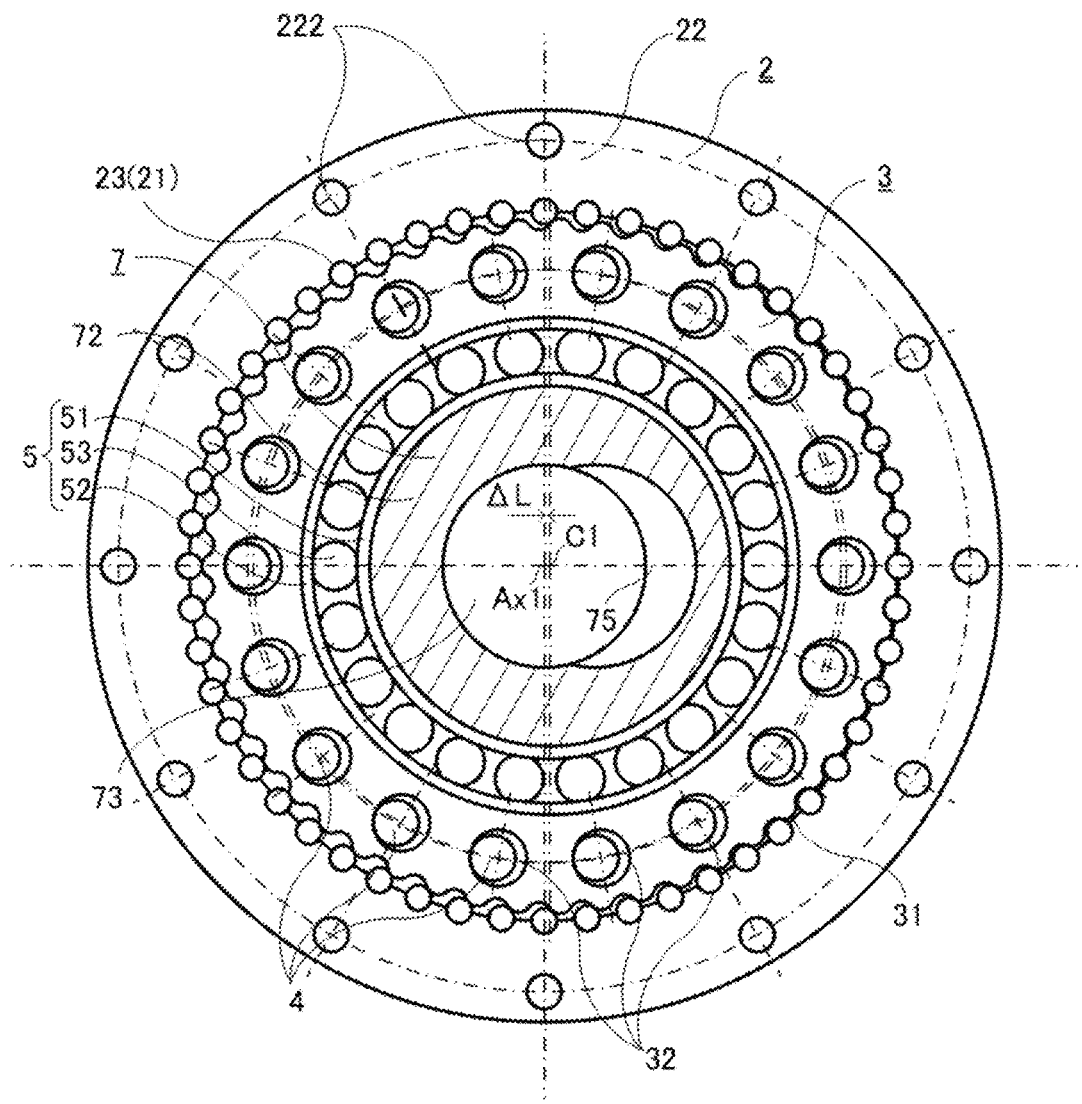
FIG. 4 is a cross-sectional view showing a line A1-A1 of FIG. 3 of the above internal-meshing planetary gear device.
Figure 5A:
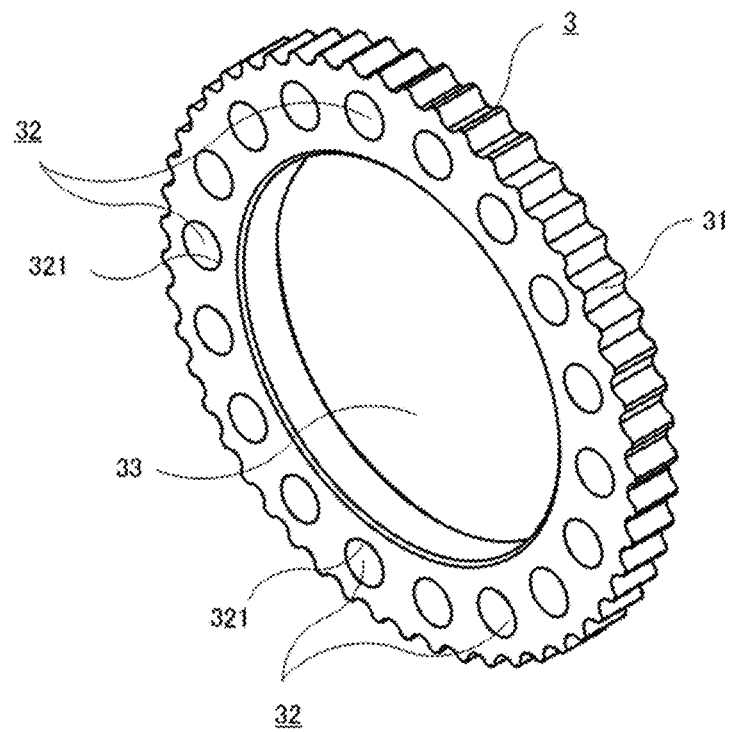
FIG. 5A is a perspective view showing a planetary gear of the above internal-meshing planetary gear device by way of monomer.
Figure 5B:
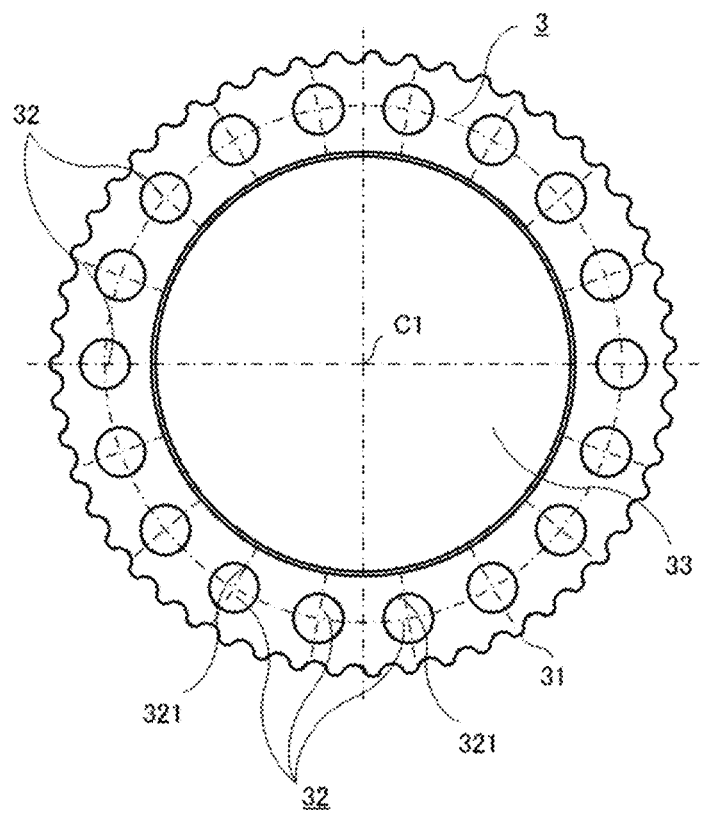
FIG. 5B is a front view showing a planetary gear of the above internal-meshing planetary gear device by way of monomer.
Figure 6A:
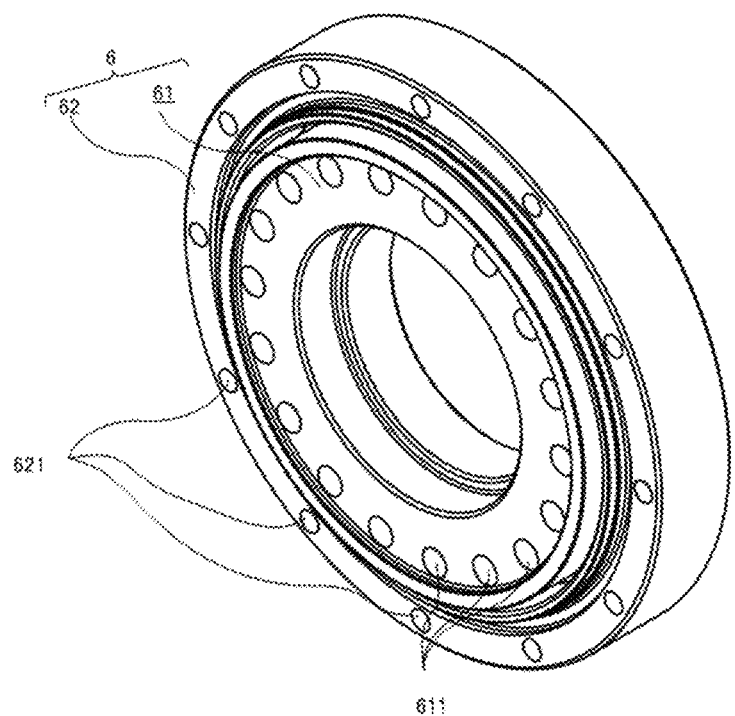
FIG. 6A is a perspective view showing a bearing member of the above internal-meshing planetary gear device by way of monomer.
Figure 6B:
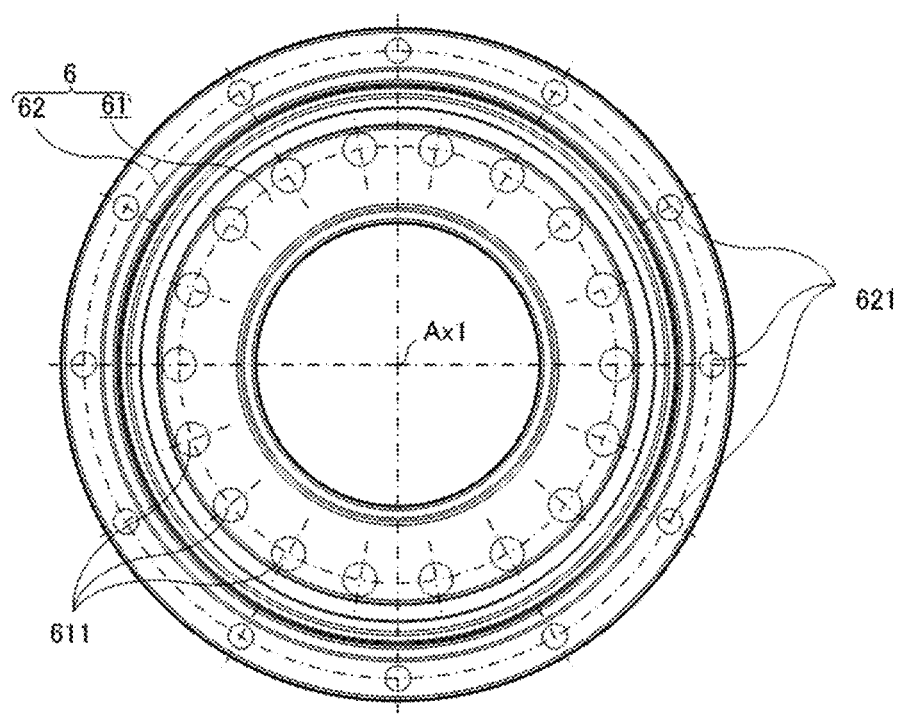
FIG. 6B is a front view showing a bearing member of the above internal-meshing planetary gear device by way of monomer.
Figure 7A:
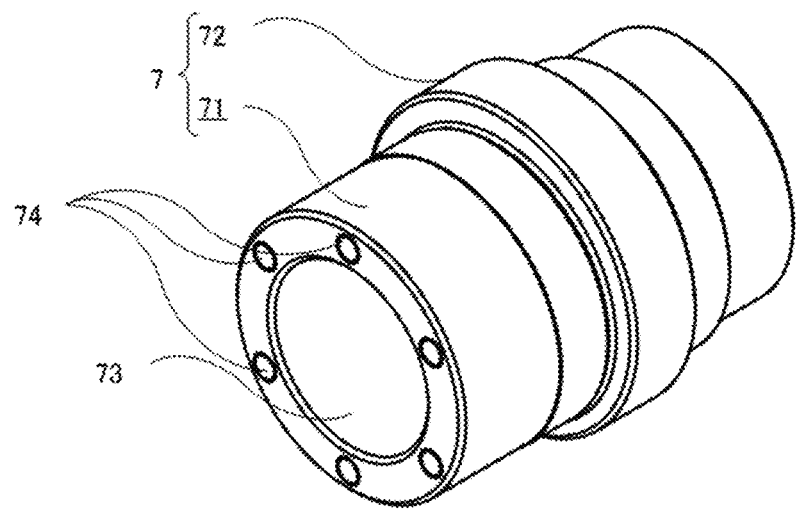
FIG. 7A is a perspective view showing an eccentric shaft of the above internal-meshing planetary gear device by way of monomer.
Figure 7B:
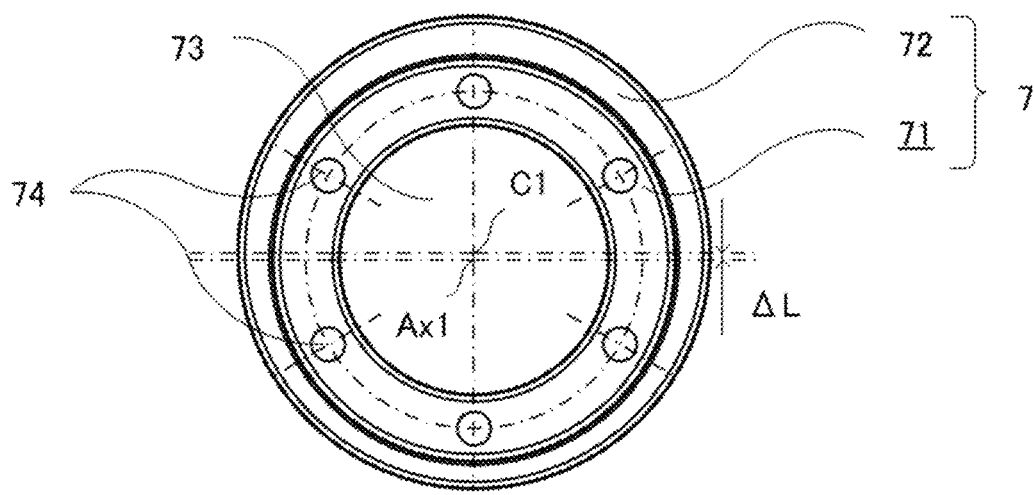
FIG. 7B is a front view showing an eccentric shaft of the above internal-meshing planetary gear device by way of monomer.
Figure 8A:
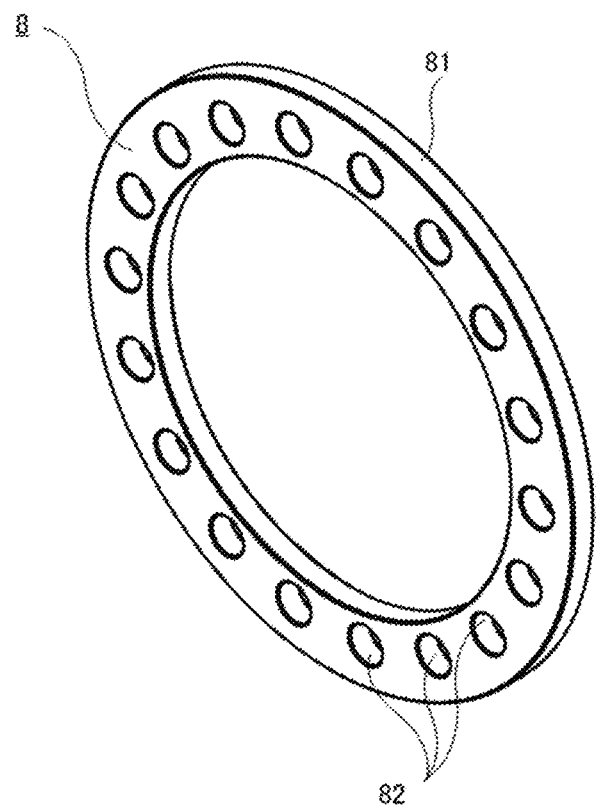
FIG. 8A is a perspective view showing a support body of the above internal-meshing planetary gear device by way of monomer.
Figure 8B:
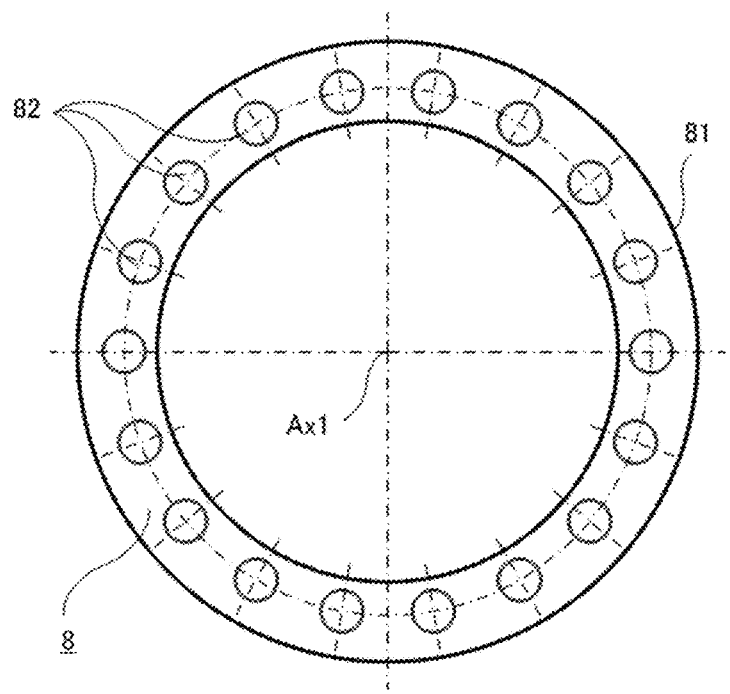
FIG. 8B is a front view showing a support body of the above internal-meshing planetary gear device by way of monomer.

FIG. 1 is a perspective view showing a diagrammatic structure of the actuator 100 including the gear device 1. In FIG. 1, the driving source 101 is shown schematically. FIG. 2 is a diagrammatic exploded perspective view of the gear device 1 observed from an output side of the rotation axis Ax1. FIG. 3 is a diagrammatic cross-sectional view of the gear device 1. FIG. 4 is a cross-sectional view of a line A1-A1 of FIG. 3. Here, in FIG. 4, components other than the eccentric shaft 7 are shown in cross-section, but cross-sectional lines are omitted. Furthermore, in FIG. 4, illustration of the inner peripheral surface 221 of the gear body 22 is omitted. FIG. 5A and FIG. 5B are a perspective view and a front view showing the planetary gear 3 by way of monomer respectively. FIG. 6A and FIG. 6B are a perspective view and a front view showing the bearing member 6 by way of monomer respectively. FIG. 7A and FIG. 7B are a perspective view and a front view showing the eccentric shaft 7 by way of monomer respectively. FIG. 8A and FIG. 8B are a perspective view and a front view showing the support body 8 by way of monomer respectively.

As shown in FIG. 1 to FIG. 3, the gear device 1 with the basic structure includes an internally toothed gear 2, a planetary gear 3, multiple inner pins 4, an eccentric body bearing 5, a bearing member 6, an eccentric shaft 7 and a support body 8. Furthermore, in the basic structure, the gear device 1 further includes a first bearing 91, a second bearing 92 and a housing 10. In the basic structure, the internally toothed gear 2, the planetary gear 3, multiple inner pins 4, the eccentric body bearing 5, the bearing member 6, the eccentric shaft 7, the support body 8, or the like which are used as structural elements of the gear device 1, are made of metal materials such as stainless steel, cast iron, carbon steel for mechanical structure, chrome molybdenum steel, phosphor bronze, aluminum bronze, or the like. Metal as stated here includes a metal which is subjected to surface treatments such as nitridation treatment or the like.

Furthermore, in the basic structure, an internally tangent type planetary gear reduction device with a cycloidal tooth shape is illustrated as an example of the gear device 1. That is, the gear device 1 with the basic structure includes an internally tangent type planetary gear 3 with a curve tooth shape such as cycloid.

Furthermore, in the basic structure, as an example, the gear device 1 is used in a state where the gear body 22 of the internally toothed gear 2 and the outer ring 62 of the bearing member 6 are fixed together to a fixing member such as the housing 10 or the like. Therefore, the planetary gear 3 relatively rotates relative to the fixing member (the housing 10 or the like) along with relative rotation of the internally toothed gear 2 and the planetary gear 3.

Furthermore, in the basic structure, in case that the gear device 1 is used in the actuator 100, a rotation force as output is taken out from an output shaft integrated with the inner ring 61 of the bearing member 6 by applying a rotation force as input to the eccentric shaft 7. That is, the gear device 1 acts with rotation of the eccentric shaft 7 as input rotation and with rotation of the output shaft integrated with the inner ring 61 as output rotation. Therefore, in the gear device 1, output rotation which is decelerated at a relatively high reduction ratio with respect to input rotation may be obtained.

The driving source 101 is a power generation source such as a motor (electric machine) or the like. Power generated by the driving source 101 is transmitted to the eccentric shaft 7 in the gear device 1. Specifically, the driving source 101 is connected to the eccentric shaft 7 via an input shaft, and the power generated by the driving source 101 is transmitted to the eccentric shaft 7 via the input shaft. Therefore, the driving source 101 may rotate the eccentric shaft 7.

Furthermore, in the gear device 1 with the basic structure, as shown in FIG. 3, the rotation axis Ax1 on the input side and the rotation axis Ax1 on the output side are on the same line. In other words, the rotation axis Ax1 on the input side is coaxial to the rotation axis Ax1 on the output side. Here, the rotation axis Ax1 on the input side is center of rotation of the eccentric shaft 7 to which input rotation is given, and the rotation axis Ax1 on the output side is center of rotation of the inner ring 61 (and the output shaft) for generating output rotation. That is, in the gear device 1, output rotation which is decelerated at a relatively high reduction ratio with respect to input rotation may be obtained on the same axis.

As shown in FIG. 4, the internally toothed gear 2 is an annular component provided with internal teeth 21. In the basic structure, the internally toothed gear 2 has a circular ring shape of which at least an inner peripheral surface is a perfect circle when it is observed in a top view. In the inner peripheral surface of the internally toothed gear 2 with the circular ring shape, the internal teeth 21 are formed along the circumferential direction of the internally toothed gear 2. Multiple teeth constituting the internal teeth 21 are all in the same shape, and are arranged at equal intervals in the whole area along a circumferential direction of the inner peripheral surface of the internally toothed gear 2. That is, a pitch circle of the internal tooth 21 is a perfect circle when it is observed in a top view. Center of the pitch circle of the internal tooth 21 is on the rotation axis Ax1. Furthermore, the internally toothed gear 2 has a predetermined thickness in a direction of the rotation axis Ax1. Tooth directions of the internal teeth 21 are all parallel to the rotation axis Ax1. Size in the tooth direction of the internal tooth 21 is slightly smaller than size in a thickness direction of the internally toothed gear 2.

Here, as described above, the internally toothed gear 2 is provided with a gear body 22 with an annular shape (circular ring shape) and multiple pins 23. Multiple pins 23 are held in an inner peripheral surface 221 of the gear body 22 in a self-rotatable state, to constitute the internal teeth 21. In other words, multiple pins 23 function as multiple teeth constituting the internal teeth 21, respectively. Specifically, as shown in FIG. 2, multiple grooves are formed in the whole area along a circumferential direction of the inner peripheral surface 221 of the gear body 22. Multiple grooves are all in the same shape and are arranged at equal intervals. Multiple grooves are all parallel to the rotation axis Ax1 and are formed throughout the entire length along a thickness direction of the gear body 22. Multiple pins 23 are embedded into multiple grooves, to be combined in the gear body 22. Each of multiple pins 23 is held in a state of being self-rotatable within the groove. Furthermore, the gear body 22 (together with the outer ring 62) is fixed to the housing 10. Therefore, multiple fixing holes 222 for fixing are formed in the gear body 22.

As shown in FIG. 4, the planetary gear 3 is an annular component provided with external teeth 31. In the basic structure, the planetary gear 3 has a circular ring shape of which at least an outer peripheral surface is a perfect circle when it is observed in a top view. In the outer peripheral surface of the planetary gear 3 with the circular ring shape, the external teeth 31 are formed along a circumferential direction of the planetary gear 3. Multiple teeth constituting the external teeth 31 are all in the same shape, and are arranged at equal intervals in the whole area along a circumferential direction of the outer peripheral surface of the planetary gear 3. That is, a pitch circle of the external tooth 31 is a perfect circle when it is observed in a top view. Center C1 of the pitch circle of the external tooth 31 is at a position offset from the rotation axis Ax1 by a distance ΔL (referring to FIG. 4). Furthermore, the planetary gear 3 has a predetermined thickness in the direction of the rotation axis Ax1. The external teeth 31 are all formed throughout the entire length along a thickness direction of the planetary gear 3. Tooth directions of the external teeth 31 are all parallel to the rotation axis Ax1. In the planetary gear 3, unlike the internally toothed gear 2, the external teeth 31 and body of the planetary gear 3 are integrally formed by a metal member.

Here, the eccentric body bearing 5 and the eccentric shaft 7 are combined for the planetary gear 3. That is, an opened portion 33 in form of a circular opening is formed in the planetary gear 3. The opened portion 33 is a hole penetrating the planetary gear 3 in a thickness direction. When it is observed in a top view, center of the opened portion 33 is consistent with center of the planetary gear 3, and an inner peripheral surface of the opened portion 33 (an inner peripheral surface of the planetary gear 3) and the pitch circle of the external tooth 31 are concentric circles. The eccentric body bearing 5 is received in the opened portion 33 of the planetary gear 3. Furthermore, the eccentric body bearing 5 and the eccentric shaft 7 are combined in the planetary gear 3 by inserting the eccentric shaft 7 into the eccentric body bearing 5 (the eccentric body inner ring 51 of the eccentric body bearing). In a state where the eccentric body bearing 5 and the eccentric shaft 7 are combined in the planetary gear 3, the planetary gear 3 swings around the rotation axis Ax1 when the eccentric shaft 7 rotates.

The planetary gear 3 as configured is arranged on the inner side of the internally toothed gear 2. When it is observed in a top view, the planetary gear 3 is formed smaller than the internally toothed gear 2, and the planetary gear 3 may swing on the inner side of the internally toothed gear 2 in a state where the planetary gear is combined with the internally toothed gear 2. At this time, the external teeth 31 are formed on the outer peripheral surface of the planetary gear 3, and the internal teeth 21 are formed on the inner peripheral surface of the internally toothed gear 2. Therefore, the external tooth 31 and the internal tooth 21 are opposite to each other, in a state where the planetary gear 3 is arranged on the inner side of the internally toothed gear 2.

Furthermore, the pitch circle of the external tooth 31 is smaller than the pitch circle of the internal tooth 21. Furthermore, in a state where the planetary gear 3 is internally tangent to the internally toothed gear 2, center C1 of the pitch circle of the external tooth 31 is at a position offset from center of the pitch circle of the internal tooth 21 (the rotation axis Ax1) by a distance ΔL (referring to FIG. 4). Therefore, at least a part of the external teeth 31 faces the internal teeth 21 with a gap there-between, there is no situation where all the external teeth and the internal teeth are meshed with each other in a circumferential direction. However, the planetary gear 3 swings (revolves) around the rotation axis Ax1 on the inner side of the internally toothed gear 2, so that the external teeth 31 are partially meshed with the internal teeth 21. That is, as shown in FIG. 4, a part of multiple teeth constituting the external teeth 31 are meshed with a part of multiple teeth constituting the internal teeth 21, by the planetary gear 3 swinging around the rotation axis Ax1. As a result, in the gear device 1, a part of the external teeth 31 may be meshed with a part of the internal teeth 21.

Here, tooth number of the internal teeth 21 in the internally toothed gear 2 is greater than tooth number of the external teeth 31 of the planetary gear 3 by N (N is a positive integer). In the basic structure, as an example, N is "1", so that the tooth number (of the external teeth 31) of the planetary gear 3 is greater than the tooth number (of the internal teeth 21) of the internally toothed gear 2 by "1". In this way, a difference between tooth numbers of the planetary gear 3 and the internally toothed gear 2 specifies a reduction ratio of output rotation relative to input rotation in the gear device 1.

Furthermore, in the basic structure, as an example, thickness of the planetary gear 3 is smaller than thickness of the gear body 22 in the internally toothed gear 2. Furthermore, size in a tooth direction (a direction parallel to the rotation axis Ax1) of the external tooth 31 is smaller than size in a tooth direction (a direction parallel to the rotation axis Ax1) of the internal tooth 21. In other words, in the direction parallel to the rotation axis Ax1, the external tooth 31 is received in a range of the tooth direction of the internal tooth 21.

In the basic structure, as described above, rotation of the planetary gear 3 corresponding to a self-rotation component is taken out, as rotation (output rotation) of an output shaft integrated with the inner ring 61 of the bearing member 6. Therefore, the planetary gear 3 is connected to the inner ring 61 by multiple inner pins 4. As shown in FIG. 5A and FIG. 5B, multiple inner pin holes 32 for inserting multiple inner pins 4 are formed in the planetary gear 3. The inner pin holes 32 are configured to have the same number as that of the inner pins 4. In the basic structure, as an example, the inner pin holes 32 and the inner pins 4 are configured as 18 inner pin holes and 18 inner pins respectively. Each of multiple inner pin holes 32 is a hole opened in a circular shape and penetrating the planetary gear 3 in a thickness direction. Multiple (here, 18) inner pin holes 32 are arranged at equal intervals along a circumferential direction on a virtual circle concentric with the opened portion 33.

Multiple inner pins 4 are components connecting the planetary gear 3 to the inner ring 61 of the bearing member 6. Each of multiple inner pins 4 is formed in a cylindrical shape. Diameters and lengths of multiple inner pins 4 are the same in multiple inner pins 4. The diameter of the inner pin 4 is smaller than diameter of the inner pin hole 32. Therefore, the inner pin 4 is inserted into the inner pin hole 32 in a state of ensuring a margin of space (gap) between the inner pin and the inner peripheral surface 321 of the inner pin hole 32 (referring to FIG. 4).

The bearing member 6 is a component provided with an outer ring 62 and an inner ring 61 and taking output of the gear device 1 out as rotation of the inner ring 61 relative to the outer ring 62. Besides the outer ring 62 and the inner ring 61, the bearing member 6 is provided with multiple rolling bodies 63 (referring to FIG. 3).

As shown in FIG. 6A and FIG. 6B, each of the outer ring 62 and the inner ring 61 is an annular component. Each of the outer ring 62 and the inner ring 61 has a circular ring shape which is a perfect circle when it is observed in a top view. The inner ring 61 is smaller than the outer ring 62 and is arranged on the inner side of the outer ring 62. Here, inner diameter of the outer ring 62 is greater than outer diameter of the inner ring 61, and thus a gap is generated between an inner peripheral surface of the outer ring 62 and an outer peripheral surface of the inner ring 61.

The inner ring 61 is provided with multiple holding holes 611 into which multiple inner pins 4 are inserted respectively. The holding holes 611 are configured to have the same number as that of the inner pins 4. In the basic structure, as an example, the holding holes 611 are configured as 18 holding holes. As shown in FIG. 6A and FIG. 6B, each of multiple holding holes 611 is a hole opened in a circular shape and penetrating the inner ring 61 in a thickness direction. Multiple (here, 18) holding holes 611 are arranged at equal intervals along a circumferential direction on a virtual circle concentric with outer periphery of the inner ring 61. Diameter of the holding hole 611 is greater than diameter of the inner pin 4 and is smaller than diameter of the inner pin hole 32.

Furthermore, the inner ring 61 is integrated with the output shaft, and rotation of the inner ring 61 is taken out, as rotation of the output shaft. Therefore, multiple output-side mounting holes 612 (referring to FIG. 2) for mounting the output shaft are formed in the inner ring 61. In the basic structure, multiple output-side mounting holes 612 are at an inner side compared to multiple holding holes 611 and are arranged on a virtual circle concentric with the outer periphery of the inner ring 61.

The outer ring 62 and the gear body 22 of the internally toothed gear 2 are fixed together to a fixing member such as the housing 10 or the like. Therefore, multiple through-holes 621 for fixing are formed in the outer ring 62. Specifically, as shown in FIG. 3, the outer ring 62 is fixed to the housing 10 by fixing screws (bolts) 60 passing through the through-holes 621 and the fixing holes 222 of the gear body 22, in a state where the gear body 22 is sandwiched between the outer ring and the housing 10.

Multiple rolling bodies 63 are arranged in a gap between the outer ring 62 and the inner ring 61. Multiple rolling bodies 63 are arranged side-by-side along a circumferential direction of the outer ring 62. Multiple rolling bodies 63 are all metal components with the same shape, and are arranged at equal intervals in the whole area along the circumferential direction of the outer ring 62.

In the basic structure, as an example, the bearing member 6 is a cross roller bearing. That is, the bearing member 6 is provided with cylindrical rollers as the rolling bodies 63. Furthermore, axis of the rolling body 63 with a cylindrical shape has an inclination of 45 degrees with respect to a plane orthogonal to the rotation axis Ax1, and is orthogonal to the outer periphery of the inner ring 61. Furthermore, a pair of rolling bodies 63 adjacent to each other in a circumferential direction of the inner ring 61 are configured to be oriented orthogonal to each other axially. In such bearing member 6 composed of the cross roller bearing, a radial load, load in a thrust direction (in the direction of the rotation axis Ax1) and a bending force (bending moment load) for the rotation axis Ax1 are all easily born. Furthermore, these three loads may be tolerated by one bearing member 6, thereby ensuring rigidity.

As shown in FIG. 7A and FIG. 7B, the eccentric shaft 7 is a cylindrical component. The eccentric shaft 7 is provided with an axis portion 71 and an eccentric portion 72. The axis portion 71 has a cylindrical shape of which at least an outer peripheral surface is a perfect circle when it is observed in a top view. Center (central axis) of the axis portion 71 is consistent with the rotation axis Ax1. The eccentric portion 72 has a disc shape of which at least an outer peripheral surface is a perfect circle when it is observed in a top view. Center (central axis) of the eccentric portion 72 is consistent with the center C1 offset from the rotation axis Ax1. Here, a distance ΔL between the rotation axis Ax1 and the center C1 (referring to FIG. 7B) becomes an eccentric amount of the eccentric portion 72 relative to the axis portion 71. The eccentric portion 72 has a flange shape protruding from an outer peripheral surface of the axis portion 71 at a central portion in a length direction (axial direction) of the axis portion 71, over the entire circumference. According to the above structure, as to the eccentric shaft 7, the eccentric portion 72 eccentrically moves by the axis portion 71 rotating (self-rotation) with the rotation axis Ax1 as a center.

In the basic structure, the axis portion 71 and the eccentric portion 72 are integrally formed by a metal member, so that a seamless eccentric shaft 7 is obtained. The eccentric shaft 7 with such a shape and the eccentric body bearing 5 is combined together in the planetary gear 3. Therefore, when the eccentric shaft 7 rotates in a state where the eccentric body bearing 5 and the eccentric shaft 7 are combined in the planetary gear 3, the planetary gear 3 swings around the rotation axis Ax1.

Furthermore, the eccentric shaft 7 is provided with a through-hole 73 penetrating the axis portion 71 in an axial direction (length direction). The through-hole 73 is opened in a circular shape on both end surfaces of the axis portion 71 in the axial direction. Center (central axis) of the through-hole 73 is consistent with the rotation axis Ax1. Cables such as a power line, a signal line, or the like may pass through the through-hole 73.

Furthermore, in the basic structure, a rotation force as input is applied from the driving source 101 to the eccentric shaft 7. Therefore, multiple input-side mounting holes 74 for mounting an input shaft connected to the driving source 101 are formed in the eccentric shaft 7 (referring to FIG. 7A and FIG. 7B). In the basic structure, multiple input-side mounting holes 74 are arranged around the through-hole 73 on an end surface in the axial direction of the axis portion 71 and are arranged on a virtual circle concentric with the through-hole 73.

The eccentric body bearing 5 is a component which is provided with the eccentric body outer ring 52 and the eccentric body inner ring 51, absorbs a self-rotation component in rotation of the eccentric shaft 7, and transmits rotation of the eccentric shaft 7 other than the self-rotation component of the eccentric shaft 7, that is, only a swinging component (revolution component) of the eccentric shaft 7 to the planetary gear 3. Besides the eccentric body outer ring 52 and the eccentric body inner ring 51, the eccentric body bearing 5 is further provided with multiple rolling bodies 53 (referring to FIG. 3).

Each of the eccentric body outer ring 52 and the eccentric body inner ring 51 is an annular component. Each of the eccentric body outer ring 52 and the eccentric body inner ring 51 has a circular ring shape which is a perfect circle when it is observed in a top view. The eccentric body inner ring 51 is smaller than the eccentric body outer ring 52 and is arranged on an inner side of the eccentric body outer ring 52. Here, inner diameter of the eccentric body outer ring 52 is greater than outer diameter of the eccentric body inner ring 51, and thus a gap is generated between an inner peripheral surface of the eccentric body outer ring 52 and an outer peripheral surface of the eccentric body inner ring 51.

Multiple rolling bodies 53 are arranged in the gap between the eccentric body outer ring 52 and the eccentric body inner ring 51. Multiple rolling bodies 53 are arranged side-by-side along a circumferential direction of the eccentric body outer ring 52. Multiple rolling bodies 53 are all metal components with the same shape, and are arranged at equal intervals in the whole area along the circumferential direction of the eccentric body outer ring 52. In the basic structure, as an example, the eccentric body bearing 5 is composed of a deep groove ball bearing using balls as the rolling bodies 53.

Here, inner diameter of the eccentric body inner ring 51 is consistent with outer diameter of the eccentric portion 72 of the eccentric shaft 7. The eccentric body bearing 5 is combined with the eccentric shaft 7 in a state where the eccentric portion 72 of the eccentric shaft 7 is inserted into the eccentric body inner ring 51. Furthermore, outer diameter of the eccentric body outer ring 52 is consistent with inner diameter (diameter) of the opened portion 33 of the planetary gear 3. The eccentric body bearing 5 is combined with the planetary gear 3 in a state where the eccentric body outer ring 52 is embedded in the opened portion 33 of the planetary gear 3. In other words, the eccentric body bearing 5 in a state of fitting in the eccentric portion 72 of the eccentric shaft 7 is received in the opened portion 33 of the planetary gear 3.

Furthermore, in the basic structure, as an example, size of the eccentric body inner ring 51 of the eccentric body bearing 5 in a width direction (a direction parallel to the rotation axis Ax1) is substantially the same as thickness of the eccentric portion 72 of the eccentric shaft 7. Size of the eccentric body outer ring 52 in a width direction (a direction parallel to the rotation axis Ax1) is slightly smaller than the size of the eccentric body inner ring 51 in the width direction. Furthermore, the size of the eccentric body outer ring 52 in the width direction is greater than thickness of the planetary gear 3. Therefore, in the direction parallel to the rotation axis Ax1, the planetary gear 3 is received in a range of the eccentric body bearing 5. On the other hand, the size of the eccentric body outer ring 52 in the width direction is smaller than size in the tooth direction (a direction parallel to the rotation axis Ax1) of the internal tooth 21. Therefore, in the direction parallel to the rotation axis Ax1, the eccentric body bearing 5 is received in a range of the internally toothed gear 2.

When the eccentric shaft 7 rotates in a state where the eccentric body bearing 5 and the eccentric shaft 7 are combined in the planetary gear 3, the eccentric body inner ring 51 in the eccentric body bearing 5 rotates (eccentrically moves) around the rotation axis Ax1 offset from center C1 of the eccentric body inner ring 51. At this time, the self-rotation component of the eccentric shaft 7 is absorbed by the eccentric body bearing 5. Therefore, rotation of the eccentric shaft 7 other than the self-rotation component of the eccentric shaft 7, that is, only a swinging component (revolution component) of the eccentric shaft 7 is transmitted to the planetary gear 3 through the eccentric body bearing 5. Therefore, when the eccentric shaft 7 rotates in a state where the eccentric body bearing 5 and the eccentric shaft 7 are combined in the planetary gear 3, the planetary gear 3 swings around the rotation axis Ax1.

As shown in FIG. 8A and FIG. 8B, the support body 8 is a component formed in a ring shape and supporting multiple inner pins 4. The support body 8 is provided with multiple support holes 82 into which multiple inner pins 4 are inserted respectively. The support holes 82 are configured to have the same number as that of the inner pins 4. In the basic structure, as an example, the support holes 82 are configured as 18 support holes. As shown in FIG. 8A and FIG. 8B, each of multiple support holes 82 is a hole opened in a circular shape and penetrating the support body 8 in a thickness direction. Multiple (here, 18) support holes 82 are arranged at equal intervals along a circumferential direction on a virtual circle concentric with an outer periphery surface 81 of the support body 8. Diameter of the support hole 82 is greater than diameter of the inner pin 4 and is smaller than diameter of the inner pin hole 32. In the basic structure, as an example, the diameter of the support hole 82 is equal to diameter of the holding hole 611 formed in the inner ring 61.

As shown in FIG. 3, the support body 8 is arranged opposite to the planetary gear 3 from one side (input side) of the rotation axis Ax1. Furthermore, the support body 8 achieves a function of constraining multiple inner pins 4 by inserting multiple inner pins 4 into multiple support holes 82. Furthermore, position of the support body 8 is limited by contacting the outer peripheral surface 81 with multiple pins 23. Therefore, centering of the support body 8 is achieved by multiple pins 23, as a result, centering of multiple inner pins 4 supported by the support body 8 is also achieved by multiple pins 23. With respect to the support body 8, a detailed description is made thereto in section "(3.3) Support Body".

The first bearing 91 and the second bearing 92 are assembled on the axis portion 71 of the eccentric shaft 7 respectively. Specifically, as shown in FIG. 3, the first bearing 91 and the second bearing 92 are assembled at both sides of the eccentric portion 72 in the axis portion 71 by way of sandwiching the eccentric portion 72 there-between in a direction parallel to the rotation axis Ax1. As observed from the eccentric portion 72, the first bearing 91 is arranged on an input side of the rotation axis Ax1. As observed from the eccentric portion 72, the second bearing 92 is arranged on an output side of the rotation axis Ax1. The first bearing 91 holds the eccentric shaft 7 to be rotatable relative to the housing 10. The second bearing 92 holds the eccentric shaft 7 to be rotatable relative to the inner ring 61 of the bearing member 6. Therefore, the axis portion 71 of the eccentric shaft 7 is held to be rotatable at two sites on both sides of the eccentric portion 72 in the direction parallel to the rotation axis Ax1.

The housing 10 is cylindrical, and is provided with a flange portion 11 on the output side of the rotation axis Ax1. The flange portion 11 is formed with multiple setting holes 111 for fixing the housing 10 itself. Furthermore, an end surface of the housing 10 on the output side of the rotation axis Ax1 is formed with a bearing hole 12. The bearing hole 12 is opened in a circular shape. The first bearing 91 is mounted to the housing 10 by embedding the first bearing 91 into the bearing hole 12.

Furthermore, the end surface of the housing 10 on the output side of the rotation axis Ax1 is formed with multiple screw holes 13 around the bearing hole 12. Multiple screw holes 13 are used to fix the gear body 22 of the internally toothed gear 2 and the outer ring 62 of the bearing member 6 to the housing 10. Specifically, the fixing screw 60 is screwed into the screw hole 13 by passing through the through-hole 621 of the outer ring 62 and the fixing hole 222 of the gear body 22, thereby fixing the gear body 22 and the outer ring 62 to the housing 10.

Furthermore, as shown in FIG. 3, the gear device 1 with the basic structure further includes multiple oil seals 14, 15, 16, etc. The oil seal 14 is assembled to an end of the eccentric shaft 7 on the input side of the rotation axis Ax1, to fill a gap between the housing 10 and the eccentric shaft 7 (the axis portion 71). The oil seal 15 is assembled to an end of the eccentric shaft 7 on the output side of the rotation axis Ax1, to fill a gap between the inner ring 61 and the eccentric shaft 7 (the axis portion 71). The oil seal 16 is assembled to an end surface of the bearing member 6 on the output side of the rotation axis Ax1, to fill a gap between the inner ring 61 and the outer ring 62. A space enclosed by multiple oil seals 14, 15, 16 constitutes a lubricant holding space 17 (referring to FIG. 9). The lubricant holding space 17 includes a space between the inner ring 61 and the outer ring 62 of the bearing member 6. Furthermore, multiple pins 23, a planetary gear 3, an eccentric body bearing 5, a support body 8, a first bearing 91, a second bearing 92, or the like are received in the lubricant holding space 17.

Furthermore, a lubricant is enclosed in the lubricant holding space 17. The lubricant is liquid and may flow in the lubricant holding space 17. Therefore, when the gear device 1 is used, the lubricant enters for example meshing portions of the internal teeth 21 composed of multiple pins 23 and the external teeth 31 of the planetary gear 3. "liquid" stated in the embodiments of the disclosure includes a liquid or gel-like substance. "gel-like" as stated here refers to a state with an intermediate property between liquid and solid, including a state of a colloid composed of two phases, i.e., a liquid phase and a solid phase. For example, an emulsion where a dispersant is in a liquid phase and a dispersion substance is in a liquid phase, a suspension where a dispersion substance is in a solid phase, or the like, are referred to as a state of gel or sol which is included in "gel-like". Furthermore, a state where a dispersant is in a solid phase and a dispersion substance is in a liquid phase is also included in "gel-like". In the basic structure, as an example, the lubricant is a liquid lubrication oil (oil liquid).

In the gear device 1 with the above structure, a rotation force as input is applied to the eccentric shaft 7, and the eccentric shaft 7 rotates with the rotation axis Ax1 as a center, so that the planetary gear 3 swings (revolves) around the rotation axis Ax1. At this time, the planetary gear 3 swings in a state where the planetary gear is internally tangent to the internally toothed gear 2 on the inner side of the internally toothed gear 2 and a part of the external teeth 31 is meshed with a part of the internal teeth 21, so that a meshing position of the internal tooth 21 and the external tooth 31 moves in a circumferential direction of the internally toothed gear 2. Therefore, relative rotation corresponding to a difference between tooth numbers of the planetary gear 3 and the internally toothed gear 2 is generated between the two gears (the internally toothed gear 2 and the planetary gear 3). Furthermore, rotation (self-rotation component) of the planetary gear 3 other than the swinging component (revolution component) of the planetary gear 3, is transmitted to the inner ring 61 of the bearing member 6 through multiple inner pins 4. As a result, a rotational output which is decelerated at a relatively high reduction ratio corresponding to the difference between tooth numbers of the two gears may be obtained from an output shaft integrated with the inner ring 61.

However, as described above, in the gear device 1 of some embodiments, the difference between tooth numbers of the internally toothed gear 2 and the planetary gear 3 specifies a reduction ratio of output rotation to input rotation in the gear device 1. That is, in case that tooth number of the internally toothed gear 2 is set to "V1" and tooth number of the planetary gear 3 is set to "V2", a reduction ratio R1 is represented by equation below.

$$R1=V2/(V1-V2) \qquad (1)$$

In summary, the smaller the difference (V1−V2) between tooth numbers of the internally toothed gear 2 and the planetary gear 3, the larger the reduction ratio R1. As an example, the tooth number V1 of the internally toothed gear 2 is "52", the tooth number V2 of the planetary gear 3 is "51", and the difference (V1−V2) between tooth numbers thereof is "1", and thus the reduction ratio R1 is "51" according to the above Equation (1). In this case, as observed from the input side of the rotation axis Ax1, when the eccentric shaft 7 rotates clockwise by a circle (360 degrees) with the rotation axis Ax1 as a center, then the inner ring 61 rotates counterclockwise by an amount equivalent to the difference "1" between tooth numbers (i.e., about 7.06 degrees) with the rotation axis Ax1 as a center.

According to the gear device 1 with the basic structure, such high reduction ratio R1 may be achieved by a combination of primary gears (the internally toothed gear 2 and the planetary gear 3).

Furthermore, it is feasible as long as the gear device 1 includes at least the internally toothed gear 2, the planetary gear 3, multiple inner pins 4, the bearing member 6 and the support body 8. For example, the gear device 1 may further include a spline, bushing or the like as structural elements.

However, in case that input rotation of the high-speed rotation side such as in the gear device 1 with the basic structure is accompanied by eccentric motion, when balance of rotation bodies rotating at a high speed is not obtained, vibration or the like may occur, and thus a balance weight or the like is used sometimes to obtain weight balance. That is, a rotation body composed of at least one of the eccentric body inner ring 51 or a member (the eccentric shaft 7) rotating together with the eccentric body inner ring 51 eccentrically moves at a high speed, and thus it is preferable to obtain weight balance of the rotation body with respect to the rotation axis Ax1. In the basic structure, as shown in FIG. 3 and FIG. 4, weight balance of the rotation body with respect to the rotation axis Ax1 is obtained by providing a void 75 in a part of the eccentric portion 72 of the eccentric shaft 7.

In summary, in the basic structure, weight balance of the rotation body with respect to the rotation axis Ax1 is obtained by lightweight based on thinning a part of the rotation body (here, the eccentric shaft 7) without adding a balance weight or the like. That is, the gear device 1 with the basic structure includes the eccentric body bearing 5 which is received in the opened portion 33 formed in the planetary gear 3 and allows the planetary gear 3 to swing. The eccentric body bearing 5 is provided with an eccentric body outer ring 52 and an eccentric body inner ring 51 arranged on an inner side of the eccentric body outer ring 52. A rotation body composed of at least one of the eccentric body inner ring 51 or a member rotating together with the eccentric body inner ring 51 is observed from the rotation axis Ax1 of the eccentric body inner ring 51, and a part of the rotation body on a center C1 side of the eccentric body outer ring 52 is provided with a void 75. In the basic structure, the eccentric shaft 7 is "a member rotating together with the eccentric body inner ring 51", which is equivalent to a "rotation body". Therefore, the void 75 formed in the eccentric portion 72 of the eccentric shaft 7 is equivalent to a void 75 of the rotation body. As shown in FIG. 3 and FIG. 4, the void 75 is located at a position on the center C1 side when it is observed from the rotation axis Ax1, and thus functions to make weight balance of the eccentric shaft 7 almost equal from the rotation axis Ax1 to the circumferential direction.

More specifically, the void 75 includes a recess formed on an inner peripheral surface of a through-hole 73 penetrating the rotation body along the rotation axis Ax1 of the eccentric body inner ring 51. That is, in the basic structure, the rotation body is the eccentric shaft 7, so that the recess formed on the inner peripheral surface of the through-hole 73 penetrating the eccentric shaft 7 along the rotation axis Ax1 functions as the void 75. In this way, weight balance of the rotation body may be obtained without changing its appearance, by using the recess formed on the inner peripheral surface of the through-hole 73 as the void 75.

Figure 9:
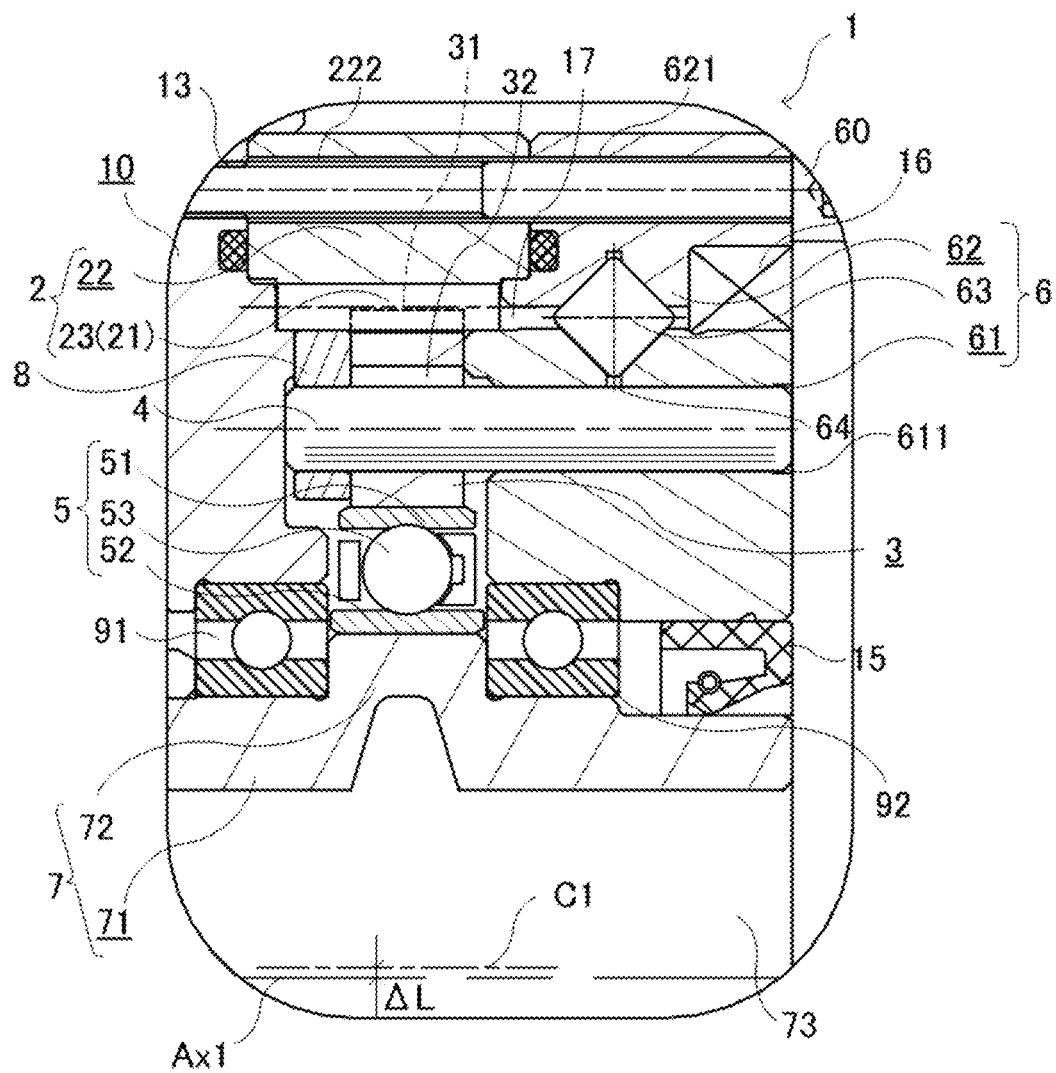
FIG. 9 is an enlarged view showing a region Z1 of FIG. 3 of the above internal-meshing planetary gear device.

Next, a self-rotation structure of the inner pin 4 of the gear device 1 with the basic structure is described in more detail with reference to FIG. 9. FIG. 9 is an enlarged view of a region Z1 of FIG. 3.

Firstly, multiple inner pins 4 are components connecting the planetary gear 3 to the inner ring 61 of the bearing member 6, as described above. Specifically, one end portion of the inner pin 4 in a length direction (in the basic structure, an end portion on the input side of the rotation axis Ax1) is inserted into the inner pin hole 32 of the planetary gear 3, and the other end portion of the inner pin 4 in the length direction (in the basic structure, an end portion on the output side of the rotation axis Ax1) is inserted into the holding hole 611 of the inner ring 61.

Here, diameter of the inner pin 4 is smaller than diameter of the inner pin hole 32, so that a gap may be ensured between the inner pin 4 and the inner peripheral surface 321 of the inner pin hole 32, and the inner pin 4 may move in the inner pin hole 32, that is, the inner pin 4 may relatively move relative to center of the inner pin hole 32. On the other hand, although diameter of the holding hole 611 is greater than diameter of the inner pin 4, diameter of the holding hole 611 is smaller than diameter of the inner pin hole 32. In the basic structure, diameter of the holding hole 611 is approximately the same as diameter of the inner pin 4, and is slightly greater than diameter of the inner pin 4. Therefore, movement of the inner pin 4 in the holding hole 611 is limited, that is, relative movement of the inner pin 4 relative to center of the holding hole 611 is inhibited. Therefore, the inner pin 4 is held in the planetary gear 3 in a state where it is able to revolve in the inner pin hole 32 and is held in a state where it is unable to revolve in the holding hole 611 relative to the inner ring 61. Therefore, the swinging component of the planetary gear 3, i.e., the revolution component of the planetary gear 3, is absorbed by play-embedding of the inner pin 4 to the inner pin hole 32, and rotation (self-rotation component) of the planetary gear 3 other than the swinging component (revolution component) of the planetary gear 3, is transmitted to the inner ring 61 through multiple inner pins 4.

However, in the basic structure, diameter of the inner pin 4 is slightly greater than diameter of the holding hole 611, therefore in a state where the inner pin 4 is inserted into the holding hole 611, the inner pin 4 may self-rotate in the holding hole 611 although revolution of the inner pin 4 in the holding hole 611 is inhibited. That is, even though the inner pin 4 is in a state of inserting into the holding hole 611, the inner pin 4 may self-rotate in the holding hole 611 since the inner pin 4 is not pressed into the holding hole 611. In this way, in the gear device 1 with the basic structure, each of multiple inner pins 4 is held by the inner ring 61 in a self-rotatable state, and thus when the inner pin 4 revolves in the inner pin hole 32, the inner pin 4 itself may self-rotate.

In summary, in the basic structure, the inner pin 4 is held in a state of self-rotating and revolving in the inner pin hole 32 relative to the planetary gear 3, and is held in a state of only self-rotating in the holding hole 611 relative to the inner ring 61. That is, multiple inner pins 4 may rotate (revolve) with the rotation axis Ax1 as a center and may revolve in multiple inner pin holes 32 in a state where self-rotation of multiple inner pins 4 are not constrained (in a self-rotatable state). Therefore, when rotation (self-rotation component) of the planetary gear 3 is transmitted to the inner ring 61 by multiple inner pins 4, the inner pin 4 may revolve and self-rotate in the inner pin hole 32 while self-rotate in the holding hole 611. Therefore, when the inner pin 4 revolves in the inner pin hole 32, the inner pin 4 is in a self-rotatable state, so that the inner pin 4 rolls relative to the inner peripheral surface 321 of the inner pin hole 32. In other words, the inner pin 4 revolves in the inner pin hole 32 by way of rolling on the inner peripheral surface 321 of the inner pin hole 32, so that it is difficult to generate loss caused by a frictional resistance between the inner peripheral surface 321 of the inner pin hole 32 and the inner pin 4.

In this way, in the structure with the basic structure, since it is originally difficult to generate loss caused by a frictional resistance between the inner peripheral surface 321 of the inner pin hole 32 and the inner pin 4, inner rollers may be omitted. Therefore, in the basic structure, each of multiple inner pins 4 adopts a structure in direct contact with the inner peripheral surface 321 of the inner pin hole 32. That is, in the basic structure, there is formed a structure where the inner pin 4 in a state of not equipping inner rollers is inserted into the inner pin hole 32 so that the inner pin 4 is in direct contact with the inner peripheral surface 321 of the inner pin hole 32. Therefore, inner rollers may be omitted, and diameter of the inner pin hole 32 may be suppressed to a small extent, so that the planetary gear 3 may be miniaturized (especially to have a small diameter), and the whole gear device 1 may also be (e.g., easily) miniaturized. For a given size of the planetary gear 3, the number (amount) of inner pins 4 may also be increased to smooth transmission of the rotation, or the inner pin 4 becomes thicker to improve strength. Furthermore, the number of components may be suppressed according to the number corresponding to inner rollers, thereby contributing to low cost of the gear device 1.

Furthermore, in the gear device 1 with the basic structure, at least a part of each of multiple inner pins 4 is arranged at the same position as the bearing member 6 in an axial direction of the bearing member 6. That is, as shown in FIG. 9, at least a part of the inner pin 4 is arranged at the same position as the bearing member 6 in a direction parallel to the rotation axis Ax1. In other words, at least a part of the inner pin 4 is located between both end surfaces of the bearing member 6 in the direction parallel to the rotation axis Ax1. Furthermore, in other words, at least a part of each of multiple inner pins 4 is arranged on the inner side of the outer ring 62 of the bearing member 6. In the basic structure, an end portion of the inner pin 4 on the output side of the rotation axis Ax1 is at the same position as the bearing member 6 in the direction parallel to the rotation axis Ax1. In summary, the end portion of the inner pin 4 on the output side of the rotation axis Ax1 is inserted into the holding hole 611 formed in the inner ring 61 of the bearing member 6, so that at least the end portion is arranged at the same position as the bearing member 6 in the axial direction of the bearing member 6.

In this way, at least a part of each of multiple inner pins 4 is arranged at the same position as the bearing member 6 in the axial direction of the bearing member 6, so that size of the gear device 1 in the direction parallel to the rotation axis Ax1 may be suppressed to a small extent. That is, compared to a structure where the bearing member 6 is in parallel with (opposite to) the inner pin 4 along the axial direction of the bearing member 6, in the gear device 1 with the basic structure, size of the gear device 1 in the direction parallel to the rotation axis Ax1 may be reduced, thereby contributing to further miniaturization (thinning) of the gear device 1.

Here, an opened surface of the holding hole 611 on the output side of the rotation axis Ax1 is closed for example by an output shaft integrated with the inner ring 61 or the like. As a result, movement of the inner pin 4 toward the output side of the rotation axis Ax1 (right side of FIG. 9) is limited by the output shaft integrated with the inner ring 61 or the like.

Furthermore, in the basic structure, in order for the inner pin 4 to self-rotate relative to the inner ring 61 smoothly, the following structure is used. That is, a lubricant (lubrication oil) is interposed between an inner peripheral surface of the holding hole 611 formed in the inner ring 61 and the inner pin 4, so that the inner pin 4 self-rotates smoothly. Especially, in the basic structure, there is a lubricant holding space 17 for injecting the lubricant between the inner ring 61 and the outer ring 62, so that the lubricant in the lubricant holding space 17 is used to achieve smooth self-rotation of the inner pin 4.

As shown in FIG. 9, in the basic structure, the inner ring 61 is provided with multiple holding holes 611 into which multiple inner pins 4 are inserted respectively, and multiple link paths 64. Multiple link paths 64 connect the lubricant holding space 17 between the inner ring 61 and the outer ring 62 to multiple holding holes 611. Specifically, the inner ring 61 is formed with the link path 64 extending radially from a part of the inner peripheral surface of the holding hole 611, that is, a part corresponding to the rolling body 63. The link path 64 is a hole penetrating between a bottom surface of a recess (groove) for receiving the rolling body 63 in an opposite surface of the inner ring 61 opposite to the outer ring 62 and the inner peripheral surface of the holding hole 611. In other words, an opened surface of the link path 64 on the lubricant holding space 17 side is arranged at a position facing (opposite to) the rolling body 63 of the bearing member 6. The lubricant holding space 17 and the holding hole 611 are spatially connected via such link path 64.

According to the above structure, since the lubricant holding space 17 is connected to the holding hole 611 by the link path 64, the lubricant in the lubricant holding space 17 is supplied to the holding hole 611 through the link path 64. That is, the rolling body 63 functions as a pump when the bearing member 6 operates and the rolling body 63 rolls, to supply the lubricant in the lubricant holding space 17 to the holding hole 611 through the link path 64. In particular, the opened surface of the link path 64 on the lubricant holding space 17 side is at the position facing (opposite to) the rolling body 63 of the bearing member 6, therefore the rolling body 63 effectively functions as a pump when the rolling body 63 rotates. As a result, the lubricant is interposed between the inner peripheral surface of the holding hole 611 and the inner pin 4, which may achieve smooth self-rotation of the inner pin 4 relative to the inner ring 61.

Figure 10:
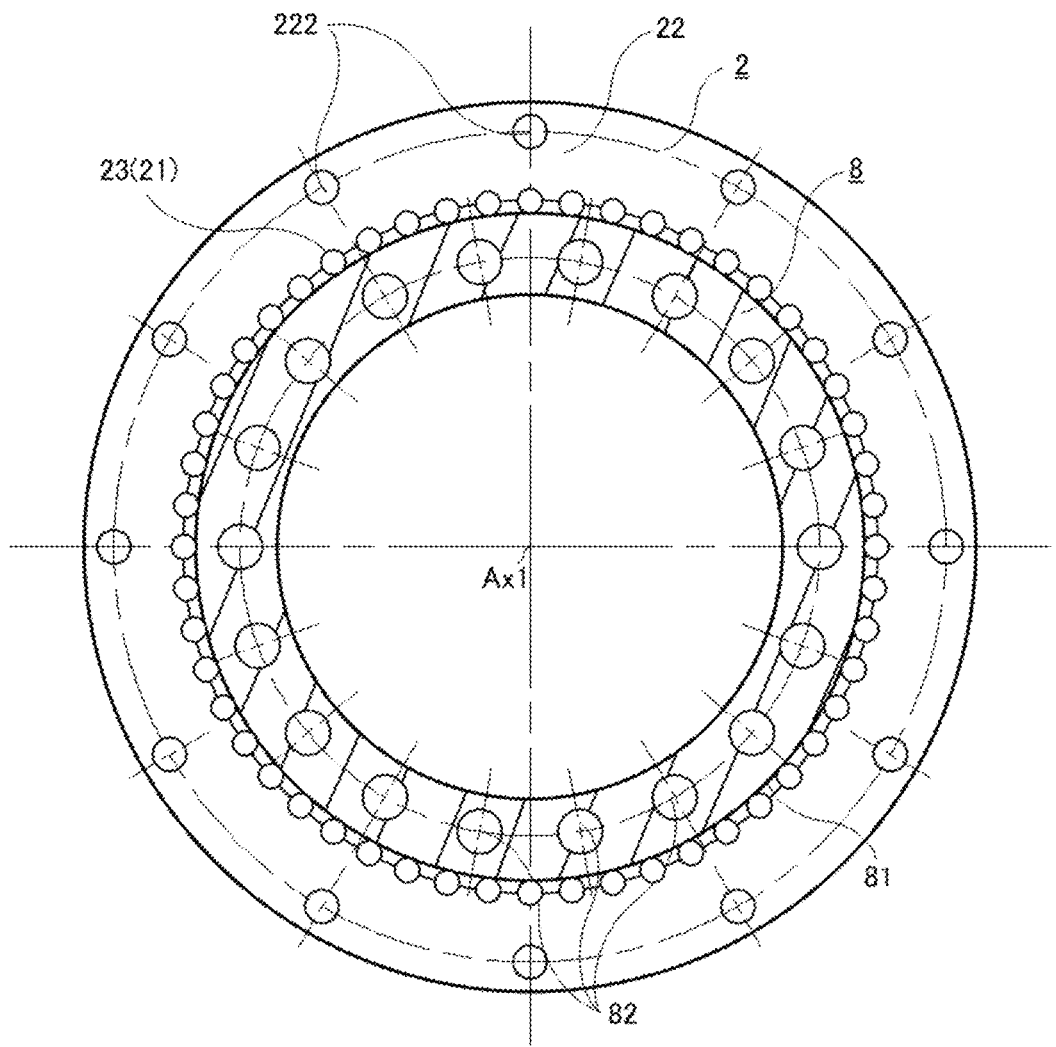
FIG. 10 is a cross-sectional view showing a line B1-B1 of FIG. 3 of the above internal-meshing planetary gear device.

Next, a structure of the support body 8 of the gear device 1 with the basic structure is described in more detail with reference to FIG. 10. FIG. 10 is a cross-sectional view of a line B1-B1 of FIG. 3. However, in FIG. 10, cross-sectional lines are omitted for components other than the support body 8, even though they are shown in cross-section. Furthermore, in FIG. 10, only the internally toothed gear 2 and the support body 8 are shown, and illustration of other components (inner pins 4, or the like) are omitted. Furthermore, in FIG. 10, illustration of the inner peripheral surface 221 of the gear body 22 is omitted.

Firstly, the support body 8 is a component supporting multiple inner pins 4, as described above. That is, the support body 8 disperses load acting on multiple inner pins 4 when rotation (self-rotation component) of the planetary gear 3 is transmitted to the inner ring 61, by constraining multiple inner pins 4. Specifically, there are multiple support holes 82 into which multiple inner pins 4 are inserted respectively. In the basic structure, as an example, diameter of the support hole 82 is equal to diameter of the holding hole 611 formed in the inner ring 61. Therefore, the support body 8 supports multiple inner pins 4 in a state where each of multiple inner pins 4 is self-rotatable. That is, each of multiple inner pins 4 is held in a state where it is self-rotatable relative to the support body 8 and the inner ring 61 of the bearing member 6.

In this way, the support body 8 performs positioning of multiple inner pins 4 relative to the support body 8 in both circumferential and radial directions. That is, movement of the inner pin 4 with respect to all directions in a plane orthogonal to the rotation axis Ax1 is limited by inserting into the support hole 82 of the support body 8. Therefore, the inner pin 4 is positioned not only in the circumferential direction but also in the radial direction (radially) by the support body 8.

Here, the support body 8 has a circular ring shape of which at least the outer peripheral surface 81 is a perfect circle when it is observed in a top view. Furthermore, position of the support body 8 is limited by contacting the outer peripheral surface 81 with multiple pins 23 in the internally toothed gear 2. In other words, since multiple pins 23 constitute the internal teeth 21 of the internally toothed gear 2, position of the support body 8 is limited by contacting the outer peripheral surface 81 with the internal teeth 21. Here, diameter of the outer peripheral surface 81 of the support body 8 is the same as diameter of a virtual circle (addendum circle) passing through a front end of the internal tooth 21 of the internally toothed gear 2. Therefore, multiple pins 23 are all in contact with the outer peripheral surface 81 of the support body 8. Therefore, in a state where position of the support body 8 is limited by multiple pins 23, position of center of the support body 8 is limited in a manner that it overlaps with center of the internally toothed gear 2 (the rotation axis Ax1). Therefore, centering of the support body 8 is achieved, and as a result, centering of multiple inner pins 4 supported by the support body 8 is also achieved by multiple pins 23.

Furthermore, multiple inner pins 4 rotate (revolve) with the rotation axis Ax1 as a center, thereby transmitting rotation (self-rotation component) of the planetary gear 3 to the inner ring 61. Therefore, the support body 8 supporting multiple inner pins 4 rotates with the rotation axis Ax1 as a center, together with multiple inner pins 4 and the inner ring 61. At this time, centering of the support body 8 is achieved by multiple pins 23, so that the support body 8 rotates smoothly in a state where center of the support body 8 is kept on the rotation axis Ax1. Furthermore, the support body 8 rotates in a state where the outer peripheral surface 81 thereof is in contact with multiple pins 23, so that each of multiple pins 23 rotates (self-rotates) along with rotation of the support body 8. Therefore, the support body 8 together with the internally toothed gear 2 constitute a needle bearing (acicular roller bearing) and rotate smoothly.

That is, the outer peripheral surface 81 of the support body 8 relatively rotates relative to the gear body 22 together with multiple inner pins 4, in a state where it is tangent to multiple pins 23. Therefore, when the gear body 22 of the internally toothed gear 2 is considered as an "outer ring", the support body 8 is considered as an "inner ring", then multiple pins 23 between the gear body and the support body function as "rolling bodies (rollers)". In this way, the support body 8 together with the internal toothed gear 2 (the gear body 22 and multiple pins 23) constitute a needle bearing, and may rotate smoothly.

Furthermore, since multiple pins 23 are sandwiched between the support body 8 and the gear body 22, the support body 8 also functions as a "limiter" which suppresses movement of the pin 23 in a direction separated from the inner peripheral surface 221 of the gear body 22. That is, multiple pins 23 are sandwiched between the outer peripheral surface 81 of the support body 8 and the inner peripheral surface 221 of the gear body 22, thereby suppressing floating of multiple pins 23 from the inner peripheral surface 221 of the gear body 22. In summary, in the basic structure, movement of each of multiple pins 23 in a direction separated from the gear body 22 is limited by contacting each of multiple pins with the outer peripheral surface 81 of the support body 8.

However, as shown in FIG. 9, in the basic structure, the support body 8 is located on a side opposite to the inner ring 61 of the bearing member 6 across the planetary gear 3. That is, the support body 8, the planetary gear 3 and the inner ring 61 are arranged in parallel in the direction parallel to the rotation axis Ax1. In the basic structure, as an example, the support body 8 is located on the input side of the rotation axis Ax1 when it is observed from the planetary gear 3, and the inner ring 61 is located on the output side of the rotation axis Ax1 when it is observed from the planetary gear 3. Furthermore, the support body 8 and the inner ring 61 together support both end portions of the inner pin 4 in a length direction (a direction parallel to the rotation axis Ax1), and a center portion of the inner pin 4 in the length direction is inserted into the inner pin hole 32 of the planetary gear 3 by penetrating it. In summary, the gear device 1 with the basic structure includes a bearing member 6, the bearing member 6 is provided with an outer ring 62 and an inner ring 61, the inner ring 61 is arranged on an inner side of the outer ring 62 and is supported to be relatively rotatable relative to the outer ring 62. Furthermore, the gear body 22 is fixed to the outer ring 62. Here, the planetary gear 3 is located between the support body 8 and the inner ring 61 in an axial direction of the support body 8.

According to this structure, the support body 8 and the inner ring 61 support both end portions of the inner pin 4 in the length direction, so that it is difficult to generate inclination of the inner pin 4. In particular, it is also easy to bear a bending force (bending moment load) acting on multiple inner pins 4 for the rotation axis Ax1. Furthermore, in the basic structure, the support body 8 is sandwiched between the planetary gear 3 and the housing 10 in the direction parallel to the rotation axis Ax1. Therefore, movement of the support body 8 toward the input side of the rotation axis Ax1 (left side of FIG. 9) is limited by the housing 10. Movement of the inner pin 4 protruding from the support body 8 to the input side of the rotation axis Ax1 by penetrating the support hole 82 of the support body 8, toward the input side (left side of FIG. 9) of the rotation axis Ax1 is also limited by the housing 10.

In the basic structure, the support body 8 and the inner ring 61 are also in contact with both end portions of each of multiple pins 23 respectively. That is, as shown in FIG. 9, the support body 8 is in contact with one end portion (an end portion on the input side of the rotation axis Ax1) of the pin 23 in a length direction (a direction parallel to the rotation axis Ax1). The inner ring 61 is in contact with the other end portion (an end portion on the output side of the rotation axis Ax1) of the pin 23 in the length direction (a direction parallel to the rotation axis Ax1). According to this structure, centering of the support body 8 and the inner ring 61 are achieved at both end portions of the pin 23 in the length direction, so that it is difficult to generate inclination of the inner pin 4. In particular, it is also easy to bear the bending force (bending moment load) acting on multiple inner pins 4 for the rotation axis Ax1.

Furthermore, lengths of multiple pins 23 are greater than thickness of the support body 8. In other words, in the direction parallel to the rotation axis Ax1, the support body 8 is received in a range of the tooth direction of the internal teeth 21. Therefore, the outer peripheral surface 81 of the support body 8 is in contact with multiple pins 23 throughout the entire length in the tooth direction (a direction parallel to the rotation axis Ax1) of the internal teeth 21. Therefore, it is difficult to generate a bad condition such as "unilateral wear", that is, the outer peripheral surface 81 of the support body 8 is partially worn.

Furthermore, in the basic structure, surface roughness of the outer peripheral surface 81 of the support body 8 is smaller than surface roughness of a surface of the support body 8 adjacent to the outer peripheral surface 81. That is, surface roughness of the outer peripheral surface 81 is smaller than surface roughness of both end surfaces of the support body 8 in an axial direction (thickness direction). "surface roughness" stated in the embodiments of the disclosure refers to roughness of a surface of an object, the smaller a value thereof, the smaller (the less) a concave-convex degree of the surface, the smoother the surface. In the basic structure, as an example, surface roughness is set to an arithmetic mean roughness (Ra). For example, by grinding or other processes, surface roughness of the outer peripheral surface 81 is smaller than surface roughness of surfaces other than the outer peripheral surface 81 of the support body 8. In this structure, rotation of the support body 8 becomes smoother.

Furthermore, in the basic structure, hardness of the outer peripheral surface 81 of the support body 8 is lower than hardness of a circumferential surface of each of multiple pins 23 and is higher than hardness of the inner peripheral surface 221 of the gear body 22. "hardness" stated in the embodiments of the disclosure refers to a hard degree of an object, and hardness of a metal is represented for example by size of an indentation formed by pushing and pressing a steel ball at a certain pressure. Specifically, as an example of hardness of the metal, there are Rockwell hardness (HRC), Brinell hardness (HB), Vickers hardness (HV), or Shore hardness (HS), or the like. As a means of increasing (hardening) hardness of a metal part, there are for example alloying, or heat treatment, or the like. In the basic structure, as an example, hardness of the outer peripheral surface 81 of the support body 8 is increased by carburizing, quenching, or other processes. In this structure, even though the support body 8 rotates, it is difficult to generate wear powder or the like, so that smooth rotation of the support body 8 is easily kept for a long period of time.

Next, an application example of the gear device 1 with the basic structure and the actuator 100 is described.

The gear device 1 with the basic structure and the actuator 100 are applicable to for example a horizontal multi-joint robot, i.e., a robot such as so-called Selective Compliance Assembly Robot Arm (SCARA) type robot.

Furthermore, the application example of the gear device 1 with the basic structure and the actuator 100 is not limited to the above horizontal multi-joint robot, for example, may also be applicable to industrial robots other than the horizontal multi-joint robot, or robots other than industrial robots, or the like. As an example, in industrial robots other than the horizontal multi-joint robot, there is a vertical multi-joint robot, or a parallel link-type robot, or the like. As an example, in robots other than industrial robots, there is a home robot, a nursing robot, or a medical robot, or the like.

An internal-meshing planetary gear device 1A (hereinafter, also referred to as "gear device 1A" for abbreviation) of the implementation is shown in FIG. 11 to FIG. 17, and is mainly different from the gear device 1 with the basic structure in structures around the inner pin 4 and structures around the input shaft (the eccentric shaft 7). Hereinafter, the same structure as that in the basic structure will be marked by the same reference numeral, and descriptions thereof will be appropriately omitted.

Figure 11:
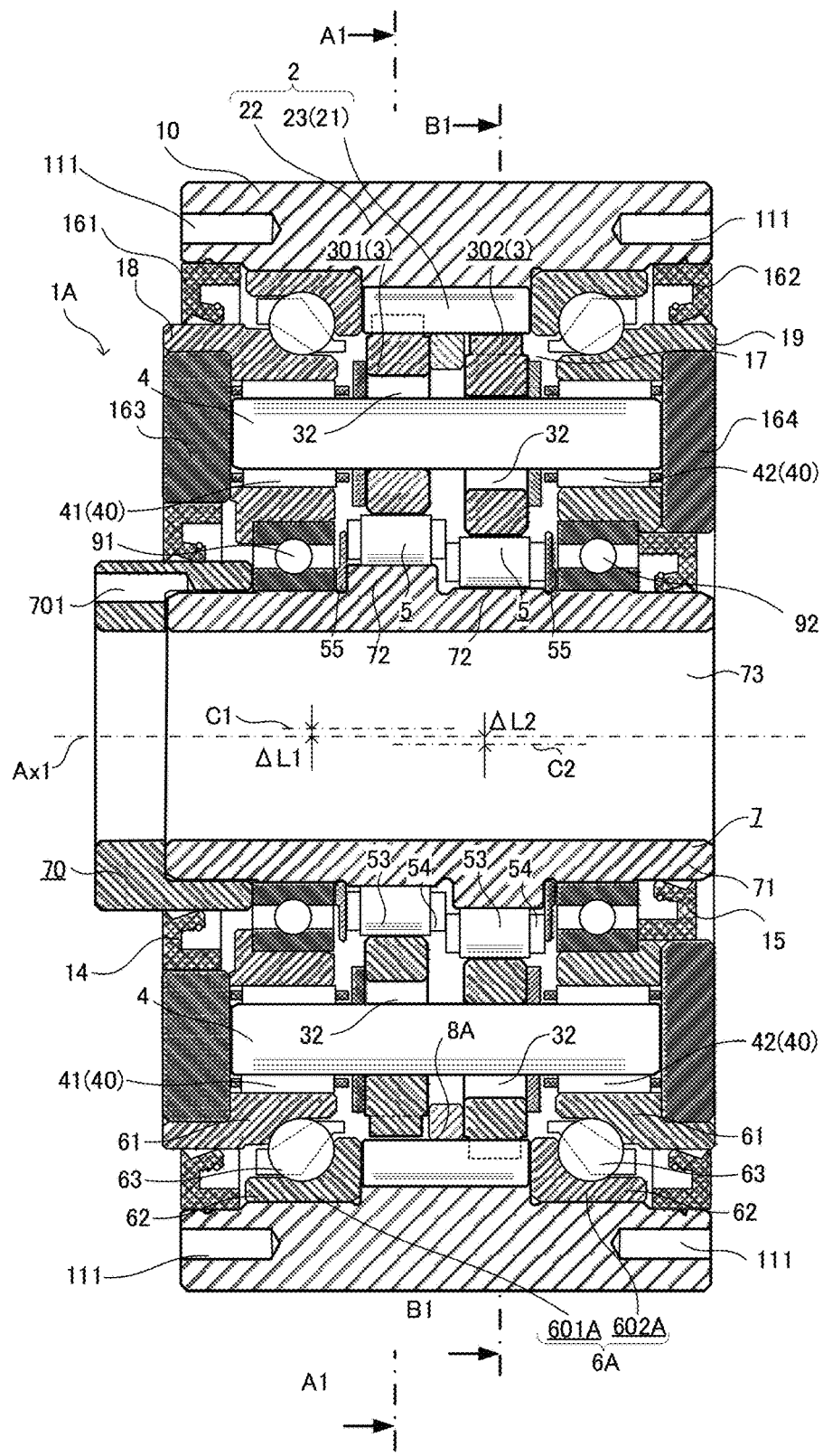
FIG. 11 is a diagrammatic cross-sectional view of an internal-meshing planetary gear device according to some embodiments.
Figure 12:
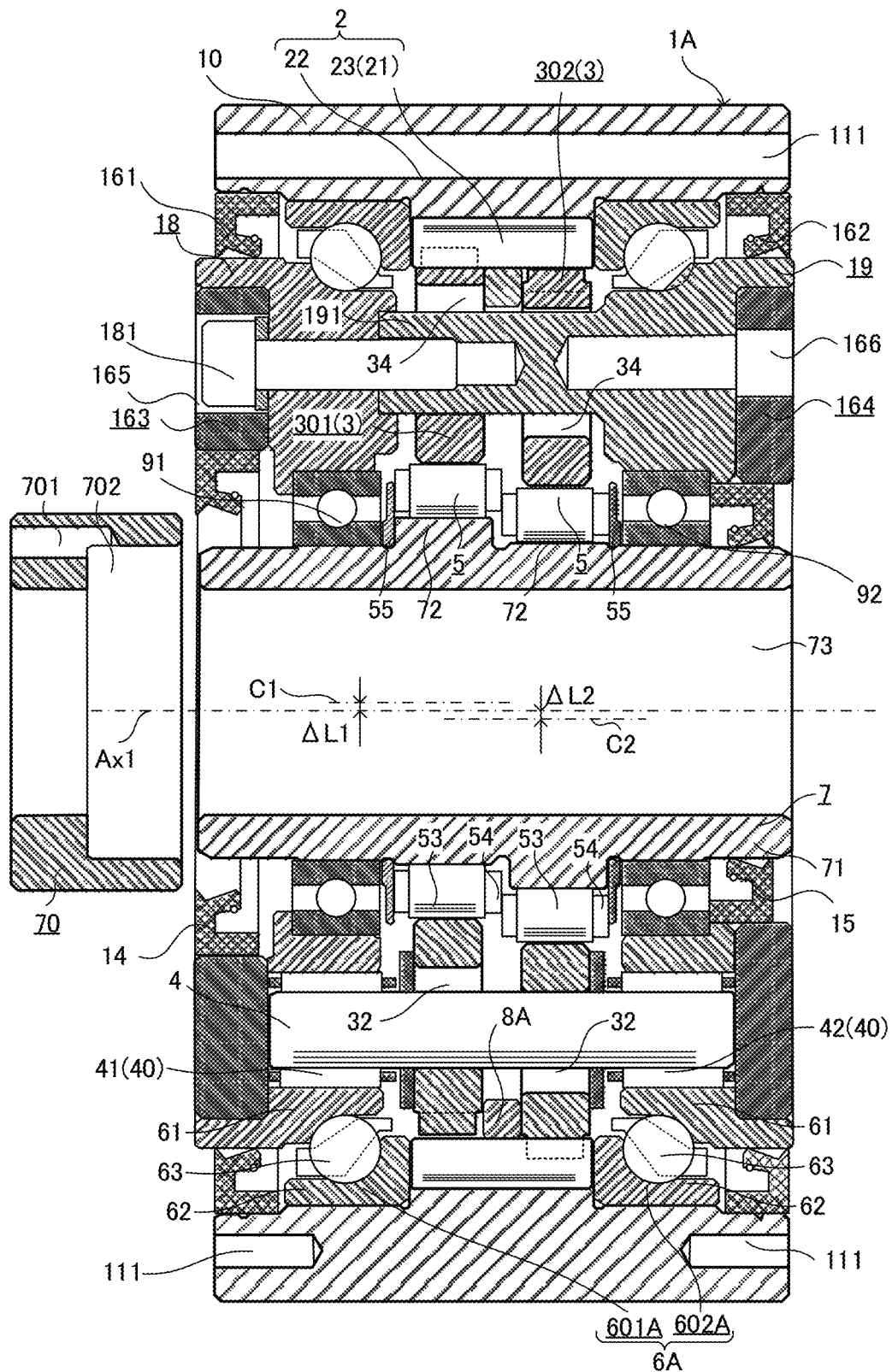
FIG. 12 is a cross-sectional view showing a line B1-A1 of FIG. 13 of the above internal-meshing planetary gear device.
Figure 13:
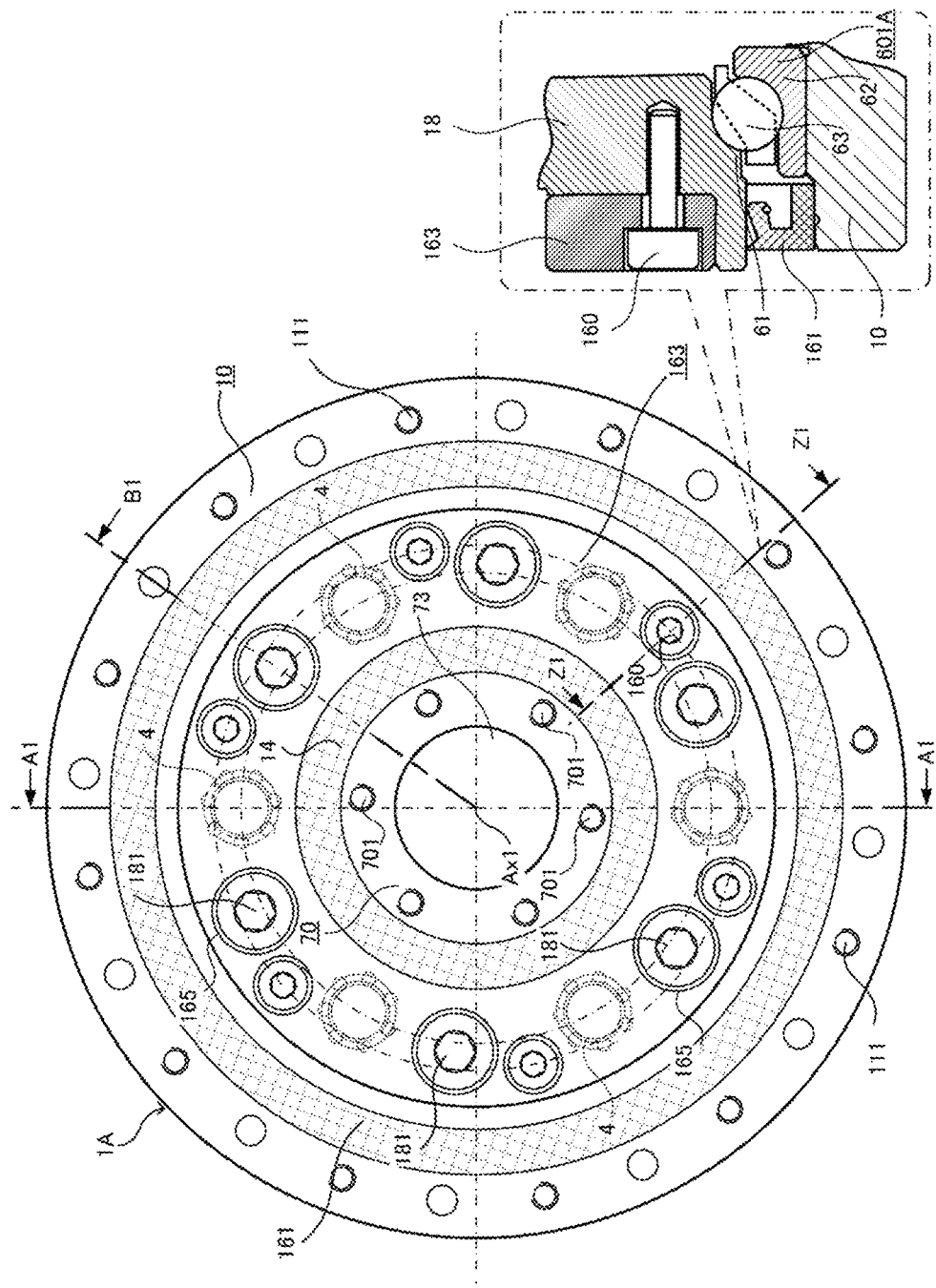
FIG. 13 is a side view of the above internal-meshing planetary gear device observed from an input side of a rotation axis.
Figure 14:
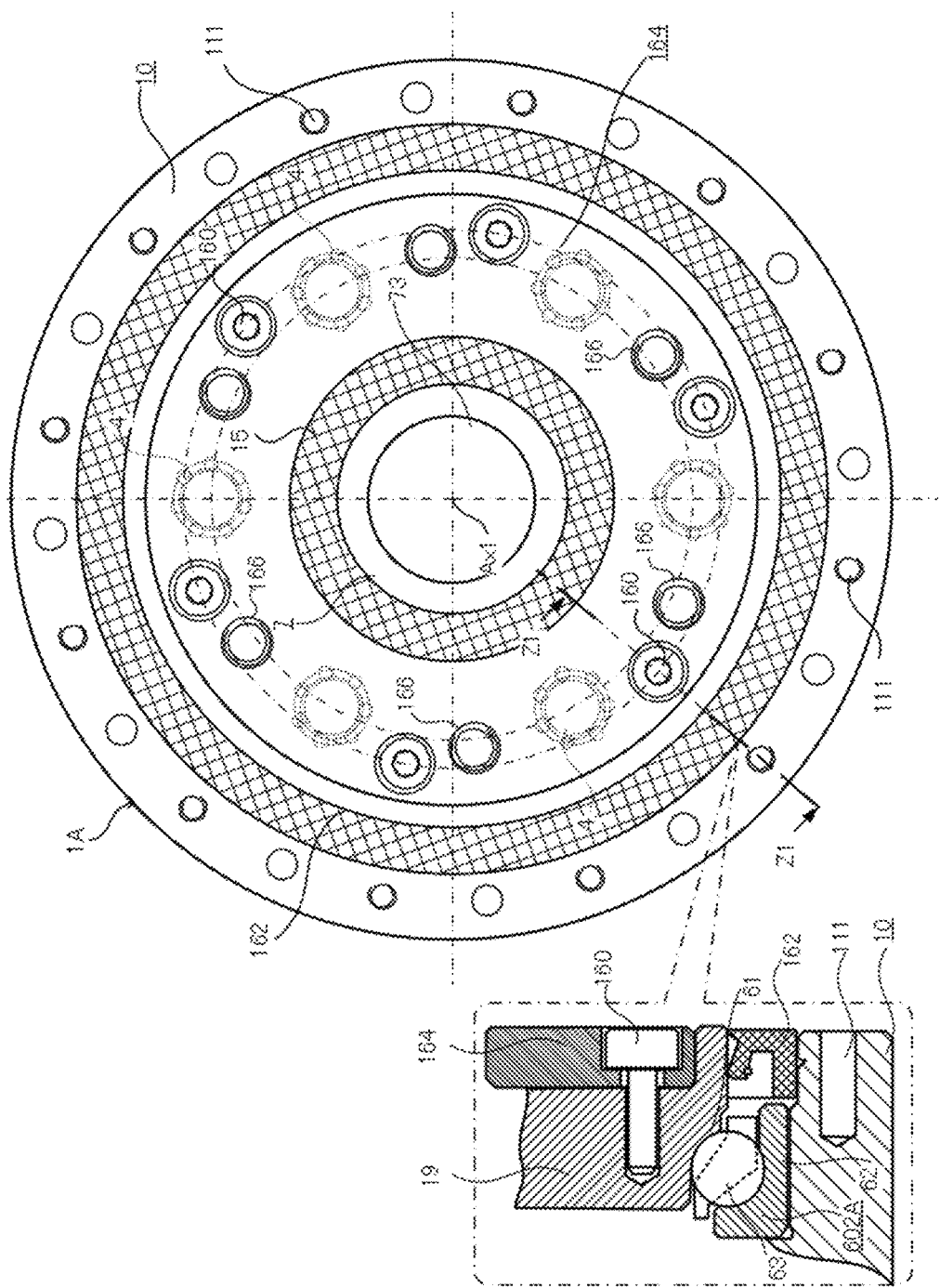
FIG. 14 is a side view of the above internal-meshing planetary gear device observed from an output side of a rotation axis.
Figure 15:
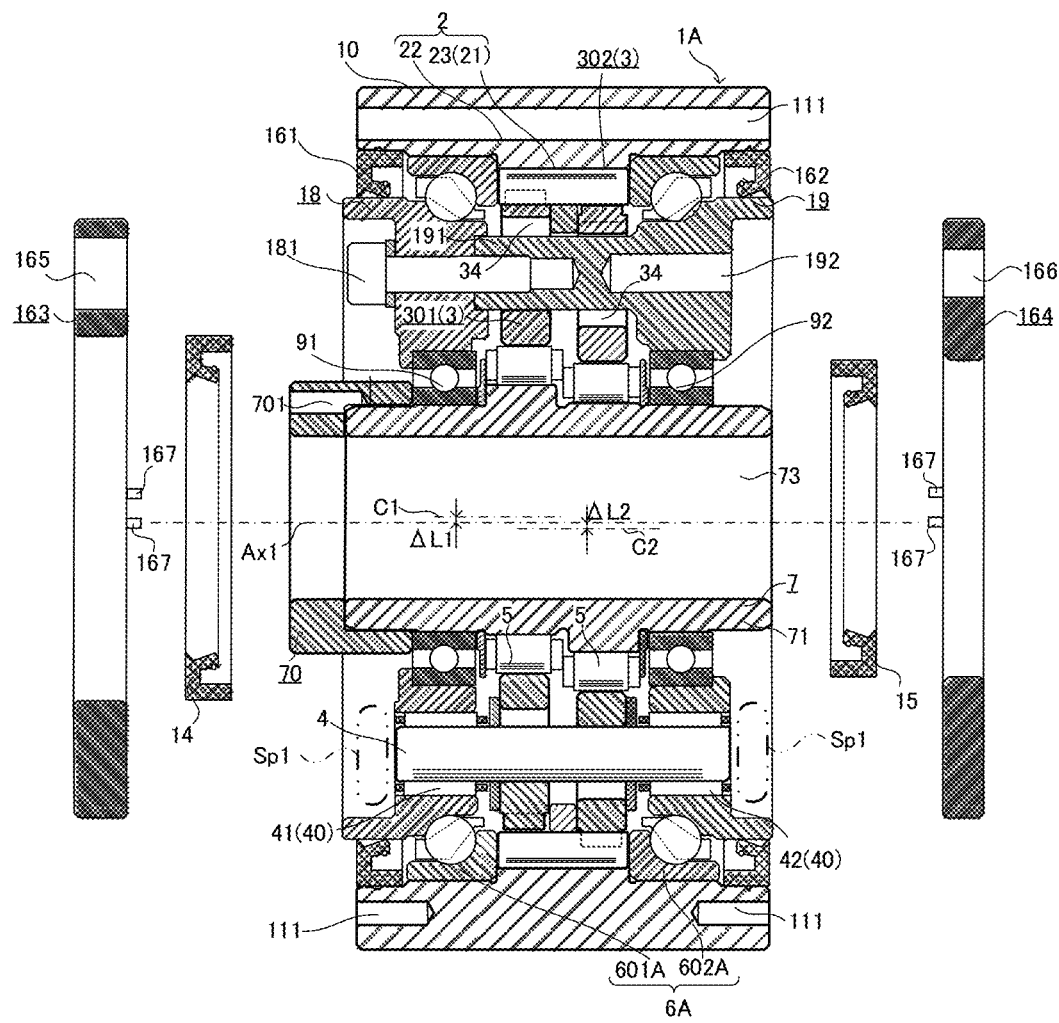
FIG. 15 is a diagrammatic cross-sectional view showing a state where a cover body and an oil seal are removed from the above internal-meshing planetary gear device.
Figure 16:
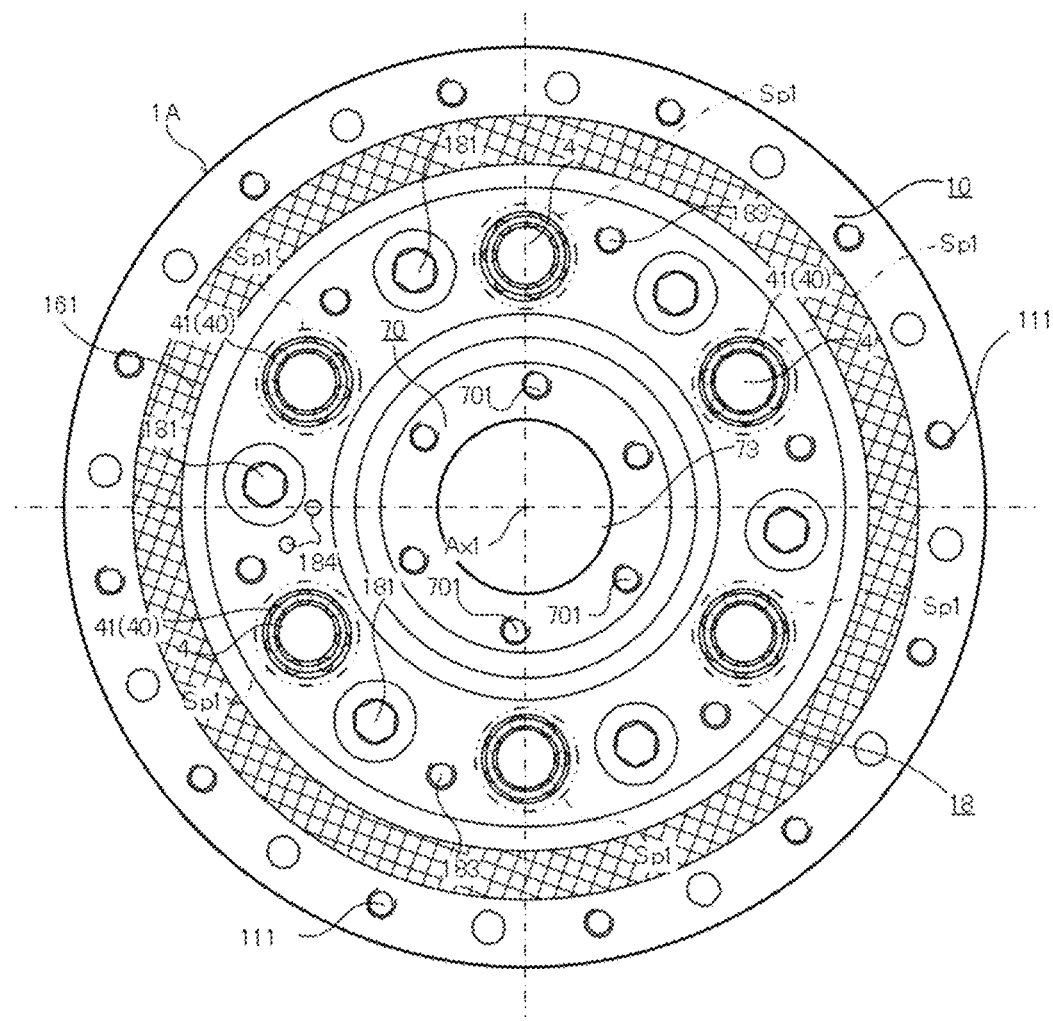
FIG. 16 is a side view observed from an input side of a rotation axis, showing a state where a cover body and an oil seal are removed from the above internal-meshing planetary gear device.
Figure 17:
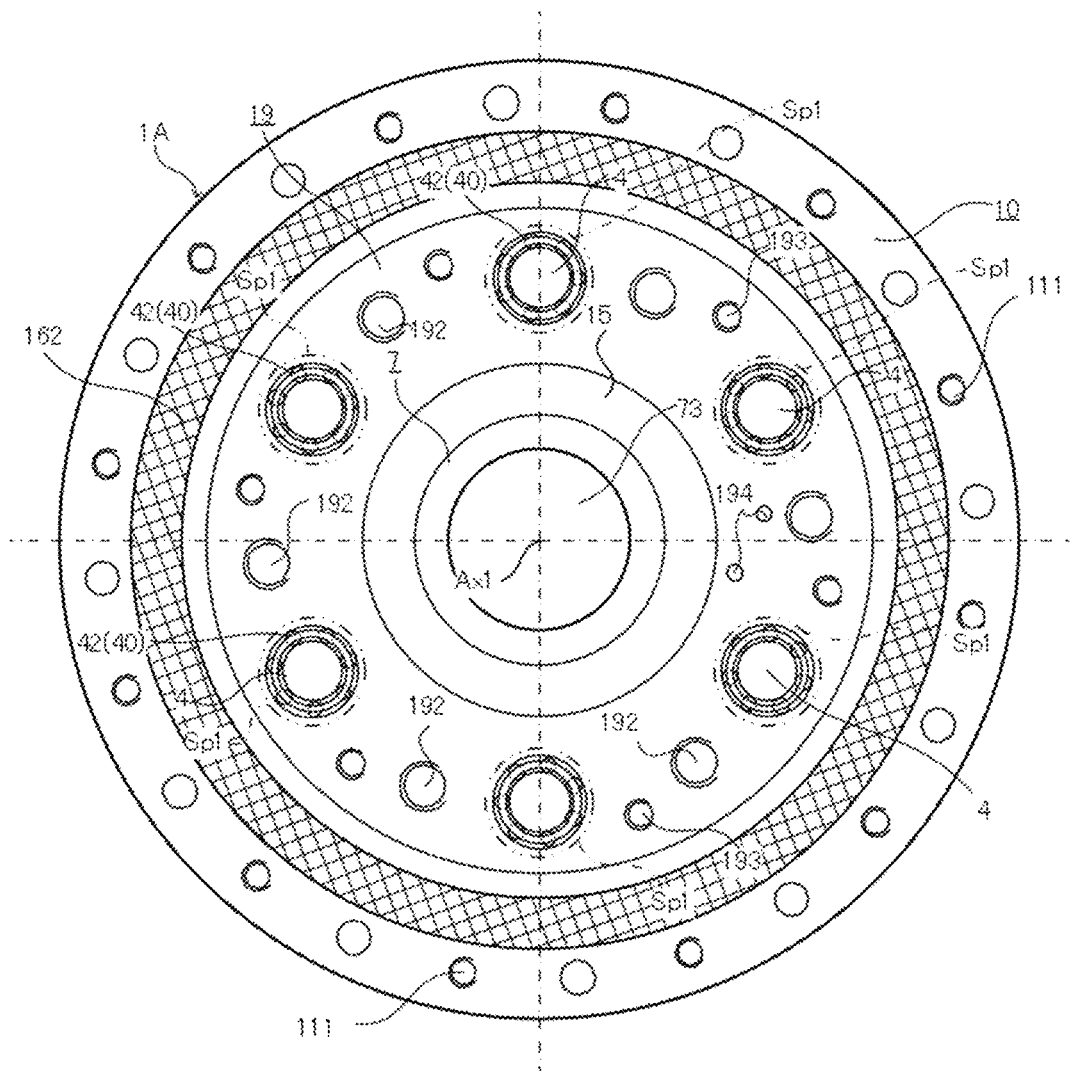
FIG. 17 is a side view observed from an output side of a rotation axis, showing a state where a cover body and an oil seal are removed from the above internal-meshing planetary gear device.

FIG. 11 is a diagrammatic cross-sectional view of the gear device 1A. FIG. 12 is a diagrammatic cross-sectional view showing a state where a bushing 70 described later is removed from the gear device 1A. FIG. 13 is a side view of the gear device 1A observed from an input side of a rotation axis Ax1 (left side of FIG. 11). FIG. 11 is equivalent to a cross-sectional view of a line A1-A1 of FIG. 13. FIG. 12 is equivalent to a cross-sectional view of a line B1-A1 of FIG. 13. FIG. 14 is a side view of the gear device 1A observed from an output side of a rotation axis Ax1 (right side of FIG. 11). Enlarged views of cross-sections of respective lines Z1-Z1 in FIG. 13 and FIG. 14 are shown in corresponding white blocks. FIG. 15 is a diagrammatic cross-sectional view showing a state where cover bodies 163, 164 and oil seals 14, 15 described later are removed. FIG. 16 is a side view of the gear device 1A observed from an input side of the rotation axis Ax1 (left side in FIG. 15), showing a state where cover bodies 163, 164 and oil seals 14, 15 are removed. FIG. 17 is a side view of the gear device 1A observed from an output side of the rotation axis Ax1 (right side in FIG. 15), showing a state where cover bodies 163, 164 and oil seals 14, 15 are removed.

As a first main difference from the basic structure, the gear device 1A of the implementation is configured such that each of multiple inner pins 4 may be removed in a state where at least the bearing member 6A, the internally toothed gear 2 and the planetary gear 3 are combined. That is, the gear device 1A includes inner pin paths Sp1 (referring to FIG. 15). The inner pin paths Sp1 are located on at least one side in a direction parallel to the rotation axis Ax1 relative to multiple inner pins 4, and are configured to remove each of multiple inner pins 4 in a state where the bearing member 6A, the internally toothed gear 2 and the planetary gear 3 are combined. Here, multiple inner pins 4 revolve in multiple inner pin holes 32 formed in the planetary gear 3 and relatively rotate relative to the internally toothed gear 2 with the rotation axis Ax1 as a center, in a state where multiple inner pins are inserted into multiple inner pin holes. Furthermore, multiple inner pins 4 are arranged on an inner side of the inner ring 61 (of the bearing member 6A) when they are observed from a direction parallel to the rotation axis Ax1.

Furthermore, as a second main difference of the gear device 1A of the implementation from the basic structure, the structure (support structure 40) supporting multiple inner pins 4 is a structure where both end portions of the inner pin 4 are held by rolling bearings 41, 42. That is, the gear device 1A includes multiple sets of rolling bearings 41, 42, and multiple sets of rolling bearings 41, 42 hold each of multiple inner pins 4 at both sides of the planetary gear 3 in a direction parallel to the rotation axis Ax1. Each of multiple inner pins 4 is held by each corresponding set of rolling bearings 41, 42 in a self-rotatable state. Furthermore, similar to the inner pin 4, rolling bodies 402 (referring to FIG. 20) of the rolling bearings 41, 42 are also configured to be removed in a state where at least the bearing member 6A, the internally toothed gear 2 and the planetary gear 3 are combined. Specifically, the rolling bodies 402 (referring to FIG. 20) of the rolling bearings 41, 42 are removed toward a side opposite to the planetary gear 3 relative to the outer ring 62 (of the bearing member 6A), in a direction parallel to the rotation axis Ax1.

Furthermore, as a third main difference of the gear device 1A of the implementation from the basic structure, the bushing 70 is provided with a fixing structure 701 to fix an object member to the eccentric shaft 7 used as an input shaft. That is, the gear device 1A includes the bushing 70 and the input shaft (the eccentric shaft 7) swinging the planetary gear 3 eccentrically. The bushing 70 is provided with the fixing structure 701 to fix the object member, and the bushing 70 is coupled to the input shaft (the eccentric shaft 7) and rotates together with the input shaft (the eccentric shaft 7).

In summary, as a main difference from the basic structure, the gear device 1A of the implementation uses a new structure around the inner pin 4, especially study of allowing removal of the inner pin 4 and study of the support structure 40 (rolling bearings 41, 42) of the inner pin 4. Furthermore, as a main difference from the basic structure, the gear device 1A uses a new structure around the input shaft (the eccentric shaft 7), especially study of the bushing 70. Here, the rolling bearings 41, 42 are fixed to the inner ring 61 of the bearing member 6A, and the inner pin 4 is held by the inner ring 61 of the bearing member 6A via the rolling bearings 41, 42. Therefore, in the gear device 1A of the implementation, contents about each of multiple inner pins 4 held by the inner ring 61 in a self-rotatable state are similar to those of the basic structure.

In the gear device 1A of the implementation, besides the above main differences (structures around the inner pin 4 and the input shaft), there are multiple differences with respect to the basic structure as described below.

As a first one of other differences, the bearing member 6A of the gear device 1A of the implementation includes a first bearing member 601A and a second bearing member 602A. Each of the first bearing member 601A and the second bearing member 602A is composed of an angular contact ball bearing, and is provided with an inner ring 61, an outer ring 62 and multiple rolling bodies 63. Each of the inner ring 61 of the first bearing member 601A and the inner ring 61 of the second bearing member 602A has a circular ring shape of which an outer peripheral surface is a perfect circle with the rotation axis Ax1 as a center when it is observed in a top view. Specifically, as shown in FIG. 11, the first bearing member 601A is arranged on the input side of the rotation axis Ax1 (left side of FIG. 11) when it is observed from the planetary gear 3, and the second bearing member 602A is arranged on the output side of the rotation axis Ax1 (right side of FIG. 11) when it is observed from the planetary gear 3. The bearing member 6A is configured to bear a radial load, load in a thrust direction (in the direction of the rotation axis Ax1) and a bending force (bending moment load) for the rotation axis Ax1, by the first bearing member 601A and the second bearing member 602A.

Here, the first bearing member 601A and the second bearing member 602A are arranged at both sides of the planetary gear 3 in the direction parallel to the rotation axis Ax1, and are configured to be oriented opposite to each other in the direction parallel to the rotation axis Ax1. That is, the bearing member 6A is a "combined angular contact ball bearing" in which multiple (here, two) angular contact ball bearings are combined. Here, as an example, the first bearing member 601A and the second bearing member 602A forms a "back side combination type" which bears load in a thrust direction (a direction along the rotation axis Ax1) where respective inner rings 61 are oriented by way of approaching each other. Furthermore, in the gear device 1A, the first bearing member 601A and the second bearing member 602A are combined in a state where an appropriate pre-pressure is applied to respective inner rings 61 by tightening the inner rings 61 in a direction of approaching each other. "pre-pressure" stated in the embodiments of the disclosure refers to a state where internal stress is always applied by applying pre-pressure, which is a so-called preload. That is, in the gear device 1A of the implementation, the rolling bodies 63 in each of the first bearing member 601A and the second bearing member 602A press against the outer ring 62 from an outer side in the direction parallel to the rotation axis Ax1.

As a second one of other differences, as shown in FIG. 11, the gear device 1A of the implementation includes a bracket flange 18 and an output flange 19. The bracket flange 18 and the output flange 19 are arranged at both sides of the planetary gear 3 in the direction parallel to the rotation axis Ax1, and are coupled to each other through bracket holes 34 of the planetary gear 3 (referring to FIG. 12). Specifically, as shown in FIG. 11, the bracket flange 18 is arranged at the input side of the rotation axis Ax1 (left side of FIG. 11) when it is observed from the planetary gear 3, and the output flange 19 is arranged at the output side of the rotation axis Ax1 (right side of FIG. 11) when it is observed from the planetary gear 3. The inner ring 61 of the bearing member 6A (each of the first bearing member 601A and the second bearing member 602A) is fixed to the bracket flange 18 and the output flange 19. In the implementation, as an example, the inner ring 61 of the first bearing member 601A is seamlessly integrated with the bracket flange 18. Likewise, the inner ring 61 of the second bearing member 602A is seamlessly integrated with the output flange 19.

The output flange 19 is provided with multiple (six, as an example) bracket pins 191 protruding from a surface of the output flange 19 toward the input side of the rotation axis Ax1 (referring to FIG. 12). Multiple bracket pins 191 penetrate through multiple (six, as an example) bracket holes 34 formed in the planetary gear 3 respectively, and front ends of multiple bracket pins 191 are fixed to the bracket flange 18 by bracket bolts 181 (referring to FIG. 12). Here, diameter of the bracket pin 191 is smaller than diameter of the bracket hole 34, and a gap is ensured between the bracket pin 191 and an inner peripheral surface of the bracket hole 34, so that the bracket pin 191 may move in the bracket hole 34, that is, may relatively move relative to center of the bracket hole 34. Furthermore, the gap between the bracket pin 191 and the inner peripheral surface of the bracket hole 34 is greater than the gap between the inner pin 4 and the inner peripheral surface 321 of the inner pin hole 32. When the inner pin 4 revolves in the inner pin hole 32, the bracket pin 191 is not in contact the inner peripheral surface of the bracket hole 34. Furthermore, multiple flange bolt holes 192 for fixing the output flange 19 itself are formed on a surface at a side of the output flange 19 opposite to the bracket pin 191 (referring to FIG. 17).

Here, both end portions of the inner pin 4 are not directly held by the inner ring 61 of the bearing member 6A, instead, held by the bracket flange 18 and the output flange 19 integrated with the inner ring 61 (via the rolling bearings 41, 42). That is, multiple inner pins 4 are indirectly held by the inner ring 61 of the bearing member 6A since multiple inner pins are held by the bracket flange 18 and the output flange 19.

Therefore, the gear device 1A is used in such a way that rotation of the planetary gear 3 corresponding to a self-rotation component is taken out, as rotation of the bracket flange 18 and the output flange 19 integrated with the inner ring 61 of the bearing member 6A. That is, in the basic structure, relative rotation between the planetary gear 3 and the internally toothed gear 2 is taken out from the inner ring 61 connected to the planetary gear 3 by the inner pins 4, as the self-rotation component of the planetary gear 3. In this regard, in the implementation, the relative rotation between the planetary gear 3 and the internally toothed gear 2 is taken out from the bracket flange 18 and the output flange 19 integrated with the inner ring 61. In the implementation, as an example, the gear device 1A is used in a state where the outer ring 62 of the bearing member 6A is fixed to a housing used as a fixing member. That is, the planetary gear 3 is connected to the bracket flange 18 and the output flange 19 used as rotation members by multiple inner pins 4, and the gear body 22 is fixed to the fixing member, so that the relative rotation between the planetary gear 3 and the internally toothed gear 2 is taken out from the rotation members (the bracket flange 18 and the output flange 19). In other words, in the implementation, when multiple inner pins 4 are configured to relatively rotate relative to the gear body 22, rotation forces of the bracket flange 18 and the output flange 19 are taken out as output.

As a third one of other differences, in the implementation, the housing 10 is seamlessly integrated with the gear body 22 of the internally toothed gear 2. That is, in the basic structure, the gear body 22 of the internally toothed gear 2 is used in a state where it is fixed to the housing 10 together with the outer ring 62 of the bearing member 6. In this regard, in the implementation, the gear body 22 used as a fixing member is provided continuously and seamlessly with the housing 10 in the direction parallel to the rotation axis Ax1.

More specifically, the housing 10 is cylindrical and forms an outer profile of the gear device 1A. In the implementation, the central axis of the cylindrical housing 10 is configured to be consistent with the rotation axis Ax1. That is, at least an outer peripheral surface of the housing 10 is a perfect circle with the rotation axis Ax1 as a center when it is observed in a top view (observed from one side in the direction of the rotation axis Ax1). The housing 10 is formed in a cylindrical shape opened at both end surfaces in the direction of the rotation axis Ax1. Here, the housing 10 is seamlessly integrated with the gear body 22 of the internally toothed gear 2, so that the housing 10 and the gear body 22 are treated as one component. Therefore, an inner peripheral surface of the housing 10 includes the inner peripheral surface 221 of the gear body 22. Furthermore, the outer ring 62 of the bearing member 6A is fixed to the housing 10. That is, the outer ring 62 of the first bearing member 601A is fixed to the input side of the rotation axis Ax1 (left side of FIG. 11) by embedding, when it is observed from the gear body 22 in the inner peripheral surface of the housing 10. On the other hand, the outer ring 62 of the second bearing member 602A is fixed to the output side of the rotation axis Ax1 (right side of FIG. 11) by embedding, when it is observed from the gear body 22 in the inner peripheral surface of the housing 10.

Furthermore, the end surface of the housing 10 on the input side of the rotation axis Ax1 (left side of FIG. 11) is closed by the bracket flange 18, and the end surface of the housing 10 on the output side of the rotation axis Ax1 (right side of FIG. 11) is closed by the output flange 19. Therefore, as shown in FIG. 11 and FIG. 12, a planetary gear 3, multiple inner pins 4, multiple pins 23, an eccentric body bearing 5 or the like are received in a space enclosed by the housing 10, the bracket flange 18 and the output flange 19. Here, the oil seal 161 fills a gap between the bracket flange 18 and the housing 10, and the oil seal 162 fills a gap between the output flange 19 and the housing 10. A space sealed by multiple oil seals 14, 15, 161, 162 constitutes a lubricant holding space 17 (referring to FIG. 11), similar to the basic structure. Multiple setting holes 111 for fixing the housing 10 itself are formed on both end surfaces of the housing 10 in the direction parallel to the rotation axis Ax1.

As a fourth one of other differences, the gear device 1A of the implementation includes multiple planetary gears 3. Specifically, the gear device 1A includes two planetary gears 3, i.e., a first planetary gear 301 and a second planetary gear 302. The two planetary gears 3 are arranged to face each other in the direction parallel to the rotation axis Ax1 (with a support ring 8A sandwiched there-between). That is, the planetary gear 3 includes the first planetary gear 301 and the second planetary gear 302 which are in parallel in the direction parallel to the rotation axis Ax1.

The two planetary gears 3 (the first planetary gear 301 and the second planetary gear 302) are arranged with a phase difference of 180 degrees around the rotation axis Ax1. In the example of FIG. 11, center C1 of the first planetary gear 301 located at the input side of the rotation axis Ax1 (left side of FIG. 11) from the first planetary gear 301 and the second planetary gear 302 is in a state of deviating (biasing) towards top of the figure with respect to the rotation axis Ax1. On the other hand, center C2 of the second planetary gear 302 located at the output side of the rotation axis Ax1 (right side of FIG. 11) is in a state of deviating (biasing) towards bottom of the figure with respect to the rotation axis Ax1. In this way, multiple planetary gears 3 are arranged evenly in the circumferential direction with the rotation axis Ax1 as a center, thereby obtaining weight balance among multiple planetary gears 3. In the gear device 1A of the implementation, weight balance is obtained among multiple planetary gears 3 as above, so that the void 75 of the eccentric shaft 7 is omitted (referring to FIG. 3).

In more detail, the eccentric shaft 7 is provided with two eccentric portions 72 for an axis portion 71. Centers (center axes) of the two eccentric portions 72 are consistent with centers C1 and C2 deviated from the rotation axis Ax1 respectively. Furthermore, the first planetary gear 301 and the second planetary gear 302 themselves have the same shape. Furthermore, the eccentric body bearing 5 in a state of fitting in the eccentric portion 72 with the center C1 as a center is received in an opened portion 33 of the first planetary gear 301. The eccentric body bearing 5 in a state of fitting in the eccentric portion 72 with the center C2 as a center is received in an opened portion 33 of the second planetary gear 302. Here, a distance ΔL1 between the rotation axis Ax1 and the center C1 is an eccentric amount of the first planetary gear 301 relative to the rotation axis Ax1, and a distance ΔL2 between the rotation axis Ax1 and the center C2 is an eccentric amount of the second planetary gear 302 relative to the rotation axis Ax1.

Figure 18:
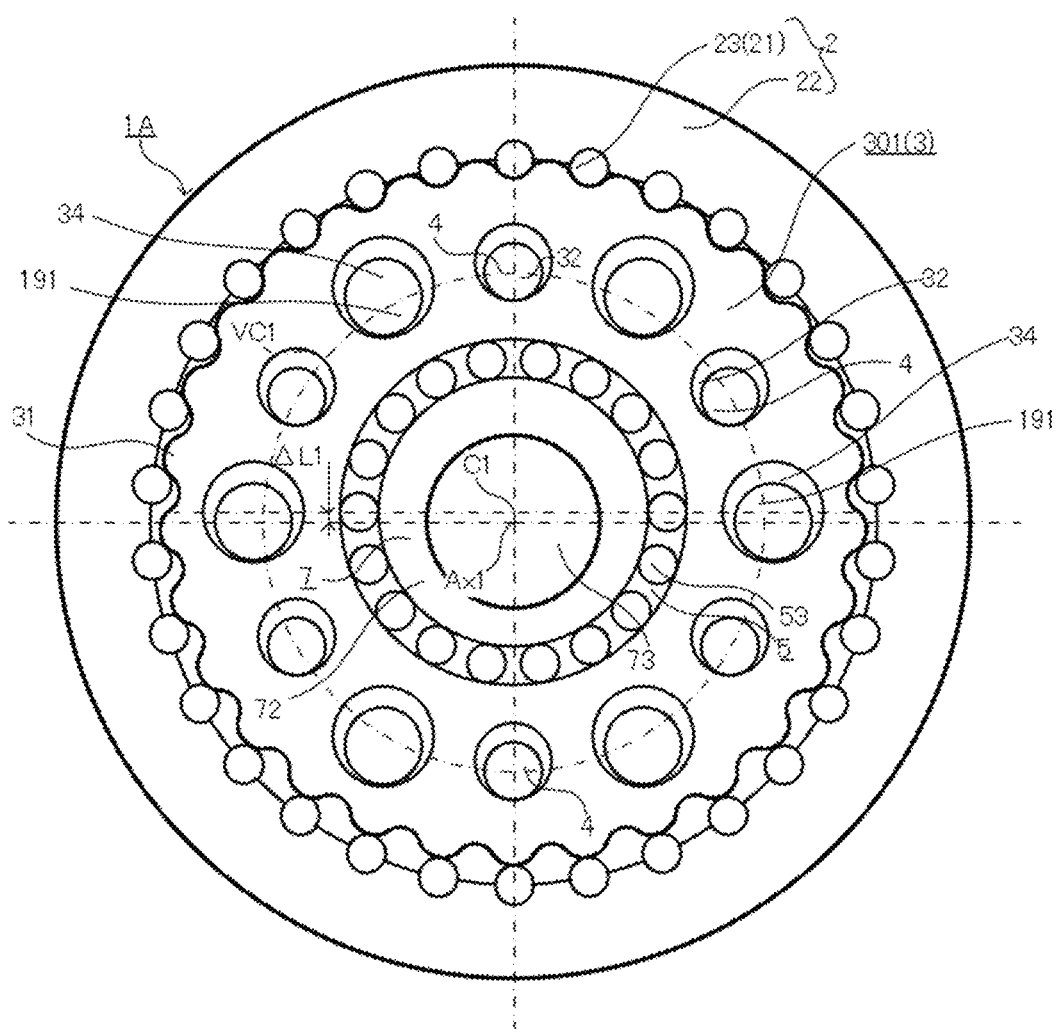
FIG. 18 is a cross-sectional view showing a line A1-A1 of FIG. 11 of the above internal-meshing planetary gear device.
Figure 19:
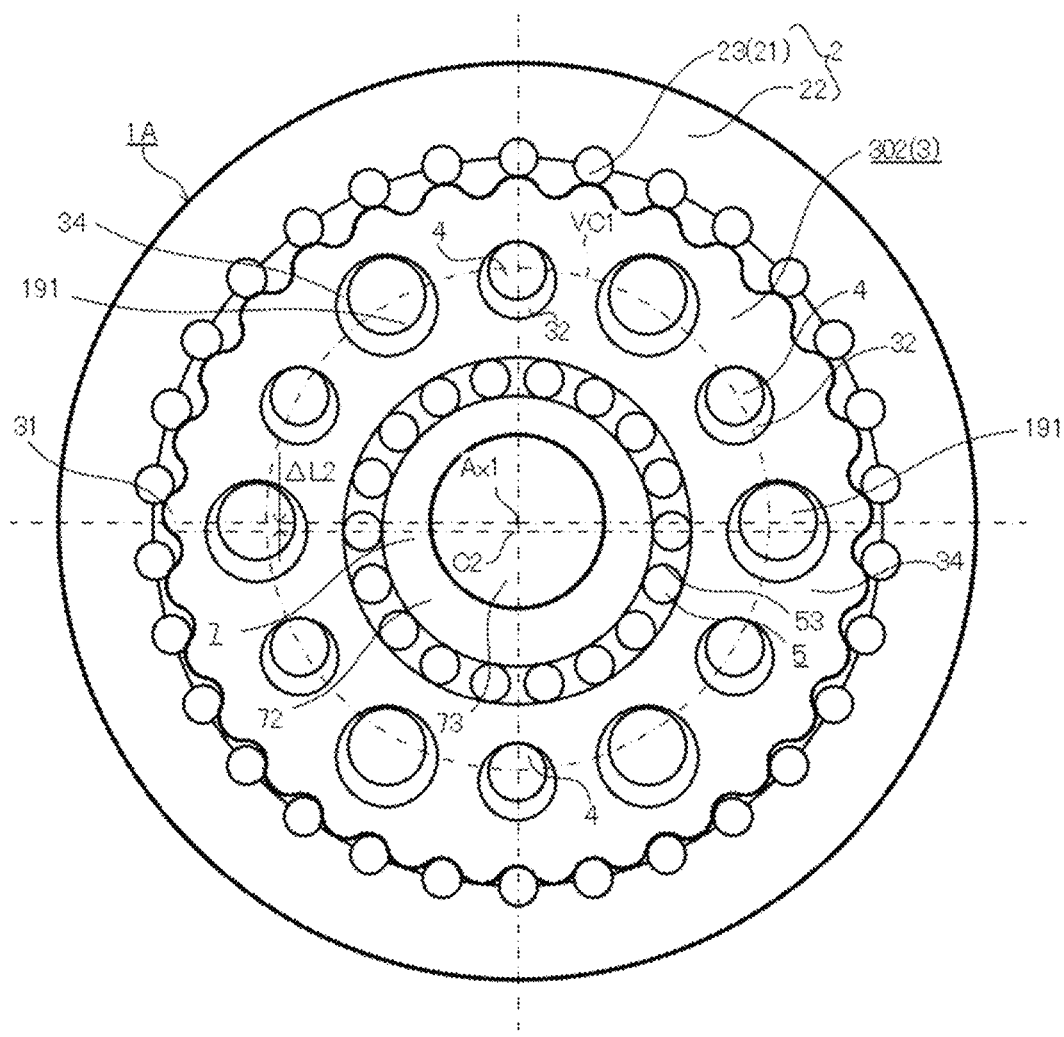
FIG. 19 is a cross-sectional view showing a line B1-B1 of FIG. 11 of the above internal-meshing planetary gear device.

In FIG. 18 and FIG. 19, states of the first planetary gear 301 and the second planetary gear 302 at a certain time are shown. FIG. 18 is a cross-sectional view of a line A1-A1 of FIG. 11, showing the first planetary gear 301. FIG. 19 is a cross-sectional view of a line B1-B1 of FIG. 11, showing the second planetary gear 302. In FIG. 18 and FIG. 19, illustration of retainers 54 is omitted, and cross-sectional lines are omitted, even though it is shown in cross-section. As shown in FIG. 18 and FIG. 19, centers C1 and C2 of the first planetary gear 301 and the second planetary gear 302 are rotationally symmetrical at 180 degrees with respect to the rotation axis Ax1. In the implementation, absolute values of eccentric amounts ΔL1 and ΔL2 are the same although orientations thereof observed from the rotation axis Ax1 are opposite. According to the above structure, the axis portion 71 rotates (self-rotates) with the rotation axis Ax1 as a center, so that the first planetary gear 301 and the second planetary gear 302 rotate (eccentrically move) with a phase difference of 180 degrees around the rotation axis Ax1.

As a fifth one of other differences, as shown in FIG. 11, in the implementation, the eccentric body bearing 5 is composed of a roller bearing, instead of a deep groove ball bearing as described in the basic structure. That is, in the gear device 1A of the implementation, the eccentric body bearing 5 uses columnar (cylindrical) rollers as the rolling bodies 53. Furthermore, in the implementation, the eccentric body inner ring 51 (referring to FIG. 3) and the eccentric body outer ring 52 (referring to FIG. 3) are omitted. Therefore, the inner peripheral surface (of the opened portion 33) of the planetary gear 3 becomes a rolling surface of multiple rolling bodies 53, instead of the eccentric body outer ring 52, and the outer peripheral surface of the eccentric portion 72 becomes a rolling surface of multiple rolling bodies 53, instead of the eccentric body inner ring 51. In the implementation, the eccentric body bearing 5 is provided with retainers 54 in which each of multiple rolling bodies 53 is held in a self-rotatable state. The retainers 54 hold multiple rolling bodies 53 at equal intervals in the circumferential direction of the eccentric portion 72. Furthermore, the retainers 54 are not fixed relative to the planetary gear 3 and the eccentric shaft 7, instead, the retainers 54 may relatively rotate relative to each of the planetary gear 3 and the eccentric shaft 7. Therefore, multiple rolling bodies 53 held by the retainers 54 move in the circumferential direction of the eccentric portion 72, along with the rotation of the retainers 54.

As a sixth one of other differences, as shown in FIG. 11, the gear device 1A of the implementation includes a support ring 8A, instead of the support body 8. The support ring 8A is arranged between two planetary gears 3, i.e., the first planetary gear 301 and the second planetary gear 302. The support ring 8A has a circular ring shape of which at least an outer peripheral surface is a perfect circle when it is observed in a top view. Furthermore, position of the support ring 8A is limited by contacting the outer peripheral surface thereof with multiple pins 23 of the internally toothed gear 2. In other words, since multiple pins 23 constitute the internal teeth 21 of the internally toothed gear 2, position of the support ring 8A is limited by contacting the outer peripheral surface thereof with the internal teeth 21. Here, diameter of the outer peripheral surface of the support ring 8A is the same as diameter of a virtual circle (addendum circle) passing through a front end of the internal tooth 21 of the internally toothed gear 2. Therefore, multiple pins 23 are all in contact with the outer peripheral surface of the support ring 8A. Therefore, in a state where position of the support ring 8A is limited by multiple pins 23, position of center of the support ring 8A is limited in a manner that it overlaps with center of the internally toothed gear 2 (the rotation axis Ax1).

Here, the support ring 8A is sandwiched between the first planetary gear 301 and the second planetary gear 302, and rotates with the rotation axis Ax1 as a center along with the rotation (self-rotation) of the planetary gear 3. At this time, the support ring 8A rotates in a state where the outer peripheral surface thereof is in contact with multiple pins 23, so that each of multiple pins 23 rotates (self-rotates) along with the rotation of the support ring 8A. Therefore, the support ring 8A together with the internally toothed gear 2 constitute a needle bearing (acicular roller bearing) and rotate smoothly. That is, when the gear body 22 of the internally toothed gear 2 is considered as an "outer ring", the support ring 8A is considered as an "inner ring", then multiple pins 23 between the gear body and the support ring function as "rolling bodies (rollers)". In this way, the support ring 8A together with the internal toothed gear 2 (the gear body 22 and multiple pins 23) constitute a needle bearing, and may rotate smoothly. Furthermore, since multiple pins 23 are sandwiched between the support ring 8A and the gear body 22, the support ring 8A also functions as a "limiter" which suppresses movement of the pin 23 in a direction separated from the inner peripheral surface 221 of the gear body 22.

As a seventh one of other differences, as shown in FIG. 11, the gear device 1A of the implementation includes spacers 55. The spacers 55 are arranged between the first bearing 91 and the second bearing 92 used as inner-side bearing member, and the eccentric body bearing 5. Specifically, the spacers 55 are arranged between the first bearing 91 and the eccentric body bearing 5 at the first planetary gear 301 side, and arranged between the second bearing 92 and the eccentric body bearing 5 at the second planetary gear 302 side, respectively. The spacer 55 has a circular ring shape of which at least an inner peripheral surface is a perfect circle when it is observed in a top view. The spacer 55 functions as a "pressing member" of the eccentric body bearing 5 and limits movement of the eccentric body bearing 5 (especially the retainers 54) in the direction parallel to the rotation axis Ax1.

Here, with respect to the first bearing 91 and the second bearing 92, gaps are ensured between the spacers 55 and outer rings thereof. Therefore, outer rings of the first bearing 91 and the second bearing 92 are not in contact with the spacers 55, instead, only inner rings of the first bearing 91 and the second bearing 92 are in contact with the spacers 55. On the other hand, gaps are ensured between the planetary gear 3 and the first bearing member 601A and the second bearing member 602A used as the bearing member 6A. Therefore, the first bearing member 601A and the second bearing member 602A are not in contact with the planetary gear 3.

As an eighth one of other differences, the gear device 1A of the implementation is configured so that a pre-pressure is applied from the planetary gears 3 to each of multiple inner pins 4 when multiple inner pins 4 do not rotate relative to the internally toothed gear 2. That is, in the gear device 1A, when multiple inner pins 4 do not rotate relative to the internally toothed gear 2, the inner peripheral surface 321 of each of multiple inner pin holes 32 presses against each of multiple inner pins 4, so that the pre-pressure is applied to each of multiple inner pins 4. Here, the gear device 1A supports each of multiple inner pins 4 by the support structure 40 (rolling bearings 41, 42) to maintain a state where the pre-pressure is applied. The support structure 40 supports each of multiple inner pins 4 to counteract moment generated by each of multiple inner pins 4 due to the pre-pressure.

With such configuration, in the gear device 1A of the implementation, the inner pin 4 is always in contact with the planetary gear 3 at part of the inner peripheral surface 321 of the inner pin hole 32, so that a state where the inner pin 4 is separated from the planetary gear 3 is difficult to occur. Therefore, when the gear device 1A is driven, the inner pin 4 revolves in the inner pin hole 32 in a state of pressing against the inner peripheral surface 321 of the inner pin hole 32. Generally speaking, in a state where the gear device is assembled by consideration of assembly tolerances or the like, when the gear device is not driven, a gap is ensured between the inner peripheral surface of the inner pin hole and the inner pin. However, the gear device 1A of the implementation dares to be configured to eliminate the gap. Therefore, according to the gear device 1A of the implementation, it is possible to reduce or eliminate backlash caused by at least the gap between the inner peripheral surface 321 of the inner pin hole 32 and the inner pin 4, therefore it is easy to suppress angle transmission error to a small extent. Especially, in the gear device 1A with a high reduction ratio, even though backlash is caused by a tiny gap, an error of the rotation of the output side (the output flange 19) relative to the rotation of the input side (the eccentric shaft 7), i.e., the angle transmission error, becomes large, so that an effect of greatly reducing or eliminating the backlash is obtained.

Furthermore, besides the above different points, for example, tooth number and reduction ratios of the internally toothed gear 2 and the planetary gear 3, number of the inner pin holes 32 and the inner pins 4, specific shape and size of each portion, or the like in the implementation are suitably different from those of the basic structure. For example, there are provided 18 inner pin holes 32 and 18 inner pins 4 in the basic structure, while there are provided six inner pin holes 32 and six inner pins 4 in the implementation, as an example.

Next, structures around the inner pin 4 in the gear device 1A of the implementation will be described in more detail with reference to FIG. 11 to FIG. 20.

Firstly, in the gear device 1A of the implementation, the inner pin 4 moves (revolves) in the inner pin hole 32 along with the eccentric motion of the planetary gear 3. At this time, a movement amount of the inner pin 4 is twice the eccentric amount $\Delta L1$ ($=\Delta L2$) in a linear direction orthogonal to the rotation axis Ax1 (such as up-down direction of FIG. 11). That is, diameter Di of the inner pin hole 32 is ideally represented by diameter di of the inner pin 4 as "Di=di+2$\Delta L1$". Therefore, the inner pin 4 is inserted into the inner pin hole 32 in a state of ensuring a margin of space (gap) between the inner pin and the inner peripheral surface 321 of the inner pin hole 32. However, it is difficult to set the diameter di of the inner pin 4 and the diameter Di of the inner pin hole 32 according to their design values (ideal values), and there is a slight deviation within a tolerance range. For example, when the diameter di of the inner pin 4 is smaller than the design value, the gap between the inner peripheral surface 321 of the inner pin hole 32 and the inner pin 4 increases, and the backlash is generated due to the gap, thereby increasing the angle transmission error. On the contrary, when the diameter di of the inner pin 4 is greater than the design value, the gap between the inner peripheral surface 321 of the inner pin hole 32 and the inner pin 4 decreases, and a torque (input torque) for rotating the eccentric shaft 7 increases, thereby increasing loss of the gear device 1A.

Here, in the implementation, as described above, each of multiple inner pins 4 may be removed through the inner pin path Sp1 in a state where at least the bearing member 6A, the internally toothed gear 2 and the planetary gear 3 are combined. That is, in the gear device 1A, each of multiple inner pins 4 may be removed without detaching (disassembling) at least the bearing member 6A, the internally toothed gear 2 and the planetary gear 3. Here, since the inner pin paths Sp1 are located on at least one side in the direction parallel to the rotation axis Ax1 relative to multiple inner pins 4, the inner pins 4 pass through the inner pin paths Sp1 by moving in the direction parallel to the rotation axis Ax1, and thus are removed.

In other words, since at least one side in the direction parallel to the rotation axis Ax1 relative to multiple inner pins 4 may be opened through the inner pin path Sp1, each of multiple inner pins 4 may be removed through the opened part (the inner pin path Sp1). Furthermore, by removing the inner pin 4, replacement of the inner pin 4 or the like may be performed. That is, after removing the inner pin 4, another inner pin 4 or the same inner pin 4 after maintenance (grinding, cleaning, or the like) is reassembled, so that replacement of the inner pin 4 or the like may be performed in a state where at least the bearing member 6A, the internally toothed gear 2 and the planetary gear 3 are combined. The reassembled inner pin 4 is also inserted through the inner pin path Sp1 as in a case of disassembly.

In summary, according to the above structure, in the gear device 1A of the implementation, replacement of the inner pin 4 or the like may be performed without removing the bearing member 6A, the internally toothed gear 2 and the planetary gear 3. Therefore, for example, when the diameter di of the inner pin 4 is smaller than the design value, the backlash caused by at least the gap between the inner peripheral surface 321 of the inner pin hole 32 and the inner pin 4 may be reduced or eliminated by replacing the inner pin 4 with a larger diameter, therefore it is easy to suppress the angle transmission error to a small extent. On the contrary, when the diameter di of the inner pin 4 is greater than the design value, the input torque for rotating the eccentric shaft 7 may be suppressed to a small extent by replacing the inner pin 4 with a smaller diameter, therefore it is easy to suppress loss of the gear device 1A to a small extent. Especially, in the gear device 1A with a high reduction ratio, even though backlash is caused by a tiny gap, an error of the rotation of the output side (the output flange 19) relative to the rotation of the input side (the eccentric shaft 7), i.e., the angle transmission error, becomes large, so that an effect of greatly the reducing or eliminating backlash is obtained.

Furthermore, according to the structure of the implementation, it is possible to reduce angle transmission error of the gear device 1A from a stop state to a time when start of rotation is enabled, so that start-up characteristics of the gear device 1A may be greatly improved, and thus responsiveness at the time of starting the gear device 1A or at the time of switching rotation directions may be greatly improved. As a result, for example, even in a field where stop, start or rotation direction switching are frequently performed and angle transmission error is strictly required, such as in the robot field, the gear device 1A may exert sufficient characteristics.

Furthermore, in the implementation, each of multiple inner pins 4 is held by the inner ring 61 in a self-rotatable state. However, strictly speaking, each of the inner pins 4 is not directly held by the inner ring 61, instead, held by the bracket flange 18 and the output flange 19 integrated with the inner ring 61 (via the rolling bearings 41, 42), thus indirectly held by the inner ring 61 of the bearing member 6A. In this way, according to a structure where the inner pin 4 is held to be self-rotatable, even though the gap between the inner peripheral surface 321 of the inner pin hole 32 and the inner pin 4 is small and the inner pin 4 revolves in the inner pin hole 32 in a state of pressing against the inner peripheral surface 321 of the inner pin hole 32, the inner pin 4 rolls relative to the inner peripheral surface 321 of the inner pin hole 32. In other words, since the inner pin 4 revolves in the inner pin hole 32 by way of rolling on the inner peripheral surface 321 of the inner pin hole 32, loss caused by a frictional resistance between the inner peripheral surface 321 of the inner pin hole 32 and the inner pin 4 is not easily generated.

Furthermore, multiple inner pins 4 are arranged on an inner side of the inner ring 61 (of the bearing member 6A) when they are observed from the direction parallel to the rotation axis Ax1. That is, multiple inner pins 4 are arranged on the inner side of the bearing member 6A (the first bearing member 601A and the second bearing member 602A). In this way, since multiple inner pins 4 are arranged on the inner side of the bearing member 6A, the inner pins 4 may be removed as long as the inner pin paths Sp1 are ensured on the inner side of the bearing member 6A. Specifically, holes into which multiple inner pins 4 are inserted are formed in the bracket flange 18 and the output flange 19 on the inner side of the bearing member 6A, and the inner pin paths Sp1 may be obtained by opening at least one of these holes in the direction parallel to the rotation axis Ax1. According to this structure, it is possible to suppress increase of size of the gear device 1A in a radial direction (a direction orthogonal to the rotation axis Ax1).

Furthermore, as shown in FIG. 15, in the gear device 1A of the implementation, the inner pin paths Sp1 are located on both sides in the direction parallel to the rotation axis Ax1 with respect to multiple inner pins 4. That is, when it is observed from multiple inner pins 4, both side, i.e., the input side (left side of FIG. 15) of the rotation axis Ax1 and the output side (right side of FIG. 15) of the rotation axis Ax1 may be opened through the inner pin paths Sp1. Therefore, each of multiple inner pins 4 is self-removable from either the input side or the output side of the rotation axis Ax1. Furthermore, the inner pins 4 may also be removed from one side in the direction parallel to the rotation axis Ax1 by pressing existing inner pins 4 from the other side in the direction parallel to the rotation axis Ax1. Therefore, for example, when the inner pins 4 are replaced, the existing inner pins 4 are removed from the output side of the rotation axis Ax1 by new inner pins 4 pressing the existing inner pins 4 from the input side of the rotation axis Ax1, while the new inner pins 4 are inserted.

Furthermore, in the implementation, the inner pin paths Sp1 are not always opened, instead, covered by the cover bodies 163, 164 at least when the gear device 1A is used. For example, the cover bodies 163, 164 are detachably mounted to the bracket flange 18 and the output flange 19. Specifically, the cover body 163 is detachably mounted to the bracket flange 18 and covers the inner pin path Sp1 on the input side of the rotation axis Ax1 in a state of mounting to the bracket flange 18. The cover body 164 is detachably mounted to the output flange 19 and covers the inner pin path Sp1 on the output side of the rotation axis Ax1 in a state of mounting to the output flange 19.

In summary, the gear device 1A of the implementation further includes the cover bodies 163, 164. The cover bodies 163, 164 are movable between a first position covering the inner pin paths Sp1 and a second position exposing the inner pin paths Sp1. In the implementation, a state where the cover bodies 163, 164 are mounted to the bracket flange 18 and the output flange 19 (states of FIG. 11 and FIG. 12) corresponds to the "first position", and a state where the cover bodies 163, 164 are removed from the bracket flange 18 and the output flange 19 (state of FIG. 15) corresponds to the "second position". The cover bodies 163, 164 only need to be movable between the first position and the second position, and may not necessarily require removing from the bracket flange 18 and the output flange 19.

Furthermore, the cover bodies 163, 164 cover multiple inner pin paths Sp1 corresponding to multiple inner pins 4 together at the first position. That is, in the implementation, as an example, there are provided six inner pins 4, and thus there are also provided six inner pin paths Sp1 on the input side and the output side of the rotation axis Ax1 respectively. The cover body 163 is configured to cover six inner pin paths Sp1 on the input side of the rotation axis Ax1 together, rather than cover them one-by-one individually. Similarly, the cover body 164 is configured to cover six inner pin paths Sp1 on the output side of the rotation axis Ax1 together, rather than cover them one-by-one individually. Therefore, as shown in FIG. 16, when the cover body 163 is removed, the six inner pin paths Sp1 on the input side of the rotation axis Ax1 are exposed, and as shown in FIG. 17, when the cover body 164 is removed, the six inner pin paths Sp1 on the output side of the rotation axis Ax1 are exposed.

Specifically, each of the cover bodies 163, 164 has a circular ring shape of which outer and inner peripheral surfaces are perfect circles when they are observed in a top view. Furthermore, positions of the cover bodies 163, 164 are limited by contacting outer peripheral surfaces thereof with the bracket flange 18 and the output flange 19. That is, each of the bracket flange 18 and the output flange 19 is provided with a recess opened toward an outer side in the direction parallel to the rotation axis Ax1. The cover bodies 163, 164 are mounted to the bracket flange 18 and the output flange 19 by embedding into these recesses. Furthermore, oil seals 14, 15 are embedded on inner sides of the cover bodies 163, 164. That is, the cover bodies 163, 164 are combined with the oil seals 14, 15 by contacting inner peripheral surfaces thereof with outer peripheral surfaces of the oil seals 14, 15 respectively. Therefore, positions of the oil seals 14, 15 when they are observed from the direction parallel to the rotation axis Ax1 are limited by the cover bodies 163, 164.

In the implementation, as an example, as shown in FIG. 13 and FIG. 14, the cover bodies 163, 164 are mounted to the bracket flange 18 and the output flange 19 by multiple (six, as an example) mounting screws 160. That is, the cover body 163 is fixed to the bracket flange 18 by fixing to a screw hole 183 (referring to FIG. 16) of the bracket flange 18 with six mounting screws 160 in a state of embedding into the recess of the bracket flange 18. The cover body 164 is fixed to the output flange 19 by fixing to a screw hole 193 (referring to FIG. 17) of the output flange 19 with six mounting screws 160 in a state of embedding into the recess of the output flange 19. Similar to other parts, the cover bodies 163, 164 are made of metal materials such as stainless steel, cast iron, carbon steel for mechanical structure, chrome molybdenum steel, phosphor bronze, aluminum bronze, or the like.

As shown in FIG. 13, opening holes 165 are formed in the cover body 163. The opening holes 165 are arranged at respective positions corresponding to the bracket bolts 181 in a state where the cover body 163 is mounted to the bracket flange 18. In the implementation, since there are provided six bracket bolts 181, there are also provided six opening holes 165. The opening holes 165 functions as release holes for releasing heads of the bracket bolts 181. Furthermore, as shown in FIG. 14, opening holes 166 are formed in the cover body 164. The opening holes 166 are arranged at respective positions corresponding to the flange bolt holes 192 in a state where the cover body 164 is mounted to the output flange 19. In the implementation, since there are provided six flange bolt holes 192, there are also provided six opening holes 166. The opening holes 166 functions as through holes for exposing the flange bolt holes 192.

Furthermore, a positioning structure for relatively positioning the cover bodies 163, 164 and the inner ring 61 is also included in the implementation. As an example, the positioning structure is composed of convex portions 167 (referring to FIG. 15) and concave portions 184, 194 (referring to FIG. 16 and FIG. 17). Specifically, convex portions 167 are arranged on surfaces of the cover bodies 163, 164 facing the bracket flange 18 and the output flange 19 respectively. Concave portions 184, 194 are arranged on surfaces of the bracket flange 18 and the output flange 19 facing the cover bodies 163, 164 (that is, bottom surfaces of the recesses) and at positions corresponding to the convex portions 167 respectively. The cover body 163 is combined with the bracket flange 18 by embedding the convex portion 167 into the concave portion 184 of the bracket flange 18, and thus is relatively positioned relative to the inner ring 61 of the first bearing member 601A integrated with the bracket flange 18. Similarly, the cover body 164 is combined with the output flange 19 by embedding the convex portion 167 into the concave portion 194 of the output flange 19, and thus is relatively positioned relative to the inner ring 61 of the second bearing member 602A integrated with the output flange 19.

By providing such positioning structure, relative positions of the cover bodies 163, 164 relative to the inner ring 61 may be determined with high accuracy. That is, when it is observed from the direction parallel to the rotation axis Ax1, positions of the cover bodies 163, 164 may be limited with high accuracy. In the implementation, especially positions of the oil seals 14, 15 when they are observed from the direction parallel to the rotation axis Ax1 are limited by the cover bodies 163, 164. Therefore, it is possible to suppress poor centering of the oil seals 14, 15 by improving positional accuracy of the cover bodies 163, 164. As a result, it is easy to suppress leakage of the lubricant from the lubricant holding space 17 sealed by the oil seals 14, 15.

Furthermore, it is preferable that the positioning structure uniquely determines relative positions of the cover bodies 163, 164 relative to the inner ring 61 in a rotation direction with the rotation axis Ax1 as a center. Therefore, when the rotation axis Ax1 is used as a symmetry axis, the cover bodies 163, 164 are combined with the inner ring 61 of the bearing member 6A in a non-rotational symmetric manner, i.e., 360-degree rotational symmetric manner. In the implementation, as an example, as shown in FIG. 16, when it is observed from the input side of the rotation axis Ax1, multiple (here, two) concave portions 184 of the bracket flange 18 are provided at positions which are not rotational symmetric with the rotation axis Ax1 as a symmetry axis. Similarly, as shown in FIG. 17, when it is observed from the output side of the rotation axis Ax1, multiple (here, two) concave portions 194 of the output flange 19 are provided at positions which are not rotational symmetric with the rotation axis Ax1 as a symmetry axis. As a result, relative positional accuracy of the cover bodies 163, 164 relative to the inner ring 61 is further improved.

Furthermore, in the implementation, at least a part of each of multiple inner pins 4 is held by the inner ring 61 (of the bearing member 6A) at the same position as the bearing member 6A in the direction parallel to the rotation axis Ax1. That is, as shown in FIG. 15, at least a part of multiple sets of rolling bearings 41, 42 used as the support structure 40 to hold (support) the inner pins 4 is arranged at positions overlapping with the first bearing member 601A and the second bearing member 602A in the direction parallel to the rotation axis Ax1. That is, in the direction parallel to the rotation axis Ax1, at least a part of the rolling bearing 41 is arranged at the same position as the first bearing member 601A, and at least a part of the rolling bearing 42 is arranged at the same position as the second bearing member 602A. Especially, in the implementation, size of each of the first bearing member 601A and the second bearing member 602A in a width direction (a direction parallel to the rotation axis Ax1) is substantially the same as size of each of the rolling bearings 41, 42 in the width direction. Therefore, in the direction parallel to the rotation axis Ax1, approximately each of the first bearing member 601A and the second bearing member 602A is received in a range of each of the rolling bearings 41, 42. In other words, each of the first bearing member 601A and the second bearing member 602A is arranged on an outer side of each of the rolling bearings 41, 42.

In this way, in the implementation, a space originally provided at the inner side of the bearing member 6A (the first bearing member 601A and the second bearing member 602A) of the gear device 1A is used as a space where the support structure 40 of the inner pins 4 is provided. Therefore, it is possible to suppress increase of size of the gear device 1A in the direction parallel to the rotation axis Ax1 caused by provision of the support structure 40.

Especially, in the implementation, the support structure 40 (the rolling bearings 41, 42) is arranged at an outer side of the inner-side bearing member (the first bearing 91 and the second bearing 92) and at the inner side of the bearing member 6A (the first bearing member 601A and the second bearing member 602A). In other words, the rolling bearings 41, 42 are arranged using a space between the inner-side bearing member (the first bearing 91 and the second bearing 92) and the bearing member 6A (the first bearing member 601A and the second bearing member 602A). Therefore, it is possible to suppress increase of size of the gear device 1A in a radial direction (a direction orthogonal to the rotation axis Ax1) caused by provision of the rolling bearings 41, 42.

Furthermore, the inner pin paths Sp1 are communicated with the lubricant holding space 17 holding the lubricant. Specifically, the inner pin paths Sp1 pass through holes of the bracket flange 18 and the output flange 19 for inserting the inner pins 4, to be connected to the lubricant holding space 17. According to this structure, lubricant may be supplemented to the lubricant holding space 17 from the inner pin paths Sp1 when replacement of the inner pins 4 or the like is performed.

Figure 20:
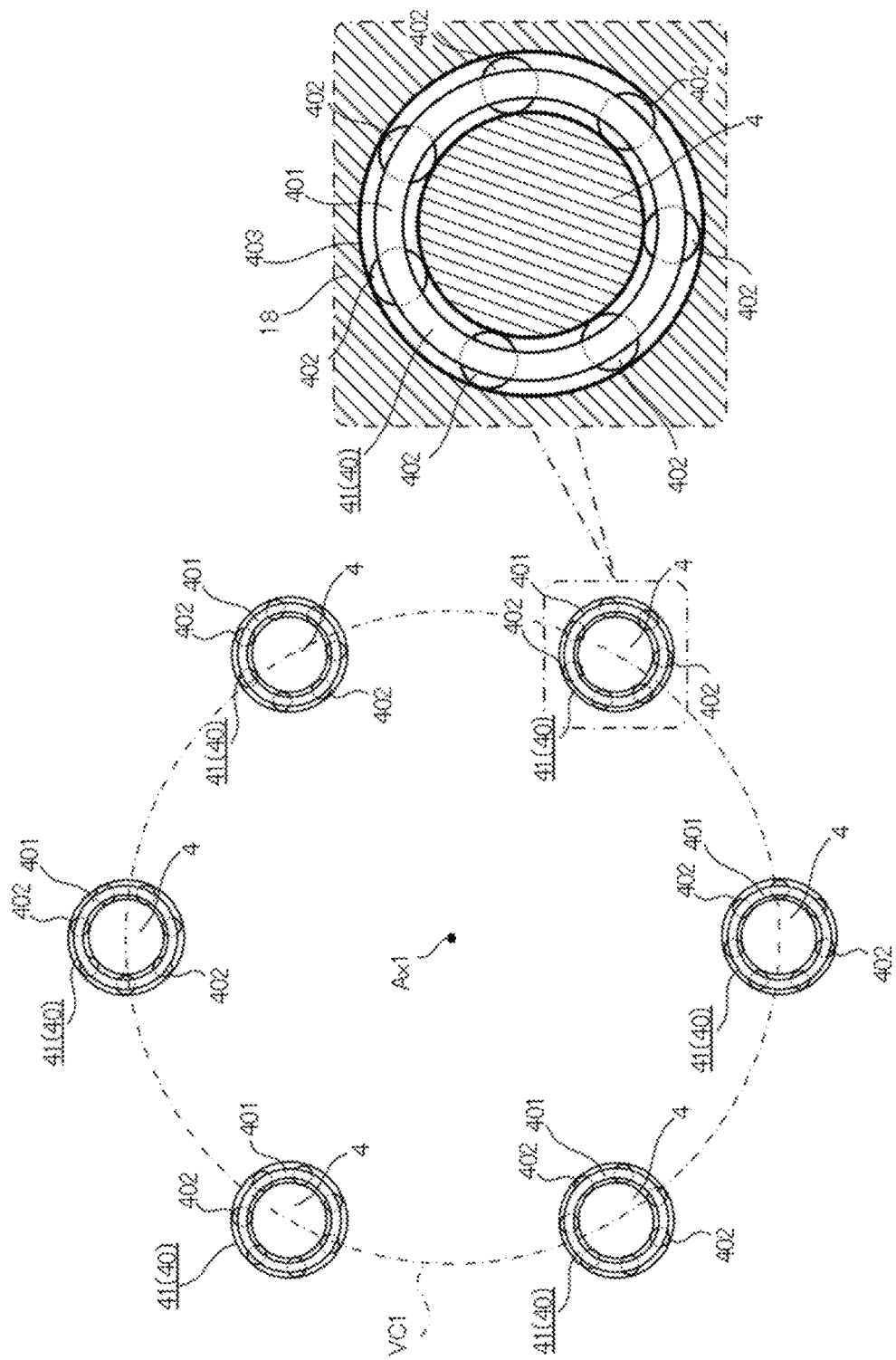
FIG. 20 is an illustrative diagram showing configuration of a rolling bearing of the above internal-meshing planetary gear device.

However, in the implementation, a pair of rolling bearings 41, 42 hold both end portions of the inner pin 4 in the length direction, in a state where the inner pin 4 is self-rotatable. Here, as shown in FIG. 20, each of the rolling bearings 41, 42 is provided with a retainer 401 and multiple rolling bodies 402. Outer rings 403 of the rolling bearings 41, 42 are used as the bracket flange 18 and the output flange 19. Specifically, inner peripheral surfaces of the holes of the bracket flange 18 and the output flange 19 for inserting the inner pins 4 function as the outer rings 403 of the rolling bearings 41, 42. The outer ring 403 has a perfect circle shape when it is observed in a top view, inner diameter of the outer ring 403 is greater than diameter (outer diameter) of the inner pin 4, so that a gap is generated between the outer ring 403 and the outer peripheral surface of the inner pin 4. Multiple rolling bodies 402 are arranged in the gap between the outer ring 403 and the inner pin 4. Multiple rolling bodies 402 are arranged side-by-side in a circumferential direction of the outer ring 403. Multiple rolling bodies 402 are all metal components with the same shape, and are arranged at equal intervals in the whole area along the circumferential direction of the outer ring 403. The retainer 401 holds multiple rolling bodies 402 at equal intervals in the circumferential direction of the outer ring 403.

In the implementation, as an example, each of the rolling bearings 41, 42 is a needle bearing (acicular roller bearing). That is, each of the rolling bearings 41, 42 is provided with cylindrical rollers as the rolling bodies 402. Furthermore, axis of the rolling body 402 with a cylindrical shape is configured to be in parallel with the rotation axis Ax1. In the implementation, each of the rolling bearings 41, 42 is not provided with an inner ring, and the inner pin 4 functions as the inner ring. Therefore, according to each of the rolling bearings 41, 42, multiple rolling bodies 402 roll so that the inner pin 4 rotates relative to the outer ring 403, and each of the rolling bearings 41, 42 may hold the inner pin 4 to be self-rotatable.

According to this structure, the inner pin 4 is self-rotatable, and since loss caused by a frictional resistance between the inner peripheral surface 321 of the inner pin hole 32 and the inner pin 4 is not easily generated originally, inner rollers may be omitted. Therefore, in the implementation, there is formed a structure where the inner pin 4 in a state of not equipping inner rollers is inserted into the inner pin hole 32 so that the inner pin 4 is in direct contact with the inner peripheral surface 321 of the inner pin hole 32. Therefore, inner rollers may be omitted, and diameter of the inner pin hole 32 may be suppressed to a small extent, so that the planetary gear 3 may be miniaturized (especially to have a small diameter), and the whole gear device 1A may also be (e.g., easily) miniaturized. Furthermore, each of the inner pins 4 is held by a pair of rolling bearings 41, 42. Therefore, when the inner pin 4 rotates, loss caused by a frictional resistance between the inner pin 4 and the bracket flange 18 and the output flange 19 is not easily generated.

On the other hand, arrangement of multiple sets of rolling bearings 41, 42 as observed in the direction parallel to the rotation axis Ax1 is substantially the same as arrangement of multiple inner pins 4. That is, as shown in FIG. 18 and FIG. 19, when a virtual circle VC1 passing through center of each of multiple inner pins 4 is set as observed in the direction parallel to the rotation axis Ax1, multiple sets of rolling bearings 41, 42 are arranged on the virtual circle VC1. In the implementation, especially as shown in FIG. 20, multiple sets of rolling bearings 41, 42 are arranged at equal intervals in the circumferential direction around the rotation axis Ax1 when it is observed in the direction parallel to the rotation axis Ax1. In FIG. 20, arrangement of the rolling bearing 41 is shown, and arrangement of the rolling bearing 42 is similar thereto. Furthermore, in FIG. 20, cross-sectional lines are appropriately omitted, even though they are shown in cross-section.

That is, multiple sets of rolling bearings 41, 42 are arranged on the virtual circle VC1 at equal intervals in a circumferential direction of the virtual circle VC1. That is, the virtual circle VC1 passes through center of each of multiple rolling bearings 41 (or 42) when it is observed in the direction parallel to the rotation axis Ax1, and a distance between two adjacent rolling bearings 41 (or 42) on the virtual circle VC1 is uniform for multiple rolling bearings 41 (or 42). According to this arrangement, multiple inner pins 4 are held by multiple sets of rolling bearings 41, 42, and forces applied to multiple inner pins 4 may be evenly dispersed when the gear device 1A is driven.

Furthermore, as shown in FIG. 20, in the implementation, center of the virtual circle VC1 passing through center of multiple sets of rolling bearings 41, 42 is consistent with the rotation axis Ax1 when it is observed in the direction parallel to the rotation axis Ax1. In other words, center of the virtual circle VC1 is the same as center of the gear body 22 of the internally toothed gear 2, or center of the pitch circle of the internal tooth 21 or the like, and is located on the rotation axis Ax1. According to this structure, center of the gear body 22 of the internally toothed gear 2 and rotation centers of multiple inner pins 4 relative to the internally toothed gear 2 are easily kept on the rotation axis Ax1 with high accuracy. As a result, the gear device 1A may have an advantage of being less likely to generate bad conditions such as generation of vibration, reduction of transmission efficiency, or the like due to poor centering.

Next, structures around the input shaft (the eccentric shaft 7) in the gear device 1A of the implementation will be described in more detail.

In the implementation, as described above, the gear device 1A includes a bushing 70 which is coupled to the input shaft (the eccentric shaft 7) swinging the planetary gear 3 eccentrically and rotates together with the input shaft (the eccentric shaft 7). The bushing 70 is provided with a fixing structure 701 to fix an object member.

According to the above structure, in the gear device 1A of the implementation, the object member is not directly fixed to the input shaft such as the eccentric shaft 7 or the like, instead, the object member is fixed through the bushing 70 coupled to the input shaft. Therefore, outer diameter of the input shaft (the axis portion 71 of the eccentric shaft 7) may be reduced compared to a case where the object member is directly fixed to an end surface of the input shaft. As a result, it is possible to provide the gear device 1A which may also be (e.g., easily) miniaturized. Especially, in the gear device 1A with a high reduction ratio, sometimes rotation input from the object member to the input shaft may be at a high speed, and coupling between the input shaft and the object member may be required to be firm. According to the structure of the implementation, since the object member is fixed to the fixing structure 701 of the bushing 70, the object member may be firmly coupled to the input shaft without increasing the outer diameter of the input shaft.

Specifically, the bushing 70 has a circular ring shape of which at least an inner peripheral surface is a perfect circle when it is observed. Center (central axis) of the bushing 70 is consistent with the rotation axis Ax1. An end portion of the bushing 70 on the output side of the rotation axis Ax1 constitutes an insertion opening 702 (referring to FIG. 12) whose inner diameter is increased. The inner diameter of the insertion opening 702 is substantially the same as outer diameter of the axis portion 71 of the eccentric shaft 7. Therefore, the bushing 70 may be coupled to the eccentric shaft 7 by embedding an end portion of the axis portion 71 of the eccentric shaft 7 on the input side of the rotation axis Ax1 into the insertion opening 702. That is, in the implementation, the bushing 70 is provided with the insertion opening 702, and is coupled to the input shaft in a state where a part of the input shaft (eccentric shaft 7) is inserted into the insertion opening 702. Similar to other parts, the bushing 70 is made of metal materials such as stainless steel, cast iron, carbon steel for mechanical structure, chrome molybdenum steel, phosphor bronze, aluminum bronze, or the like.

Furthermore, the bushing 70 is coupled to the eccentric shaft 7 by press-fitting in a state where a part of the eccentric shaft 7 is inserted (embedded) into the insertion opening 702. Furthermore, the bushing 70 is coupled to the input shaft at least by adhesion. Specifically, the bushing 70 is firmly coupled to the eccentric shaft 7 by an adhesive applied to an inner peripheral surface of the insertion opening 702. In summary, in the implementation, the bushing 70 is coupled to the input shaft (the eccentric shaft 7) by both press-fitting and adhesion. Therefore, firm coupling between the bushing 70 and the eccentric shaft 7 may be achieved.

Furthermore, outer diameter of the bushing 70 is at least greater than the outer diameter of the axis portion 71 of the eccentric shaft 7. Therefore, in a state where the bushing 70 is coupled to the eccentric shaft 7, the bushing 70 protrudes in a flange shape at an end portion of the eccentric shaft 7 on the input side of the rotation axis Ax1. Here, the bushing 70 is located on the input side of the rotation axis Ax1 when it is observed from the first bearing 91 used as the inner-side bearing member. Therefore, the first bearing 91 used as the inner-side bearing member is located at a position where the first bearing is sandwiched between the eccentric portion 72 and the bushing 70 in the direction parallel to the rotation axis Ax1. Therefore, the bushing 70 functions as a "pressing member" of the first bearing 91 and limits movement of the inner-side bearing member (the first bearing 91) in the direction parallel to the rotation axis Ax1. In summary, the gear device 1A of the implementation includes the inner-side bearing member (the first bearing 91) which holds the input shaft (the eccentric shaft 7) to be (indirectly) rotatable relative to the inner ring 61. The bushing 70 limits movement of the inner-side bearing member (the first bearing 91) toward a side in the direction parallel to the rotation axis Ax1.

Furthermore, in the implementation, each of the input shaft (the eccentric shaft 7) and the bushing 70 is provided with a through hole 73 penetrating along the rotation axis Ax1. That is, the through hole 73 penetrates the bushing 70 from the axis portion 71 of the eccentric shaft 7 along the rotation axis Ax1. Here, since the fixing structure 701 for fixing the object member is provided on the bushing 70, it is easy to largely ensure diameter of the through hole 73 compared to a case where the bushing 70 is not provided, in case that the outer diameter of the eccentric shaft 7 is the same. That is, since it is unnecessary to provide a fixing structure to the eccentric shaft 7 itself, a thin wall (of the axis portion 71) of the eccentric shaft 7 is easily obtained, and as a result, the through hole 73 is easily increased.

In the implementation, as an example, the fixing structure 701 is composed of screw holes. That is, the object member may be fixed to the bushing 70 by screwing the object member to the screw holes used as the fixing structure 701. Here, the fixing structure 701 (the screw holes) is provided on an end surface of the bushing 70 facing the input side of the rotation axis Ax1. There are provided multiple (here, six) screw holes as the fixing structure 701 (referring to FIG. 13), and the object member may be fixed with multiple screws. When the object member is fixed using such fixing structure 701, the object member is fixed to the input side of the rotation axis Ax1 relative to the bushing 70. That is, the fixing structure 701 is configured to fix the object member on a side in the direction parallel to the rotation axis Ax1 relative to the bushing 70.

Furthermore, in the implementation, at least a part of the fixing structure 701 is located at the same position as the input shaft, in the direction parallel to the rotation axis Ax1. That is, as shown in FIG. 15, at least a part of the fixing structure 701 for fixing the object member is located at a position overlapping with the input shaft (the eccentric shaft 7), in the direction parallel to the rotation axis Ax1. As a result, it is possible to suppress increase of size of the gear device 1A in the direction parallel to the rotation axis Ax1, although the fixing structure 701 is relatively large.

Furthermore, in the implementation, the inner pin paths Sp1 are provided, however, the inner pin paths Sp1 allow removal of the inner pins 4 even in a state where the bushing 70 is kept coupled to the eccentric shaft 7. That is, the gear device 1A includes inner pin paths Sp1 which are located on at least one side in the direction parallel to the rotation axis Ax1 relative to multiple inner pins 4, and allow removal of each of multiple inner pins 4 in a state where the input shaft (the eccentric shaft 7) is combined with the bushing 70. Therefore, in the gear device 1A, each of multiple inner pins 4 may be removed even after the bushing 70 is coupled to the input shaft (the eccentric shaft 7).

Next, a replacement method of the inner pins 4 and the rolling bodies 402 of the rolling bearings 41, 42 in the gear device 1A of the implementation will be described with reference to FIG. 21 and FIG. 22. Here, as an example, descriptions are mode to a case where an operator replaces the inner pins 4, the rolling bearings 41, 42, or the like for the purpose of adjusting performance (backlash, input torque, or the like) of the gear device 1A in manufacturing processes of the gear device 1A.

Even when any one of the inner pin 4 and the rolling body 402 is replaced, the operator removes the mounting screws 160 to remove the cover bodies 163, 164 and the oil seals 14, 15 from the bracket flange 18 and the output flange 19 (referring to FIG. 15). The inner pin paths Sp1 are exposed by removing the cover bodies 163, 164.

Figure 21:
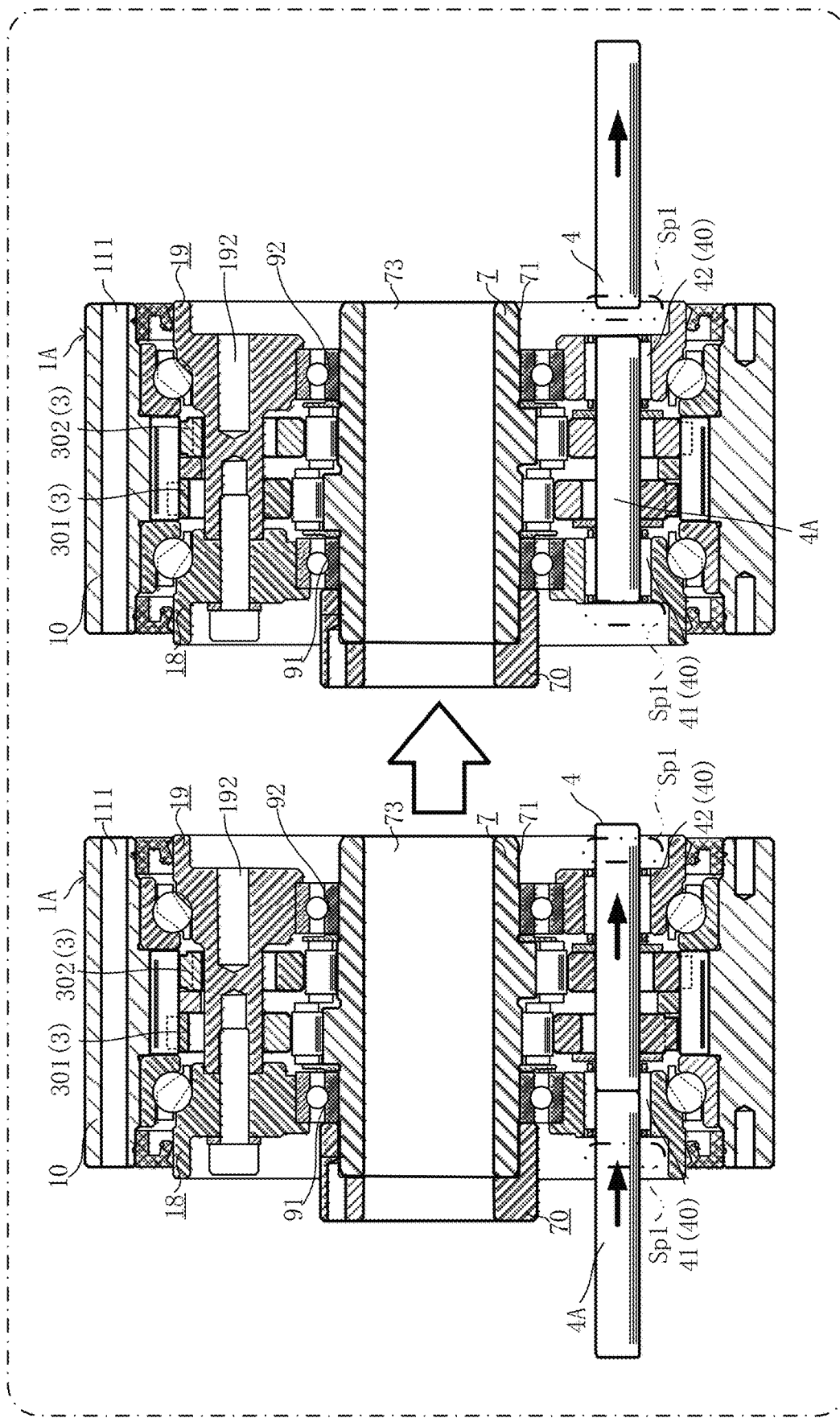
FIG. 21 is a diagrammatic illustrative diagram showing a replacement order of inner pins in the above internal-meshing planetary gear device.

As shown in FIG. 21, when the inner pins 4 are replaced, the operator presses a new inner pin 4A into the bracket flange 18 from the inner pin path Sp1 on the input side of the rotation axis Ax1 for example. At this time, the existing inner pin 4 pressed by the new inner pin 4A is pushed out toward the output side of the rotation axis Ax1. Then, in a state where the new inner pin 4A is completely inserted, the existing inner pin 4 is removed. In the method, since at least one of the new inner pin 4A and the existing inner pin 4 is always inserted into each of the rolling bearings 41, 42, multiple rolling bodies 402 of the rolling bearings 41, 42 are prevented from falling off by the inner pins 4 and 4A.

Furthermore, in the above method, since the inner pins 4 may be replaced one by one, the gear device 1A may be experimentally driven and the performance (backlash, input torque, or the like) may be checked each time one of the inner pins 4 is replaced. Therefore, for example, there may be an advantage that it may be easier to locate the inner pins 4 even under bad conditions and it may be easy to adjust the performance of the gear device 1A to a desired performance.

Figure 22:
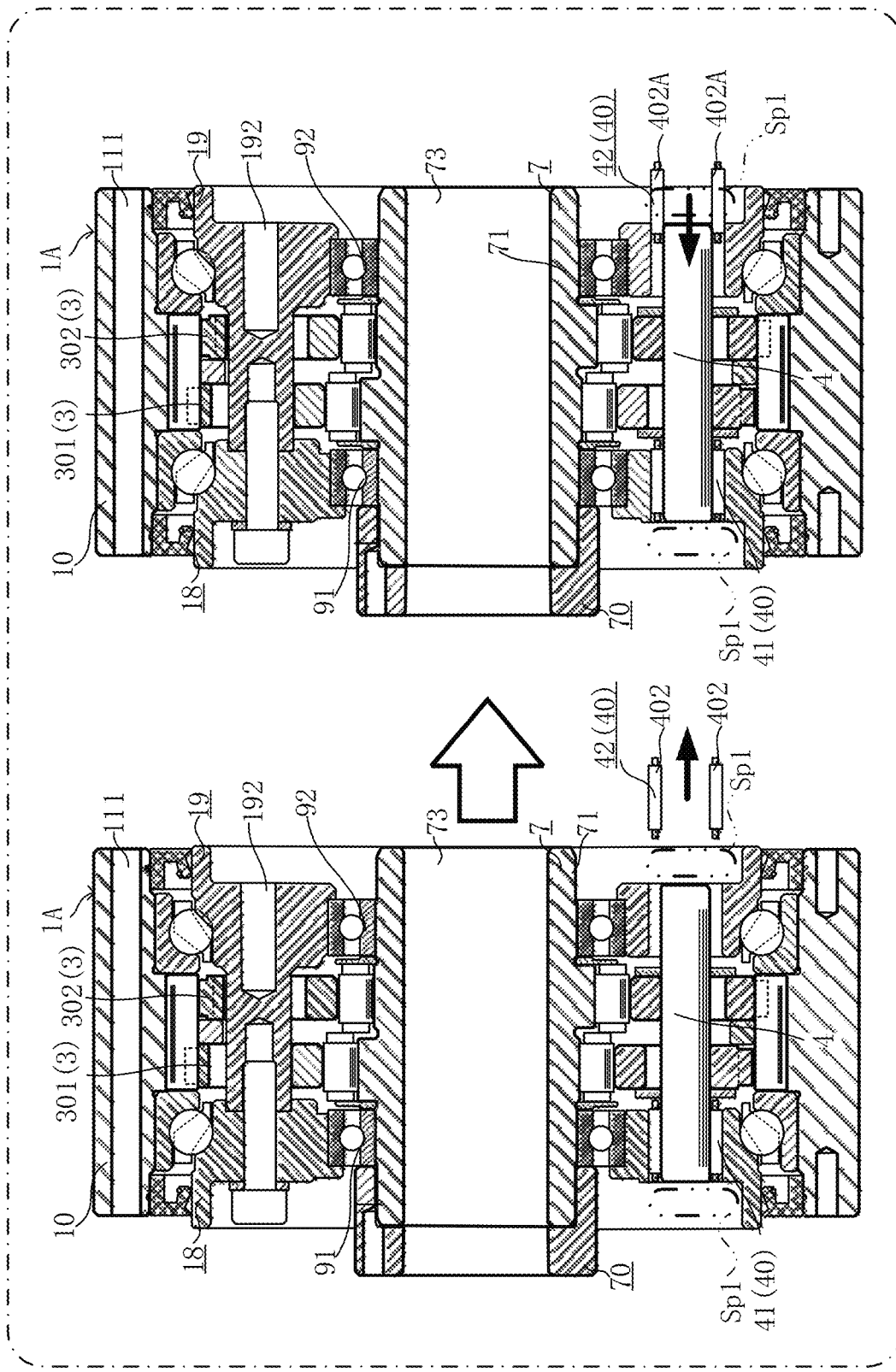
FIG. 22 is a diagrammatic illustrative diagram showing a replacement order of rolling bodies in the above internal-meshing planetary gear device.

Furthermore, as shown in FIG. 22, when the rolling bodies 402 are replaced, the operator pulls out the existing rolling body 402 from the inner pin path Sp1 on the output side of the rotation axis Ax1 for example. At this time, as an example, a clip such as magnet or the like is suitably used as a mechanism for pulling out the rolling body 402. Then, the operator inserts a new rolling body 402 from the inner pin path Sp1 on the output side of the rotation axis Ax1.

Furthermore, in the above method, since the rolling bodies 402 may be replaced one by one, the gear device 1A may be experimentally driven and the performance (backlash, input torque, or the like) may be checked each time one of the rolling bodies 402 is replaced. Therefore, for example, there may be an advantage that it is easy to locate the rolling bodies 402 even under bad conditions and it is easy to adjust the performance of the gear device 1A to a desired performance.

When any one of the inner pin 4 and the rolling body 402 is replaced, the operator mounts the cover bodies 163, 164 and the oil seals 14, 15 to the bracket flange 18 and the output flange 19 after replacement is completed. The inner pin paths Sp1 are closed by mounting the cover bodies 163, 164.

However, the method shown in FIG. 21 is merely an example, and the operator may press a new inner pin 4A into the output flange 19 from the inner pin path Sp1 on the output side of the rotation axis Ax1 for example. Furthermore, even when the inner pin 4 is replaced, the operator may temporarily pull out the inner pin 4 and then replace it with a new inner pin 4A, similarly to the rolling body 402. Furthermore, the inner pin 4 and the rolling body 402 may be replaced at the same time.

Furthermore, replacement operations of the inner pin 4, the rolling bearings 41, 42, or the like are not limited to the manufacturing processes of the gear device 1A, instead, may be performed in maintenance operations or the like during usage of the gear device 1A for example. That is, a method for maintaining the gear device 1A of the implementation includes a process of replacing at least one of multiple inner pins 4 from at least one side in the direction parallel to the rotation axis Ax1, in a state where the bearing member 6A, the internally toothed gear 2 and the planetary gear 3 are combined. Furthermore, a method for manufacturing the gear device 1A of the implementation includes a process of inserting multiple inner pins 4 from at least one side in the direction parallel to the rotation axis Ax1, in a state where the bearing member 6A, the internally toothed gear 2 and the planetary gear 3 are combined.

Figure 23:
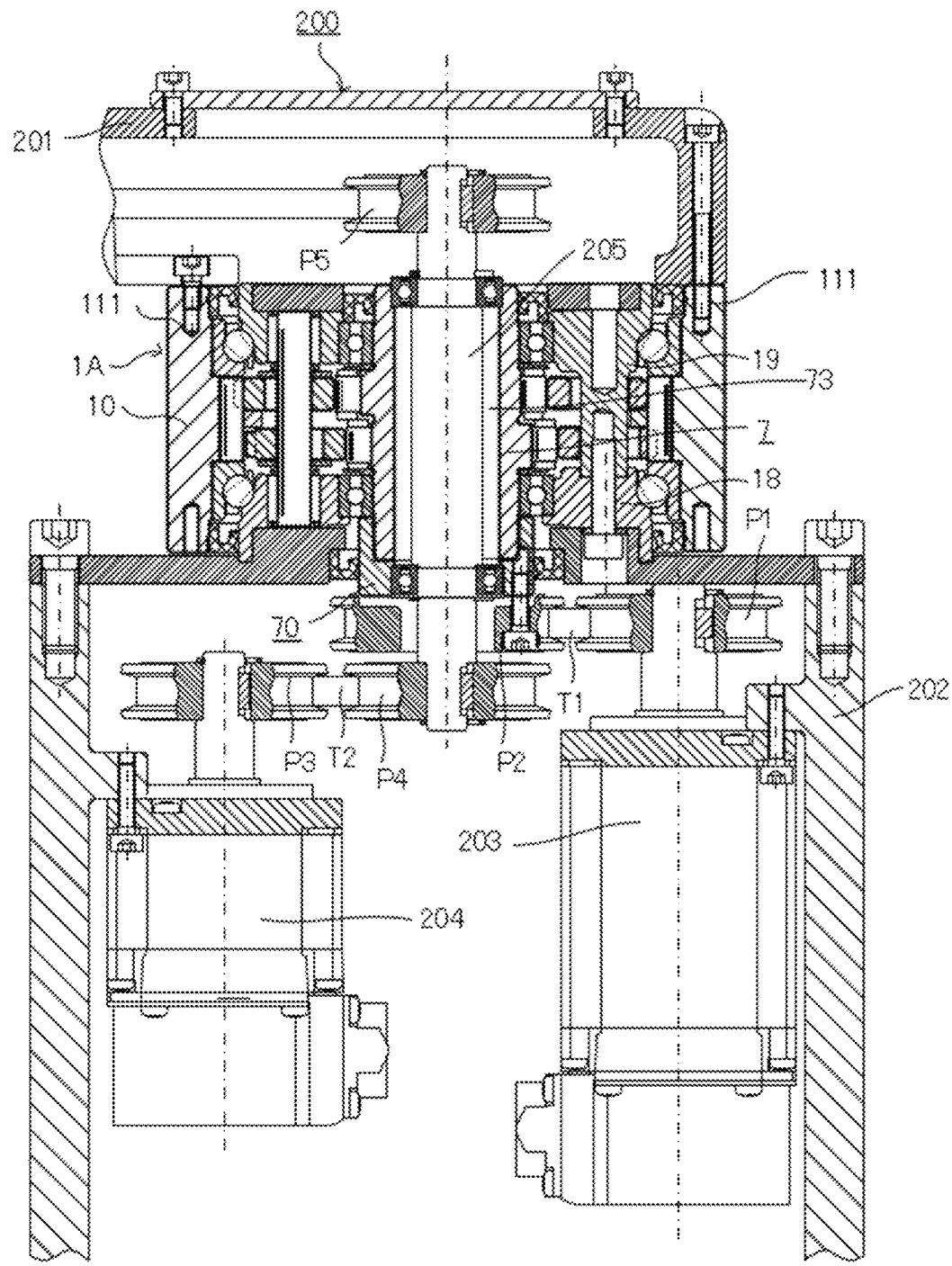
FIG. 23 is a diagrammatic cross-sectional view showing a joint device for a robot which uses the above internal-meshing planetary gear device.

As shown in FIG. 23, the gear device 1A of the implementation together with a first member 201 and a second member 202 constitute a joint device 200 for a robot. In other words, the joint device 200 for a robot of the implementation includes the gear device 1A, the first member 201 and the second member 202. The first member 201 is fixed by the outer ring 62. The second member 202 is fixed by the inner ring 61. FIG. 23 is a diagrammatic cross-sectional view of the joint device 200 for a robot.

In the implementation, as an example, the first member 201 is fixed to multiple setting holes 111 formed in the housing 10, and thus is indirectly fixed relative to the outer ring 62 of the bearing member 6A. The second member 202 is fixed to the bracket flange 18 and thus is indirectly fixed by the inner ring 61 of the bearing member 6A.

The joint device 200 for a robot as configured functions as a joint device by rotating the first member 201 and the second member 202 relative to each other with the rotation axis Ax1 as a center. Here, the first member 201 and the second member 202 rotate relative to each other by using a first motor 203 as a driving source 101 (referring to FIG. 1) to drive the eccentric shaft 7 of the gear device 1A. At this time, rotation (input rotation) generated by the driving source 101 is decelerated at a relatively high reduction ratio in the gear device 1A, and thus the first member 201 or the second member 202 is driven by a relatively high moment. That is, the first member 201 and the second member 202 connected by the gear device 1A are capable of flexing and extending with the rotation axis Ax1 as a center.

More specifically, a first pulley P1 is fixed to an output shaft of the first motor 203. A second pulley P2 is connected to the first pulley P1 via a synchronous belt T1. Here, the second pulley P2 is fixed to the fixing structure 701 of the bushing 70, as an object member. That is, when the first motor 203 is driven, rotation of the first motor is transmitted to the eccentric shaft 7 used as the input shaft via the first pulley P1, the synchronous belt T1 and the second pulley P2.

Furthermore, the joint device 200 for a robot further includes a second motor 204. A third pulley P3 is fixed to an output shaft of the second motor 204. A fourth pulley P4 is connected to the third pulley P3 via a synchronous belt T2. Here, the fourth pulley P4 is fixed to a shaft 205. The shaft 205 passes through the through hole 73 and penetrates the bushing 70 and the eccentric shaft 7. A fifth pulley P5 is fixed to an end of the shaft 205 on a side opposite to the fourth pulley P4. Therefore, when the second motor 204 is driven, rotation of the second motor is transmitted to a fifth pulley P5 via the third pulley P3, the synchronous belt T2, the fourth pulley P4 and the shaft 205.

For example, the joint device 200 for a robot is applicable to a robot such as a horizontal multi-joint robot (a joint type robot). Furthermore, the joint device 200 for a robot is not limited to the horizontal multi-joint robot, for example, may also be applicable to industrial robots other than the horizontal multi-joint robot, or robots other than industrial robots, or the like. Furthermore, the gear device 1A of the implementation is not limited to the joint device 200 for a robot, for example, may be used as a wheel device such as a hub motor or the like, or may be applicable to a vehicle such as an Automated Guided Vehicle (AGV) or the like.

The first implementation is merely one of various implementations of the embodiments of the disclosure. As long as the first implementation may achieve purposes of the embodiments of the disclosure, various changes may be made thereto according to design or the like. Furthermore, drawings referred by the embodiments of the disclosure are schematic diagrams, and respective scales of sizes and thicknesses of structural elements in the drawings do not necessarily reflect actual size scales. Deformation examples of the first implementation are listed below. The deformation examples described below may be applicable with proper combination.

In the first implementation, the gear device 1A with two types of planetary gears 3 is exemplified, however, the gear device 1A may include more than three planetary gears 3. For example, in case that the gear device 1A includes three planetary gears 3, the three planetary gears 3 are preferably arranged with a phase difference of 120 degrees around the rotation axis Ax1. Furthermore, the gear device 1A may also include only one planetary gear 3. Or, in case that the gear device 1A includes three planetary gears 3, two of the three planetary gears 3 may be in the same phase, and the remaining one of the three planetary gears 3 may be arranged with a phase difference of 180 degrees around the rotation axis Ax1.

Furthermore, it is unnecessary for both end portions of the inner pin 4 to be held by the rolling bearings 41, 42, and only one end portion of the inner pin 4 may be held by the rolling bearings 41, 42.

Furthermore, relative to multiple inner pins 4, the inner pin paths Sp1 may be located on at least one side in the direction parallel to the rotation axis Ax1, and may not be necessarily located on both sides. Furthermore, the cover bodies 163, 164 are not essential, and may be appropriately omitted. Furthermore, it is unnecessary for the cover bodies 163, 164 to cover multiple inner pin paths Sp1 corresponding to multiple inner pins 4 together at the first position, and the cover bodies 163, 164 may be provided separately for each inner pin 4. Furthermore, it is unnecessary to communicate the inner pin paths Sp1 with the lubricant holding space 17, and the inner pin paths Sp1 may be separated from the lubricant holding space 17.

Furthermore, it is unnecessary for the bushing 70 to be provided with the insertion opening 702, and the insertion opening 702 may be appropriately omitted. Furthermore, it is unnecessary for the bushing 70 to be coupled to the input shaft (the eccentric shaft 7) by adhesion, for example, the bushing may be coupled to the input shaft (the eccentric shaft) by press-fitting only. Furthermore, it is unnecessary to provide a structure where the bushing 70 limits movement of the inner-side bearing member (the first bearing 91) toward a side in the direction parallel to the rotation axis Ax1. Furthermore, the input shaft (the eccentric shaft 7) and the through hole 73 of the bushing 70 are not essential. Furthermore, it is unnecessary for at least a part of the fixing structure 701 in the direction parallel to the rotation axis Ax1 to be located at the same position as the input shaft.

Furthermore, multiple sets of rolling bearings 41, 42 may not be arranged at equal intervals in the circumferential direction around the rotation axis Ax1 when they are observed in the direction parallel to the rotation axis Ax1. Furthermore, center of the virtual circle VC1 passing through centers of multiple sets of rolling bearings 41, 42 may not in consistent with the rotation axis Ax1 when it is observed in the direction parallel to the rotation axis Ax1.

Furthermore, the number of the inner pins 4, the number of the pins 23 (the tooth number of the internal tooth 21), the tooth number of the external tooth 31 or the like described in the first implementation are only examples and may be changed appropriately.

Furthermore, similar to the basic structure, the bearing member 6A may be a cross roller bearing, or a deep groove ball bearing. However, the bearing member 6A is preferably able to bear a radial load, load in a thrust direction (in the direction of the rotation axis Ax1) and a bending force (bending moment load) for the rotation axis Ax1, such as a four-point contact ball bearing or the like.

Furthermore, the eccentric body bearing 5 is not limited to a roller ball bearing, for example, may be a deep groove ball bearing, an angular contact ball bearing, or the like.

Furthermore, material of each structural element of the gear device 1A is not limited to metal, for example, may be a resin such as engineering plastic or the like.

Furthermore, the gear device 1A is not limited to a structure where the rotation force of the inner ring 61 (the bracket flange 18 and the output flange 19) is taken out as output, as long as the relative rotation between the inner ring 61 and the outer ring 62 of the bearing member 6 may be taken out as output. For example, the rotation force of the outer ring 62 (the housing 10) relatively rotating relative to the inner ring 61 may be taken out as output.

Furthermore, the lubricant is not limited to a liquid substance such as a lubrication oil (oil liquid) or the like, instead, may be a gel-like substance such as a lubrication grease or the like.

Furthermore, the gear device 1A may include inner rollers. That is, in the gear device 1A, it is unnecessary for each of multiple inner pins 4 to be in direct contact with the inner peripheral surface 321 of the inner pin hole 32, and inner rollers may be interposed between each of multiple inner pins 4 and the inner pin hole 32. In this case, the inner rollers are fitted to the inner pin 4 and may rotate with the inner pin 4 as an axis.

Furthermore, it is enough as long as each of multiple inner pins 4 is held in the inner ring 61 in a self-rotatable state, and a situation where each of multiple inner pins 4 is held by the rolling bearings 41, 42, is not essential in the gear device 1A. For example, each of multiple inner pins 4 may be directly held by the inner ring 61, or directly held by the bracket flange 18, the output flange 19 or the like integrated with the inner ring 61.

Furthermore, the support ring 8A is not essential in the gear device 1A, that is, the support ring 8A may be appropriately omitted, or the support body 8 described in the basic structure may be used instead of the support ring 8A.

Furthermore, it is enough as long as the gear device 1A uses at least one of study of allowing removal of the inner pin 4, study of the support structure 40 (rolling bearings 41, 42) of the inner pin 4, or study of the bushing 70, without using all these studies. That is, for example, the gear device 1A may use only one of study of allowing removal of the inner pin 4 or study of the bushing 70.

Furthermore, it is enough as long as the gear device 1A uses at least one of study of the pre-pressure of the inner pin 4 or study of the support structure 40 of the inner pin 4, so that other structures may be appropriately omitted or changed according to the basic structure. For example, in the gear device 1A, the inner pin 4 may also be held in a state of press-fitting relative to the inner ring 61 (or, the bracket flange 18 or the output flange 19 integrated with the inner ring 61). In such case, each of multiple inner pins 4 is held in a state of being unable to self-rotate relative to the inner ring 61. Furthermore, it is enough as long as each of multiple inner pins 4 may be arranged at the same position as the bearing member 6A in the axial direction of the bearing member 6A.

Furthermore, it is enough for a structure where the input shaft coupled with the bushing 70 swings the planetary gear 3 eccentrically during rotation, and it is not limited to a structure where the axis portion 71 and the eccentric portion 72 are integrally provided like the eccentric shaft 7. For example, the input shaft coupled with the bushing 70 may be the axis portion 71 formed separately from the eccentric portion 72. In such case, the eccentric portion 72 is mounted to the input shaft (the axis portion 71) coupled with the bushing 70.

Furthermore, the positioning structure for positioning the cover bodies 163, 164 relative to the inner ring 61 is not limited to uniquely determining positions of the cover bodies 163, 164 relative to the inner ring 61 in the rotation direction with the rotation axis Ax1 as a center. For example, the positioning structure may position the cover bodies 163, 164 rotationally symmetrically relative to the inner ring 61 of the bearing member 6A with the rotation axis Ax1 as a symmetry axis. Furthermore, the positioning structure is not limited to the convex portion 167 and concave portions 184, 194, and may be implemented by for example a fitting tolerance with respect to the bracket flange 18 and the output flange 19. Furthermore, the positioning structure is not an essential structure, and may be appropriately omitted.

Furthermore, the fixing structure 701 arranged in the bushing 70 is not limited to a screw hole. For example, the fixing structure 701 may be a stud bolt, an adhesive surface, or the like.

Furthermore, the space between the cover bodies 163, 164 and the bracket flange 18 and the output flange 19 may be closed by for example an O-ring or the like. Therefore, airtightness of the lubricant holding space 17 may be improved.

As explained above, an internal-meshing planetary gear device (1, 1A) with a first configuration includes an internally toothed gear (2), a planetary gear (3), multiple inner pins (4), an input shaft, and a bushing (70). The internally toothed gear (2) is provided with internal teeth (21). The planetary gear (3) is provided with external teeth (31) partially meshing with the internal teeth (21). Multiple inner pins (4) revolve in multiple inner pin holes (32) formed in the planetary gear (3) and relatively rotate relative to the internally toothed gear (2) with a rotation axis (Ax1) as a center, in a state where multiple inner pins are inserted into multiple inner pin holes (32) respectively. The input shaft swings the planetary gear (3) eccentrically. The bushing (70) is provided with a fixing structure to fix an object member, and is coupled to the input shaft and rotates together with the input shaft.

According to this configuration, the object member is fixed to the input shaft through the bushing (70) coupled to the input shaft, instead of directly fixing the object member to the input shaft. Therefore, outer diameter of the input shaft may be reduced compared to a case where the object member is directly fixed to an end surface of the input shaft.

As a result, it is possible to provide the internal-meshing planetary gear device (1, 1A) which may be (e.g., easily) miniaturized.

In an internal-meshing planetary gear device (1, 1A) with a second configuration, based on the first configuration, the bushing (70) is provided with an insertion opening (702), and is coupled to the input shaft in a state where a part of the input shaft is inserted into the insertion opening (702).

According to this configuration, coupling between the bushing (70) and the input shaft may be achieved, while increase of size of the internal-meshing planetary gear device (1, 1A) in a radial direction is suppressed.

An internal-meshing planetary gear device (1, 1A) with a third configuration, based on the first or second configuration, further includes a bearing member (6, 6A) and an inner-side bearing member. The bearing member (6, 6A) is provided with an outer ring (62), and an inner ring (61) arranged on an inner side of the outer ring (62) and supported to be relatively rotatable relative to the outer ring (62) with the rotation axis (Ax1) as a center. The inner-side bearing member keeps the input shaft to be rotatable relative to the inner ring (61). The bushing (70) limits movement of the inner-side bearing member toward a side in a direction parallel to the rotation axis (Ax1).

According to this configuration, it is unnecessary to separate the member for limiting movement of the inner-side bearing member from the bushing (70), therefore it is easy to suppress a number of parts to a small extent.

In an internal-meshing planetary gear device (1, 1A) with a fourth configuration, based on any one of the first to third configurations, the bushing (70) is coupled to the input shaft at least by adhesion.

According to this configuration, firm coupling between the bushing (70) and the input shaft may be achieved.

In an internal-meshing planetary gear device (1, 1A) with a fifth configuration, based on any one of the first to fourth configurations, each of the input shaft and the bushing (70) is provided with a through hole (73) penetrated along the rotation axis (Ax1).

According to this configuration, a cable, a shaft or the like may pass through the through hole (73).

In an internal-meshing planetary gear device (1, 1A) with a sixth configuration, based on any one of the first to fifth configurations, the fixing structure (701) is configured to fix the object member on a side in a direction parallel to the rotation axis (Ax1) relative to the bushing (70).

According to this configuration, diameter of the input shaft may be suppressed to a small extent, and the object member may be fixed on a side in the direction parallel to the rotation axis (Ax1) relative to the input shaft.

In an internal-meshing planetary gear device (1, 1A) with a seventh configuration, based on any one of the first to sixth configurations, at least a part of the fixing structure (701) is located at the same position as the input shaft, in a direction parallel to the rotation axis (Ax1).

According to this configuration, it is possible to suppress increase of size of the internal-meshing planetary gear device (1, 1A) in the direction parallel to the rotation axis (Ax1), although the fixing structure (701) is relatively large.

An internal-meshing planetary gear device (1, 1A) with an eighth configuration, based on any one of the first to seventh configurations, further includes inner pin paths (Sp1). The inner pin paths (Sp1) are located on at least one side in a direction parallel to the rotation axis (Ax1) relative to multiple inner pins (4), and allow removal of each of multiple inner pins (4) in a state formed by combining the input shaft with the bushing (70).

According to this configuration, the inner pins (4) or the like may be replaced, without disassembling at least the input shaft and the bushing (70).

In some embodiments, a joint device 200 for a robot includes the internal-meshing planetary gear device (1, 1A), a first member (201), and a second member (202). The first member (201) is fixed by an outer ring (62) of a bearing member (6, 6A) in the internal-meshing planetary gear device (1, 1A). The second member (202) is fixed by an inner ring (61) of the bearing member (6, 6A).

According to this configuration, it is possible to provide the joint device 200 for a robot which may be easily miniaturized.

With regard to structures of the second to eighth configurations, structures which are not necessarily provided for the internal-meshing planetary gear device (1, 1A) may be appropriately omitted.

EXPLANATIONS OF REFERENCE NUMERALS 1, 1A Internal-meshing planetary gear device
2 Internally toothed gear
3 Planetary gear
4 Inner pin
6, 6A Bearing member
7 Eccentric shaft (input shaft)
21 Internal tooth
31 External tooth
32 Inner pin hole
61 Inner ring
62 Outer ring
70 Bushing
73 Through-hole
91 First bearing (inner-side bearing member)
200 Joint device for a robot
201 First member
202 Second member
Ax1 Rotation axis
701 Fixing structure
702 Insertion opening
P2 Second pulley (object member)
Sp1 Inner pin path According to some embodiments of the disclosure, an internal-meshing planetary gear device and a joint device for a robot may be easily miniaturized.

What is claimed is:
1. An internal-meshing planetary gear device, comprising:
an internally toothed gear, provided with internal teeth;
a planetary gear, provided with external teeth partially meshing with the internal teeth;
a plurality of inner pins, configured to revolve in a plurality of inner pin holes formed in the planetary gear and to rotate relative to the internally toothed gear about a rotation axis, in a state where the plurality of inner pins are inserted into the plurality of inner pin holes respectively;
an input shaft, configured to swing the planetary gear eccentrically; and
a bushing, provided with a fixing structure to fix an object member, and coupled to the input shaft and configured to rotate together with the input shaft, wherein the bushing is provided with an insertion opening, and is coupled to the input shaft in a state where a part of the input shaft is inserted into the insertion opening.
2. The internal-meshing planetary gear device of claim 1, further comprising:

a bearing member, provided with an outer ring, and an inner ring arranged on an inner side of the outer ring and supported to be relatively rotatable relative to the outer ring with the rotation axis as a center; and an inner-side bearing member, configured to keep the input shaft rotatable relative to the inner ring, the bushing configured to limit movement of the inner-side bearing member toward a side in a direction parallel to the rotation axis.

3. The internal-meshing planetary gear device of claim 1, wherein the bushing is coupled to the input shaft at least by adhesion.

4. The internal-meshing planetary gear device of claim 1, wherein each of the input shaft and the bushing is provided with a through hole along the rotation axis.

5. The internal-meshing planetary gear device of claim 1, wherein the fixing structure is configured to fix the object member on a side in a direction parallel to the rotation axis relative to the bushing.

6. The internal-meshing planetary gear device of claim 1, wherein at least a part of the fixing structure is located at a same position as the input shaft, in a direction parallel to the rotation axis.

7. The internal-meshing planetary gear device of claim 1, further comprising:

inner pin paths, located on at least one side in a direction parallel to the rotation axis relative to the plurality of inner pins, and configured to allow removal of each of the plurality of inner pins in a state formed by combining the input shaft with the bushing.

8. A joint device for a robot, comprising:

an internal-meshing planetary gear device comprising:

an internally toothed gear, provided with internal teeth;

a planetary gear, provided with external teeth partially meshing with the internal teeth; and a plurality of inner pins, configured to revolve in a plurality of inner pin holes formed in the planetary gear and to rotate relative to the internally toothed gear about a rotation axis, in a state where the plurality of inner pins are inserted into the plurality of inner pin holes respectively;

an input shaft, configured to swing the planetary gear eccentrically;

a bushing, provided with a fixing structure to fix an object member, and coupled to the input shaft and configured to rotate together with the input shaft, wherein the bushing is provided with an insertion opening, and is coupled to the input shaft in a state where a part of the input shaft is inserted into the insertion opening;

a first member, fixed to an outer ring of a bearing member in the internal-meshing planetary gear device; and a second member, fixed to an inner ring of the bearing member.

9. The joint device for the robot of claim 8, further comprising:

the bearing member, provided with the outer ring, and the inner ring arranged on an inner side of the outer ring and supported to be relatively rotatable relative to the outer ring with the rotation axis as a center; and an inner-side bearing member, configured to keep the input shaft rotatable relative to the inner ring, the bushing configured to limit movement of the inner-side bearing member toward a side in a direction parallel to the rotation axis.

10. The joint device for the robot of claim 8, wherein the bushing is coupled to the input shaft at least by adhesion.

11. The joint device for the robot of claim 8, wherein each of the input shaft and the bushing is provided with a through hole along the rotation axis.

12. The joint device for the robot of claim 8, wherein the fixing structure is configured to fix the object member on a side in a direction parallel to the rotation axis relative to the bushing.

13. The joint device for the robot of claim 8, wherein at least a part of the fixing structure is located at a same position as the input shaft, in a direction parallel to the rotation axis.

14. The joint device for the robot of claim 8, further comprising:

inner pin paths, located on at least one side in a direction parallel to the rotation axis relative to the plurality of inner pins, and configured to allow removal of each of the plurality of inner pins in a state formed by combining the input shaft with the bushing.

* * * * *